United States Patent
Eyole et al.

(10) Patent No.: US 11,899,940 B2
(45) Date of Patent: Feb. 13, 2024

(54) APPARATUS AND METHOD FOR HANDLING MEMORY LOAD REQUESTS

(71) Applicant: ARM LIMITED, Cambridge (GB)

(72) Inventors: Mbou Eyole, Cambridge (GB); Stefanos Kaxiras, Cambridge (GB)

(73) Assignee: Arm Limited, Cambridge (GB)

( * ) Notice: Subject to any disclaimer, the term of this patent is extended or adjusted under 35 U.S.C. 154(b) by 29 days.

(21) Appl. No.: 17/755,133

(22) PCT Filed: Oct. 7, 2020

(86) PCT No.: PCT/EP2020/078095
§ 371 (c)(1),
(2) Date: Apr. 21, 2022

(87) PCT Pub. No.: WO2021/078515
PCT Pub. Date: Apr. 29, 2021

(65) Prior Publication Data
US 2022/0391101 A1    Dec. 8, 2022

(30) Foreign Application Priority Data
Oct. 21, 2019  (EP) ..................................... 19386044

(51) Int. Cl.
*G06F 3/06* (2006.01)

(52) U.S. Cl.
CPC .......... *G06F 3/0613* (2013.01); *G06F 3/0629* (2013.01); *G06F 3/0673* (2013.01)

(58) Field of Classification Search
CPC .... G06F 3/0613; G06F 3/0629; G06F 3/0673; G06F 9/30181; G06F 9/3834;
(Continued)

(56) References Cited

U.S. PATENT DOCUMENTS 5,898,852 A    4/1999  Petolino, Jr.
6,249,851 B1   6/2001  Richardson
(Continued)

FOREIGN PATENT DOCUMENTS

WO    2012/123061 A1   9/2012
WO    2012/123061 A9   9/2012

OTHER PUBLICATIONS

UKIPO Communication dated Feb. 9, 2021.
Tae Jun Ham, et al., "Decoupling Data Supply from Computation for Latency-Tolerant Communication in Heterogeneous Architectures", ACM Trans. Archit. Code Optim. 14, 2, Article 16 (Jun. 2017), 27 pages; DOI: http://dx.doi.org/10.1145/3075620.
EPO Communication dated Aug. 14, 2020.
(Continued)

*Primary Examiner* — Zhuo H Li
(74) *Attorney, Agent, or Firm* — NIXON & VANDERHYE P.C.

(57) ABSTRACT

When load requests are generated to support data processing operations, the load requests are buffered in pending load buffer circuitry prior to being carried out. Coalescing circuitry determines for a first load request whether a set of one or more subsequent load requests buffered in the pending load buffer circuitry satisfies an address proximity condition. The address proximity condition is satisfied when all data items identified by the set of one or more subsequent load requests are comprised within a series of data items which will be retrieved from the memory system in response to the first load request. When the address proximity condition is satisfied, forwarding of the set of one or more subsequent load requests is suppressed.

16 Claims, 30 Drawing Sheets

(58) Field of Classification Search
CPC .. G06F 9/3859; G06F 9/3824; G06F 9/30043; G06F 9/3853
See application file for complete search history.

(56) References Cited

U.S. PATENT DOCUMENTS

| | | | |
|---|---|---|---|
| 6,336,168 B1 | 1/2002 | Frederick, Jr. et al. | |
| 6,490,674 B1 | 12/2002 | Arnold | |
| 7,032,101 B2 | 4/2006 | Gschwind | |
| 7,492,368 B1 | 2/2009 | Nordquist et al. | |
| 8,874,908 B2 | 10/2014 | Raudaschl | |
| 9,158,573 B2 | 10/2015 | Busaba | |
| 9,946,666 B2 | 4/2018 | Heinrich | |
| 10,282,371 B1 | 5/2019 | Gaither | |
| 10,528,470 B1* | 1/2020 | Doshi | G06F 3/0673 |
| 10,565,117 B2* | 2/2020 | Gschwind | G06F 12/084 |
| 11,163,581 B2* | 11/2021 | Eyole | G06F 9/384 |
| 2004/0088501 A1 | 5/2004 | Collard et al. | |
| 2006/0236036 A1 | 10/2006 | Gschwind | |
| 2008/0086594 A1 | 4/2008 | Chang | |
| 2009/0240895 A1 | 9/2009 | Nyland et al. | |
| 2014/0047218 A1 | 2/2014 | Jackson | |
| 2014/0258667 A1 | 9/2014 | Sudhakar | |
| 2015/0169361 A1 | 6/2015 | Busaba et al. | |
| 2015/0347138 A1 | 12/2015 | Gschwind | |
| 2016/0267072 A1 | 9/2016 | Kappler | |
| 2017/0277542 A1 | 9/2017 | Fernsler et al. | |
| 2018/0232310 A1 | 8/2018 | Chang | |
| 2020/0004536 A1 | 1/2020 | Shevgoor | |
| 2020/0160401 A1 | 5/2020 | Hassan | |
| 2020/0310814 A1 | 10/2020 | Kothinti Naresh | |
| 2021/0117200 A1* | 4/2021 | Eyole | G06F 9/3836 |
| 2022/0035633 A1 | 2/2022 | Cain, III | |

OTHER PUBLICATIONS

James E. Smith, "Decoupled Access/Execute Computer Architectures", Department of Electrical and Computer Engineering University of Wisconsin-Madison, Madison, Wisconsin 53706; 1982.
Trevor E. Carlson, et al., "The Load Slice Core Microarchitecture", ISCA '15, Jun. 13-17, 2015, Portland, OR, USA.
Final Office Action dated Apr. 13, 2023 for U.S. Appl. No. 17/211,062, 18 pages.
U.S. Appl. No. 17/211,062, filed Mar. 24, 2021, Eyole et al.
Office Action dated Nov. 21, 2022, for U.S. Appl. No. 17/211,062, 35 pages.
Office Action dated May 5, 2022, for U.S. Appl. No. 17/211,062, 32 pages.
Solomon et al, "Micro-Operation Cache: A Power Aware Frontend for Variable Instruction Length ISA" ACM, ISLPED'01, Aug. 6-7, 2001, pp. 4-9.
Sha et al, "Scalable Store-Load Forwarding via Store Queue Index Prediction" Proceedings of the 38$^{th}$ Annual IEEE/ACM International Symposium on Microarchitecture (MICRO'05), 2005, 12 pages.
Jin et al, "Reducing Cache Traffic and Energy with Macro Data Load" ACM, ISLPED'06, Oct. 4-6, 2006, pp. 147-150.
Search Report for GB2006684.1, dated Oct. 21, 2020, 4 Pages.
Orosa et al., "AVPP: Address-first Value-next Predictor with Value Prefetching for Improving the Efficiency of Load Value Prediction", ACM Transactions on Architecture and Code Optimization, vol. 1, No. 1, article 1, Sep. 2018, 25 pages.
Sleiman et al., "Efficiently Scaling Out-of-Order Cores for Simultaneous Multithreading", 2016 ACM/IEEE 43rd Annual International Symposium on Computer Architecture, IEEE, Jun. 18-22, 2016, 13 Pages.

* cited by examiner

| TRAVERSAL TABLE | |
|---|---|
| INSTRUCTION | PRODUCERS |
| I3 | I2 |
| I5 | I3 |
| I9 | I5 |
| I10 | I7,I9 |
| | |

FIG. 13A

| LAST - WRITER TABLE | |
|---|---|
| PHYSICAL REGISTER | INSTRUCTION |
| ⋮ | ⋮ |
| 25 | - |
| 26 | I5 |
| 27 | - |
| 28 | I9 |
| ⋮ | ⋮ |

FIG. 13B

| INSTRUCTION TAG STORAGE | | |
|---|---|---|
| INSTRUCTION | TAG | N/P |
| . | . | . |
| . | . | . |
| . | . | . |
| I10 | A | 1 |
| . | . | . |
| . | . | . |
| . | . | . |
| I2 | A | 1 |
| . | . | . |
| . | . | . |
| . | . | . |
| I20 | - | 1 |
| . | . | . |
| . | . | . |
| . | . | . |

APPARATUS AND METHOD FOR HANDLING MEMORY LOAD REQUESTS

BACKGROUND

The present technique relates to the field of data processing. More particularly the invention relates to the handling of access requests.

An apparatus may perform data processing operations making use of data stored in a memory system. In order to access data items in the memory system, data processing circuitry of the apparatus is arranged to generate access requests indicating the data item that is to be accessed. For example these access requests may be load requests. In some cases, other operations of the apparatus may require the result of the load request in order to proceed. As such, it is desirable to be able to process load requests quickly to reduce the amount of time that the apparatus is waiting for the data item to be retrieved. This is particularly a concern in the context of load operations, since write operations may be able to send a write request to a memory system and proceed without waiting for the store operation fully to complete. Similarly, other data processing operations performed by the apparatus such as those performed on data stored in registers in the processing circuitry may be able to operate without waiting for a response from the memory system. Accordingly, it would be advantageous to provide a technique whereby access requests can be handled efficiently.

SUMMARY

In one example arrangement, there is provided an apparatus to perform data processing operations, the data processing operations comprising loading data items from a memory system, the apparatus comprising: address generation circuitry to generate addresses for load requests; pending load buffer circuitry to buffer the load requests received from the address generation circuitry prior to the load requests being carried out to retrieve data items using the addresses of the load requests; load handling circuitry responsive to a load request to retrieve from the memory system a series of data items comprising the data item identified by the load request; coalescing circuitry to forward the load request buffered in the pending load buffer circuitry to the load handling circuitry and arranged to determine for a set of one or more subsequent load requests buffered in the pending load buffer circuitry whether an address proximity condition is satisfied, wherein the address proximity condition is satisfied when all data items identified by the set of one or more subsequent load requests are comprised within the series of data items, and wherein the coalescing circuitry is responsive to the address proximity condition being satisfied to suppress forwarding of the set of one or more subsequent load requests; and decoalescing circuitry to receive the series of data items retrieved by the load handling circuitry and to return as the result of the load request the data item identified by the load request, wherein the decoalescing circuitry is responsive to the address proximity condition being satisfied to return, for each of the subsequent load requests in the set of one or more subsequent load requests, one or more further data items identified by the one or more subsequent load requests from the series of data items as the results of the one or more subsequent load requests.

In another example arrangement, there is provided a method of operating an apparatus to perform data processing operations, the data processing operations comprising loading data items from a memory system, the method comprising: generating addresses for load requests; buffering in pending load buffer circuitry the load requests prior to load handling circuitry carrying out the load requests to retrieve data items using the addresses of the load requests; forwarding to the load handling circuitry a load request buffered in the pending load buffer circuitry a load request to retrieve from the memory system a series of data items comprising the data item identified by the load request; determining for a set of one or more subsequent load requests buffered in the pending load buffer circuitry whether an address proximity condition is satisfied, wherein the address proximity condition is satisfied when all data items identified by the set of one or more subsequent load requests are comprised within the series of data items, suppressing, responsive to the address proximity condition being satisfied, forwarding of the set of one or more subsequent load requests to the load handling circuitry; retrieving, responsive to the load request, from the memory system the series of data items comprising the data item identified by the load request; receiving the series of data items retrieved and returning as the result of the load request the data item identified by the load request; and returning, responsive to the address proximity condition being satisfied, for each of the subsequent load requests in the set of one or more subsequent load requests, one or more further data items identified by the one or more subsequent load requests from the series of data items as the results of the one or more subsequent load requests.

In a still further example arrangement, there is provided an apparatus to perform data processing operations, the data processing operations comprising loading data items from a memory system, the apparatus comprising: means for generating addresses for load requests; means for buffering the load requests prior to means for handling loads carrying out the load requests to retrieve data items using the addresses of the load requests; means for forwarding to the means for handling loads a load request buffered in the means for buffering a load request to retrieve from the memory system a series of data items comprising the data item identified by the load request, wherein the means for handling loads is responsive to the load request, to retrieve from the memory system the series of data items comprising the data item identified by the load request; means for determining for a set of one or more subsequent load requests buffered in the means for buffering whether an address proximity condition is satisfied, wherein the address proximity condition is satisfied when all data items identified by the set of one or more subsequent load requests are comprised within the series of data items, means for suppressing, responsive to the address proximity condition being satisfied, forwarding of the set of one or more subsequent load requests to the means for handling loads, means for receiving the series of data items retrieved and for returning as the result of the load request the data item identified by the load request; and means for returning, in response to the address proximity condition being satisfied, for each of the subsequent load requests in the set of one or more subsequent load requests, one or more further data items identified by the one or more subsequent load requests from the series of data items as the results of the one or more subsequent load requests.

BRIEF DESCRIPTION OF THE DRAWINGS

The present technique will be described further, by way of illustration only, with reference to examples thereof as illustrated in the accompanying drawings, in which:

FIG. 8A is an "access" data dependency graph and FIG. 8B is an "execute" data dependency graph;

FIG. 13A illustrates example content of a traversal table in accordance with some embodiments;

FIG. 13B shows example content of a last-writer table in accordance with some embodiments;

DESCRIPTION OF EXAMPLES

Figure 1A:
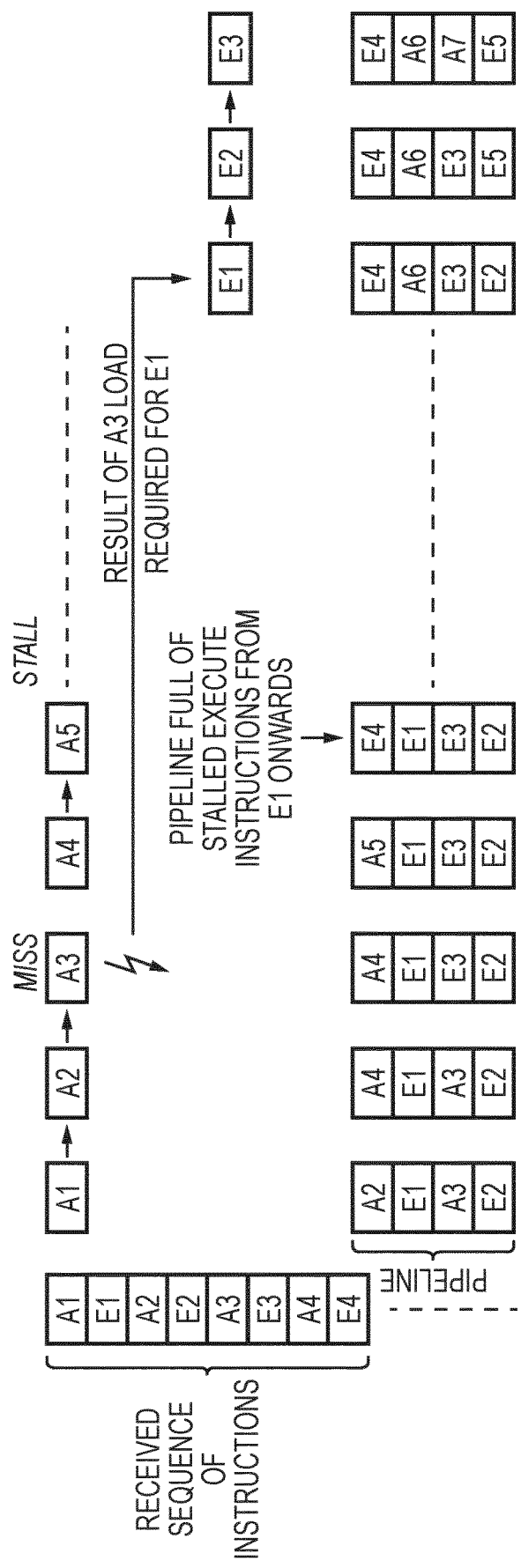
FIG. 1A illustrates a sequence of instructions comprising both access and execute instructions being received by a prior art processor, in a situation where a cache miss for an access instruction causes some subsequent execute instructions to stall the pipeline

In an apparatus to perform data processing operations where at least some of those data processing operations involve accessing data items in a memory system, it may be desirable to provide a mechanism by which multiple access requests can be handled efficiently. For example, since it is common for other operations to be dependent on the result of a load request, by providing an efficient means of handling load requests, this can reduce the incidence of delays or stalls in the apparatus occurring when the apparatus waits for the result of the load request from the memory system.

As used herein, the term memory system refers to main memory in addition to any hierarchy of intervening caches that may be implemented to store cached copies of the data items in main memory.

The apparatus may generate a load request with an indication of the data item that is to be fetched. This indication is typically the memory address of the data item, directly indicating the memory location in memory corresponding to the data item. However, a load request may also indicate the data item indirectly. For example, the load request may specify a register storing a memory address corresponding to the data item that is to be fetched. Alternatively, a load request may indicate a register and an offset, with the memory address corresponding to the data item that is to be fetched to be determined by applying (e.g., adding) the offset to the memory address stored in the register. As such, the load request initially generated by the apparatus may not directly identify the memory address corresponding to the requested data item.

In at least one example embodiment there is provided an apparatus to perform data processing operations, the data processing operations comprising loading data items from a memory system, the apparatus comprising: address generation circuitry to generate addresses for load requests; pending load buffer circuitry to buffer the load requests received from the address generation circuitry prior to the load requests being carried out to retrieve data items using the addresses of the load requests; load handling circuitry responsive to a load request to retrieve from the memory system a series of data items comprising the data item identified by the load request; coalescing circuitry to forward the load request buffered in the pending load buffer circuitry to the load handling circuitry and arranged to determine for a set of one or more subsequent load requests buffered in the pending load buffer circuitry whether an address proximity condition is satisfied, wherein the address proximity condition is satisfied when all data items identified by the set of one or more subsequent load requests are comprised within the series of data items, and wherein the coalescing circuitry is responsive to the address proximity condition being satisfied to suppress forwarding of the set of one or more subsequent load requests; and decoalescing circuitry to receive the series of data items retrieved by the load handling circuitry and to return as the result of the load request the data item identified by the load request, wherein the decoalescing circuitry is responsive to the address proximity condition being satisfied to return, for each of the subsequent load requests in the set of one or more subsequent load requests, one or more further data items identified by the one or more subsequent load requests from the series of data items as the results of the one or more subsequent load requests.

Therefore, in accordance with the techniques described herein, there is provided an apparatus to perform data processing operations, the apparatus comprising address generation circuitry to generate addresses for load requests. The apparatus is arranged to perform data processing operations including data processing operations to load data items from a memory system. Load requests generated by the apparatus do not necessarily directly specify an address for which the corresponding data item is requested. That is, the memory address may need to be derived from the load request. The address generation circuitry performs this function, generating for the load requests the addresses that correspond thereto. Having generated the addresses, comparisons between the addresses for respective load requests, such as identifying load requests corresponding to proximal data items, can be performed, thus enabling advantageous schemes for handling load requests to be implemented.

The apparatus further comprises load handling circuitry to retrieve the data item identified by the load request from the memory system. In accordance with the techniques described herein, the load handling circuitry is arranged to retrieve not only the data item identified by the load request but a series of data items including the data item identified by the load request. This may be the case because the interface between the apparatus and the memory system is configured to communicate a plurality of data items at a time. For example, this could be the case when the apparatus comprises a vector processor arranged to be responsive to a single instruction to handle operations relating to multiple inputs or outputs and capable of handling scalar operations, whereby operations are performed with respect to single data items. Therefore, when handling a scalar load request, the apparatus may be arranged to pull in a series of data items and then determine which of the series of data items is the requested data item. In other examples, the processor is a scalar processor and the interface between the apparatus and a level 1 cache from which the apparatus receives the data items is arranged to communicate to the apparatus an entire cache line in response to a load request identifying a memory location in that cache line.

The apparatus could be arranged to retrieve a series of data items in response to each load request generated by the apparatus, discarding the data items not identified by the load request. However, since the load handling circuitry is arranged to retrieve a series of data items in response to a load request, according to the techniques described herein, the apparatus is arranged to be able make use of this bandwidth when handling load requests. Hence, if there are two or more load requests with addresses such that the series of data items retrieved by the load handling circuitry contains all of the data items identified by the two or more load requests, the apparatus can make use of the further data items in the series of data items instead of discarding them. In this way, the apparatus is arranged to parallelise the handling of load requests, to reduce the number of retrieving operations needed to be performed by the load handling circuitry, and thus to provide a more efficient way of handling load requests. More detail of the way in which the techniques described herein achieve these effects will be described further below.

In accordance with the techniques described herein the apparatus comprises pending load buffer circuitry to implement a pending load buffer. The pending load buffer circuitry is arranged to buffer the load requests from the address generation circuitry prior to the load requests being carried out to retrieve data items using the addresses of the load requests. The pending load buffer circuitry receives load requests for which an address has been generated by the address generation circuitry. The pending load buffer circuitry then provides a store for these load requests before the load handling circuitry described above carries out the load requests to retrieve the data items. Because the load requests may be generated at the apparatus at a different rate (which may be a higher rate) to the rate at which the load handling circuitry can handle the load requests, it is beneficial provide functionality for buffering pending load requests that are yet to be handled. Moreover this provides an opportunity to examine the co-pending load requests and to determine whether any have an access proximity which can be made use of according to the present techniques.

In accordance with the techniques described herein, there is provided coalescing circuitry to forward load requests buffered in the pending load buffer circuitry to the load handling circuitry. Hence the coalescing circuitry, in one of its roles, enables the load handling circuitry to receive the load requests from the pending load buffer circuitry that are to be handled.

In some example implementations, forwarding the load request to the load handling circuitry involves passing the load request that is to be forwarded to the load handling circuitry and deleting the load request from the pending load buffer circuitry. In this way, the coalescing circuitry can ensure that load requests leave the buffer as soon as they are propagated to the load handling circuitry, thus providing more space in the pending load buffer circuitry for new load requests to be stored. However, in some example implementations, the coalescing circuitry is arranged to leave the load request in the pending load buffer circuitry when forwarding the load request, and so it can be considered that the coalescing circuitry provides a copy of the load request to the load handling circuitry. This means that a record of the load request remains in the pending load buffer circuitry while the load request is being processed by the load handling circuitry, making it easier to track load requests as they move through the apparatus and easier to return the load request to the pending load buffer circuitry if needed (e.g., if an interrupt causes the load request not to be completed by the load handling circuitry).

The load request to be forwarded to the load handling circuitry may be a load request in a defined position of the pending load buffer circuitry such as at the head position of the pending load buffer circuitry storing the load request that has been in the pending load buffer circuitry the longest amount of time. This helps to avoid the situation whereby a load request sits in the pending load buffer circuitry for a long time without being handled. In an alternative example implementation, the coalescing circuitry may otherwise inspect the contents of the pending load buffer circuitry to determine which of the buffered load requests is a next load request to forward to the load handling circuitry.

The coalescing circuitry is arranged, in addition to forwarding the load request to the load handling circuitry, to determine for a set of one or more subsequent load requests buffered in the pending load buffer circuitry whether an address proximity condition is satisfied. The one or more subsequent load requests comprise other load requests in the pending load buffer circuitry that are not the load request that is being forwarded to the load handling circuitry. Hence, when the pending load buffer circuitry contains a plurality of load requests that specify proximal regions of memory, the coalescing circuitry is able to identify a set containing load requests from this plurality of load requests, thereby determining a set of subsequent load requests which specify proximal regions of memory to that specified by the load request being forwarded.

The address proximity condition could take a number of forms, but in some example implementations, the address proximity condition is based on a simple numeral comparison between the addresses specified by the load requests. Alternatively, or additionally, the address proximity condition may be determined based on identifying that the memory locations specified by the load requests and the set of one or more subsequent load requests are in the same cache line. Thus in some examples, the series of data items is a cache line and the address proximity condition is satisfied when the data item identified by the load request and all data items identified by the set of one or more subsequent load requests are comprised within the cache line.

The address proximity condition is satisfied when all data items identified by the set of one or more subsequent load requests are comprised within the series of data items. Therefore the address proximity condition is satisfied when the set of one or more subsequent load requests are such that when the load handling circuitry retrieves a series of data items from memory, the series of data items will contain the data items identified by the load request and the set of one or more subsequent load requests. For example, if the load handling circuitry is arranged to retrieve a cache line containing the data item identified by the load request forwarded to the load handling circuitry, the address proximity condition may be satisfied when the data items specified by the set of one or more subsequent load requests correspond to the same cache line.

Therefore, in accordance with the techniques described herein, the apparatus is able to make use of determining that a set of one or more subsequent load requests satisfy the address proximity condition with respect to the load request to suppress forwarding of the set of one or more subsequent load requests. Instead, since the series of data items retrieved by the load handling circuitry in response to the load request will contain the data items identified by the set of one or more subsequent load requests, the apparatus is arranged to make use of these data items to handle the set of one or more load requests rather than needing to have the load handling circuitry receive a series of data items for each load request.

The apparatus is further provided with decoalescing circuitry to receive the series of data items retrieved by the load handling circuitry and to return as the result of the load request the data item identified by the load request. Hence, when the address proximity condition is not satisfied, based on a load request and a series of data items containing the data item identified by the load request, the decoalescing circuitry is able to determine in the series of data items, which is the data item identified by the load request, and return that data item as the result of the load request.

However, when the address proximity condition is satisfied, the decoalescing circuitry is arranged to return, for each of the subsequent load requests in the set of one or more load requests, one or more further data items identified by the one or more subsequent load requests from the series of data items as the results of the one or more subsequent load requests. That is, in addition to determining the data item in the series of data items that is the data item identified by the load request, the decoalescing circuitry is arranged to determine for each of the one or more subsequent load requests, the further data items in the series of data items that correspond to those one or more subsequent load requests.

By identifying a set of subsequent load requests satisfying the address proximity condition and suppressing their forwarding to the load handling circuitry, instead making use of the results that will be obtained with respect to the load request, the apparatus is able to more efficiently handle load requests. This is because, by identifying subsequent load requests that mean that retrieval operations are not needed to be performed by the load handling circuitry, the number of load handling operations performed by the load handling circuitry can be reduced thus allowing the load handling circuitry to handle the remaining load requests more quickly.

As discussed above, in some example implementations, the apparatus may be arranged such that the load handling circuitry retrieves a cache line from the memory system as the series of data items. This provides a useful implementation of the techniques discussed herein, since the data in the memory system may be arranged in cache lines and so retrieving an entire cache line at a time may be performed quickly. Additionally, the addressing of the memory locations may be such that whether two memory addresses correspond to the same cache line can be readily determined, thus allowing the address proximity condition to be checked quickly to identify whether the set of one or more subsequent load requests are comprised within the same cache line.

In order to determine quickly whether the address proximity condition is satisfied, the address proximity condition may be such that it is satisfied when an absolute difference between the address for the load request and the address for each of the set of one or more subsequent load requests is less than a predetermined threshold. The predetermined threshold may be based on the size of the series of data items that is retrieved by the load handling circuitry. Hence, to perform the address proximity check, the coalescing circuitry may perform a simple numerical calculation on the addresses specified by the load requests. For example, for each of the set of one or more subsequent load requests, the coalescing circuitry may subtract the address of the subsequent load request from the address of the load request, evaluate the magnitude of the result of the subtraction, and if the magnitude is less than a predetermined threshold for each of the one or more subsequent load requests, determine that the address proximity condition is satisfied.

Accordingly in some examples the coalescing circuitry is arranged, prior to determining whether the address proximity condition is satisfied, to determine for the set of one or more subsequent load requests buffered in the pending load buffer circuitry whether a tentative proximity condition is satisfied, wherein the coalescing circuitry is responsive to the tentative proximity condition being satisfied to forward the load request to the load handling circuitry and to provisionally suppress forwarding of the set of one or more subsequent load requests, and wherein the coalescing circuitry is responsive to the address proximity condition not being satisfied to cease provisionally suppressing forwarding of the set of one or more subsequent load requests.

Whilst the determination as to whether the set of one or more subsequent load requests correspond to the same series of data items may be performed in one stage, in some implementations, the coalescing circuitry may be arranged to perform a tentative proximity check to ascertain whether a tentative proximity condition is satisfied. In dependence on the result of the tentative proximity check, the coalescing circuitry can determine an initial indication of whether the address proximity condition will be satisfied. In some example implementations, this is achieved by comparing a portion of the address of the load request with a portion of the address of each of the set of one or more subsequent load requests. For example, by comparing a first portion of the addresses to determine whether a tentative proximity condition is satisfied, the coalescing circuitry may determine that the address proximity condition might be satisfied if the tentative proximity condition is satisfied. Therefore, before the address proximity condition is checked, the coalescing circuitry can provisionally suppress forwarding of the set of one or more subsequent load requests. This approach allows a provisional determination as to whether the load requests can be coalesced to be achieved quickly since only a portion of the addresses have to be considered.

Thus in some embodiments the tentative proximity condition is satisfied when a first portion of all addresses of the set of one or more subsequent load requests match a first portion of the address of the load request, and the address proximity condition is satisfied when the tentative proximity condition is satisfied and when a second portion of all addresses of the set of one or more subsequent load requests match a second portion of the address of the load request.

Having determined that the tentative proximity condition is satisfied, the coalescing circuitry then determines whether the address proximity condition is satisfied. If the coalescing circuitry determines that the address proximity condition is not satisfied, the coalescing circuitry may be arranged to cease provisionally suppressing forwarding of the one or more subsequent load requests since it has been identified that this set cannot be coalesced with the load request that is next to be forwarded to the load handling circuitry. However, by provisionally suppressing these requests in response to the tentative proximity condition being satisfied, the coalescing circuitry can proceed with handling the load request that is next to be processed without waiting for the address proximity condition to be carried out.

The tentative proximity condition may be based on a first portion of all addresses of the set of one or more subsequent load requests and a first portion of the address of the load request such that the tentative proximity condition is satisfied when all of these first portions match. Similarly, the address proximity condition may be satisfied when the tentative proximity condition is satisfied and when a second portion of all addresses of the set of one or more subsequent load requests match a second portion of the address of the load request. Hence, the comparison between load requests can be performed in stages with different portions of the addresses being considered in each stage.

In some example implementations, the first portion comprises fewer bits of the addresses than the second portion. In this way, a quick tentative proximity condition may be achieved as a preliminary indication as to the proximity of the addresses which is later refined to give an accurate result as to whether the address proximity condition is satisfied. A third portion of the addresses may not be used for comparison when checking the tentative proximity condition or the address proximity condition. This may be the case where the third portion indicates where in the series of data items the requested data item is and so regardless of the value of this third portion, if the first and second portions match, then all data items identified by the set of one or more subsequent load requests are comprised within the series of data items.

Whilst the decoalesing circuitry may identify that a set of subsequent requests has been coalesced with a load request in a number of ways including by referencing the pending load buffer circuitry, in some example implementations, the decoalesing circuitry receives an indication that coalescing has occurred from the coalescing circuitry. According to such example implementations, the coalescing circuitry is responsive to the address proximity condition being satisfied to provide a coalesced request indication to the decoalescing circuitry identifying the load request and the set of one or more subsequent load requests; and the decoalescing circuitry is responsive to the coalesced request indication to identify the one or more further data items based on the coalesced request indication. Hence the coalescing circuitry is responsive to the address proximity condition being satisfied to provide a coalesced request indication to the decoalescing circuitry identifying the load request and the set of one or more load requests. This provides the decoalescing circuitry with information that can be used to determine how the load requests are to be decoalesced. This is done because, in response to a series of data items retrieved by the load handling circuitry and a load request, the decoalesing circuitry may need to know whether the decoalescing circuitry is to output just the data item in the series of data items corresponding to the load request, or whether the load request has been coalesced with a set of subsequent load requests, and so the further data items identified by the set of subsequent load requests also need to be output.

The decoalescing circuitry is therefore responsive to the coalesced request indication to identify the one or more further data items which the decoalescing circuitry can then output as the results of the set of subsequent load requests.

In some example implementations the pending load buffer circuitry comprises a FIFO buffer, wherein the load request is an oldest load request in the FIFO buffer, and wherein the set of one or more subsequent load requests are younger load requests in the FIFO buffer. Thus the pending load buffer circuitry may comprise a first-in, first-out (FIFO) buffer whereby load requests are added to the buffer at the tail of the buffer and proceed to the head of the buffer. The coalescing circuitry is arranged to operate on the load request at the head of the buffer which is the oldest request in the FIFO buffer. Accordingly, the set of one or more subsequent load requests have been in the FIFO buffer for less time and so are younger load requests. Some example implementations of the techniques described herein make use of a FIFO buffer because this ensures that load requests do not end up staying in the pending load buffer circuitry for too long and because a FIFO buffer may represent a efficient way of providing a buffer that requires little overhead in terms of the storage needed and the operations to manage the buffer.

When the proximity condition is satisfied, the set of subsequent load requests is coalesced with the load request that is to be forwarded to the load handling circuitry. This means that the subsequent load requests are handled earlier than they would have been had they not been coalesced with the load request thereby changing the order in which the load requests are handled. If the only accesses to the memory system are the load requests, reordering the load requests does not pose a problem with respect to memory consistency because the data items do not change. However, the apparatus may be operating in a system whereby data items in the memory system can be modified. Therefore, the order in which operations is carried out does matter since, whether a load request is performed before or after a modification of the data item specified by the load request can affect the result of the load request.

Therefore, in some example implementations of the techniques described herein there the apparatus further comprises: hazard detection circuitry to detect an action relating to modification of the series of data items, and in response to detecting the action relating to modification of the series of data items to cause performance of a memory consistency operation to ensure that the load handling circuitry retrieving the series of data items and modifying the series of data items are performed in an order specified by a memory consistency protocol. Accordingly hazard detection circuitry may be provided to detect an action relating to modification of the series of data items. The hazard detection circuitry may therefore identify either when another apparatus is requesting to be able to modify the series of data items or another operation in a process being carried out by the apparatus is going to modify the series of data items. As used herein, modification of a series of data items refers to modifying at least one of the data items in the series of data items, and so the action relating to modification of the series of data items may, for example, be a request by another apparatus for performing data processing operations to write to one of the data items. In this case, it is important to ensure that the apparatuses maintain a consistent, coherent view as to the ordering in which the requests are carried out. Another example of the action relating to modification of the series of data items is a write request occurring in the apparatus from the same process as the load request. It is important to have the load requests and write requests performed in the correct (program defined) order since otherwise the program could yield unexpected or incorrect results if requests relating to the same data item are handled in the wrong order.

To address this issue and ensure that a consistent view of the memory access ordering is maintained, hazard detection circuitry is responsive to detecting the action relating to modification of the series of data items to cause performance of a memory consistency operation to ensure that the load handling circuitry retrieving the series of data items and modifying the series of data items are performed in an order specified by a memory consistency protocol. There is a memory consistency protocol to define the expected order in which the operations of retrieving the series of data items and modifying the series of data items are carried out and based on this protocol, the hazard detection circuitry is arranged to cause performance of a memory consistency operation. Causing performance may involve performing the memory consistency operation by the hazard detection circuitry itself or causing the memory consistency operation to be performed elsewhere. In this way, the hazard detection circuitry is able to detect the hazard and take actions to avoid a memory consistency issue occurring.

One example of the memory consistency operation that could be performed involves reinstating the load request in the pending load buffer circuitry and preventing forwarding of the load request to the load handling circuitry until after the modification of the series of data items has been completed. Accordingly in some embodiments the memory consistency operation comprises: reinstating the load request in the pending load buffer circuitry and preventing forwarding of the load request to the load handling circuitry until after the modification of the series of data items has been completed; and preventing the decoalescing circuitry returning as the result of the load request the data item from the series of data items, when the series of data items was retrieved before the operation to modify the series of data items had completed.

This leads to the load request being replayed from the pending load buffer circuitry. Hence, in response to the action relating to modification, the modification can be allowed to take place with the load request replayed, so that the retrieval of the series of data items is performed after the modification of the series of data items. In this way, a consistent way of handling data hazards can be implemented and so the accuracy of the data processing operations performed by the apparatus can be maintained.

The hazard may be detected by the hazard detection circuitry after the series of data items identified by the load request has been retrieved by the load handling circuitry. In order to comply with the scheme by which the load request is reinstated in the pending load buffer circuitry, if the series of data items identified by the load request has been retrieved from the memory system before the operation to modify the series of data items has completed, the memory consistency operation involves preventing the decoalescing circuitry returning the data item from the series of data items as the result of the load request thereby ensuring that the result of the load request corresponds to a series of data items retrieved after the operation to modify the series of data items has completed.

In some example implementations, reinstating the load request in the pending load buffer comprises adding the load request to the pending load buffer. Particularly, this may be the case in example implementations whereby forwarding the load request from the pending load buffer circuitry to the load handling circuitry involves removing the load request from the pending load buffer circuitry. Therefore, in order to reinstate the load request, the load request is re-added to the pending load buffer circuitry. The load request may be added in the same manner as load requests for which the address generation circuitry has just generated the address or the load request may be added differently. For example, it may be desired that the passage of the load request through the pending load buffer circuitry is expedited in the case where the load request is added due to a hazard. As such, the load request may be added at a position in the pending load buffer circuitry that will cause it to be forwarded to the load handling circuitry again quicker than if it were to be added again from the address generation circuitry. This approach may avoid a situation whereby the load request is delayed from being handled for too long since that could lead to a stall or delay in the processing operations of the apparatus.

In some example implementations, the action relating to modification of the series of data items may be a write notification issued by a further apparatus. The apparatus for performing data processing operations may be just one core or central processing unit (CPU), with wider apparatus or system comprising more than one core or CPU. The further apparatus may thus be another core or CPU. If the further apparatus is attempting to write to the series of data items, it may issue a write notification to indicate that it is requesting to perform a write operation. Thus in some example implementations, the action relating to modification of the series of data items is a write notification issued by a further apparatus, and the apparatus is responsive to detecting the write notification to delay sending an acknowledgement for the write notification until after the series of data items has been retrieved by the load handling circuitry, wherein the acknowledgement signals permission to proceed with the modification of the series of data items. Hence the apparatus is arranged to respond to the write notification with an acknowledgement which signals to the further apparatus that it may proceed with the modification. The write notification and acknowledgement may be transmitted over an interconnect implemented on the core and providing an interface between the core and the memory system. To ensure memory consistency, the memory consistency operation in example implementations making use of the write notification described above involves delaying the sending of the acknowledgement in response to detecting the write notification. By doing this, since the further apparatus is waiting for the acknowledgement to proceed with modification of the series of data items, the apparatus can ensure that series of data items is retrieved by the load handling circuitry before the further apparatus proceeds with modification of the series of data items. Hence, this approach provides a means by which memory consistency can be ensured in a case where external apparatuses are attempting to modify the data being loaded.

To improve the chance of finding a set of one or more subsequent load requests in the pending load buffer circuitry for which the address proximity condition is satisfied, it may be desirable to provide pending load buffer circuitry storing many pending load requests. By storing more pending load requests, the frequency at which load requests being forwarded to the load handling circuitry can be coalesced with subsequent load requests can be increased since there are more load requests in the pending load buffer circuitry that could match with the load request. In some example implementations, the apparatus comprises an out-of-order processor arranged to execute instructions in an order other than the order in which the instructions are received. Such out-of-order processors may be more susceptible to the reordering of load requests that occurs in the process of coalescing load request and that may occur during the address generation stage. The out-of-order processor may be arranged to operate with a large instruction window to increase the number of load requests in the pending load buffer circuitry and thereby increase the chance that a given load request can be coalesced with a set of one or more subsequent load requests.

Data processing apparatuses are particularly vulnerable to delays or stalls occurring due to load operations in comparison with the other operations that may be performed by the apparatus. This is because in order to perform subsequent operations, it may be necessary to have first performed certain other operations such that if those operations have not been completed, the apparatus must wait until the result of the operations has been obtained. For certain types of operations such as calculations involving operands in registers in the processor, the operation may be carried out readily without having to wait for an external device such as a memory system. For write operations, these may be performed by instructing the memory system to perform the write with the write not actually needing to have been completed before the processor can proceed to the next operation. However, for load operations, to carry out the load the processor needs to wait for the result to be retrieved from the memory system which may take a long time. In some example implementations the apparatus comprises an out-of-order processor to perform the data processing operations. Therefore, an out-of-order processor which is arranged to perform data processing operations other than loading items from the memory system may be arranged to prioritise the data processing operations comprising loading data items from a memory system over the data processing operations other than loading data items form the memory system.

One type of out-of-order processor that may be arranged to operate according to the techniques described herein is a decoupled access-execute (DAE) processor. In a DAE processor, instructions are separated into "access" instructions and "execute" instructions according to their dependencies. In particular, in a DAE processor this instruction categorisation is linked to the identification of load instructions and chains or graphs of instructions linked by their data dependencies which lead to a load instruction. If it is determined that an instruction is either a load instruction or is required in order to carry out a load instruction (because it provides an operand of a load instruction), then it is designated as an access instruction. Indeed any instruction which provides a source operand of an instruction which provides a source operand of a load instruction is designated as an access instruction, thus building up such chains/data graphs. Otherwise the instruction is deemed to be an execute instruction. The DAE processor is arranged then to process these two types of instructions as separate instruction streams, in separate execution circuitry. Notably, the execution of access instructions is prioritised over the execution of execute instructions, to seek to allow load instructions to begin execution as soon as possible, so that if access to memory is required (i.e. typically when there is a cache miss), the latency associated therewith can be "hidden" to as great an extent as possible. Such techniques are described in more detail elsewhere herein. The present techniques of load coalescing may be applied in the context of a DAE processor as part of the manner in which it handles load requests, since these may be identified in advance of the results of the load request being needed. Therefore, a large instruction window of load requests may be present from which to select load requests to coalesce leading to an even more effective application of the coalescing techniques described herein.

In some example implementations, to keep track of the status of load request, the pending load buffer circuitry is arranged to store a status indicator for each of the load requests buffered in the pending load buffer circuitry. The status indicator can take one of a number of states so as to indicate at what stage of the process of being handled the load request is. By storing a status indicator, an effective way to keep track of load requests propagating through the apparatus is provided without having to implement dedicated circuitry to perform this tracking.

The status indicator for load requests received from the address generation circuitry may be initially set to indicate a valid state. The status indicator may be implemented as a series of bits stored with the load request with the value of the bits being indicative of the state. In response to the address proximity condition being satisfied, the status indicator corresponding to the set of one or more subsequent load requests is set to indicate an invalid state and the coalescing circuitry is arranged to be responsive to an invalid load request to suppress forwarding of the invalid load request. In this way, the status indicator provides a mechanism for preventing the load handling circuitry from retrieving a series of data items based on the subsequent load requests since these subsequent requests are to be coalesced. Therefore, the subsequent load requests can be left in the pending load buffer circuitry when it is identified that they can be coalesced whilst still ensuring that these subsequent requests do not delay the operation of the load handling circuitry unnecessarily. The status indicator may also be used to handle more complicated behaviour of the apparatus such as the reinstating the load request, performing a two-stage proximity check, and handling hazard detection discussed above.

Thus in some example implementations the pending load buffer circuitry is arranged to store for each of the load requests buffered in the pending load buffer circuitry a status indicator, wherein the status indicator for load requests received from the address generation circuitry is initially set to indicate a valid state, wherein in response to the address proximity condition being satisfied the status indicator corresponding to the set of one or more subsequent load requests is set to indicate an invalid state, and the coalescing circuitry is responsive to an invalid load request in the pending load buffer circuitry to suppress forwarding of the invalid load request.

In example implementations making use of a tentative proximity condition as discussed above, the status indicator may be set to a hold state for the one or more subsequent load requests in response to the tentative proximity condition being satisfied. The tentative proximity condition being satisfied indicates that the address proximity condition might be satisfied and so it may be appropriate for the set of subsequent load requests to be coalesced. Hence, until it is determined whether the address proximity condition is satisfied, the coalescing circuitry may suppress forwarding of the set of one or more subsequent load requests by being responsive to the hold state to provisionally suppress forwarding of those load requests. If it is later determined that the address proximity condition is not satisfied for the set of subsequent load requests, the status indicator may be reset to the valid state so as to enable the coalescing circuitry to forward these load requests to the load handling or to coalesce these requests with another request that is next to be forwarded to the load handling circuitry. Thus in some such implementations, in response to the tentative proximity condition being satisfied the status indicator for the set of one or more subsequent load requests is set to indicate a hold state, wherein the coalescing circuitry is responsive to a load request having the hold state in the pending load buffer circuitry to provisionally suppress forwarding of the load request having the hold state, and wherein in response to the address proximity condition not being satisfied the status indicator corresponding to the set of one or more subsequent load requests is reset to the valid state.

In example implementations in which a load request is reinstated in the pending load buffer circuitry in response to a hazard being detected, when a load request is forwarded, the status indicator of the load request is set to indicate an in-flight state. This in-flight state indicates that the load request has been sent on from the pending load buffer circuitry and so the coalescing circuitry does not need to consider the in-flight load request for forwarding to the load handling circuitry or coalescing with another load request. When the decoalescing circuitry has returned the result of the in-flight load request, the status indicator for that load request is set to the invalid state thereby indicating that the load request is not to be forwarded to the load handling circuitry and instead may be removed from the pending load buffer circuitry. In such an implementation, if a hazard is detected and the load request is to be reinstated in the pending load buffer circuitry, this may be achieved by resetting the status indicator corresponding to the load request to valid state so that the coalescing circuitry will consider the load request for forwarding. Thus in some such implementations, when the load request is forwarded the status indicator of the load request is set to indicate an in-flight state, wherein in response to the decoalescing circuitry returning as the result of the load request the data item identified by the load request, the status indicator corresponding to the load request is set to the invalid state, and wherein reinstating the load request in the pending load buffer comprises resetting the status indicator corresponding to the load request to the valid state.

In some embodiments the apparatus further comprises an out-of-order processor to perform the data processing operations.

In some embodiments the data processing operations further comprise data processing operations other than loading data items from the memory system, wherein the apparatus is arranged to prioritise the data processing operations comprising loading data items from a memory system over the data processing operations other than loading data items from the memory system.

In some embodiments the out-of-order processor is a decoupled access-execute processor.

In at least one example embodiment there is provided a method of operating an apparatus to perform data processing operations, the data processing operations comprising loading data items from a memory system, the method comprising: generating addresses for load requests; buffering in pending load buffer circuitry the load requests prior to load handling circuitry carrying out the load requests to retrieve data items using the addresses of the load requests; forwarding to the load handling circuitry a load request buffered in the pending load buffer circuitry a load request to retrieve from the memory system a series of data items comprising the data item identified by the load request; determining for a set of one or more subsequent load requests buffered in the pending load buffer circuitry whether an address proximity condition is satisfied, wherein the address proximity condition is satisfied when all data items identified by the set of one or more subsequent load requests are comprised within the series of data items, suppressing, responsive to the address proximity condition being satisfied, forwarding of the set of one or more subsequent load requests to the load handling circuitry; retrieving, responsive to the load request, from the memory system the series of data items comprising the data item identified by the load request; receiving the series of data items retrieved and returning as the result of the load request the data item identified by the load request; and returning, responsive to the address proximity condition being satisfied, for each of the subsequent load requests in the set of one or more subsequent load requests, one or more further data items identified by the one or more subsequent load requests from the series of data items as the results of the one or more subsequent load requests.

In at least one example embodiment there is provided an apparatus to perform data processing operations, the data processing operations comprising loading data items from a memory system, the apparatus comprising: means for generating addresses for load requests; means for buffering the load requests prior to means for handling loads carrying out the load requests to retrieve data items using the addresses of the load requests; means for forwarding to the means for handling loads a load request buffered in the means for buffering a load request to retrieve from the memory system a series of data items comprising the data item identified by the load request, wherein the means for handling loads is responsive to the load request, to retrieve from the memory system the series of data items comprising the data item identified by the load request; means for determining for a set of one or more subsequent load requests buffered in the means for buffering whether an address proximity condition is satisfied, wherein the address proximity condition is satisfied when all data items identified by the set of one or more subsequent load requests are comprised within the series of data items, means for suppressing, responsive to the address proximity condition being satisfied, forwarding of the set of one or more subsequent load requests to the means for handling loads, means for receiving the series of data items retrieved and for returning as the result of the load request the data item identified by the load request; and means for returning, in response to the address proximity condition being satisfied, for each of the subsequent load requests in the set of one or more subsequent load requests, one or more further data items identified by the one or more subsequent load requests from the series of data items as the results of the one or more subsequent load requests.

Specific implementations will now be described with respect to the figures.

FIG. 1A shows a scenario which demonstrates a context in which the present techniques are particularly relevant. This figure shows (at the left hand side) a sequence of instructions comprising both access (A1, A2, etc.) and execute (E1, E2, etc) instructions which are received by a prior art processor in a single stream interleaved as shown. Suppose that the access instruction A3 is a "load" instruction which provides information required by the execute instruction E1. If the access instruction A3 triggers a cache miss, the sequence of execute instructions beginning with E1 will be stalled, until the data requested is delivered by the memory system. This has the further negative consequence that the whole pipeline then fills with stalled execute instructions, limiting its speculation depth, and eventually forcing it to stall.

Figure 1B:
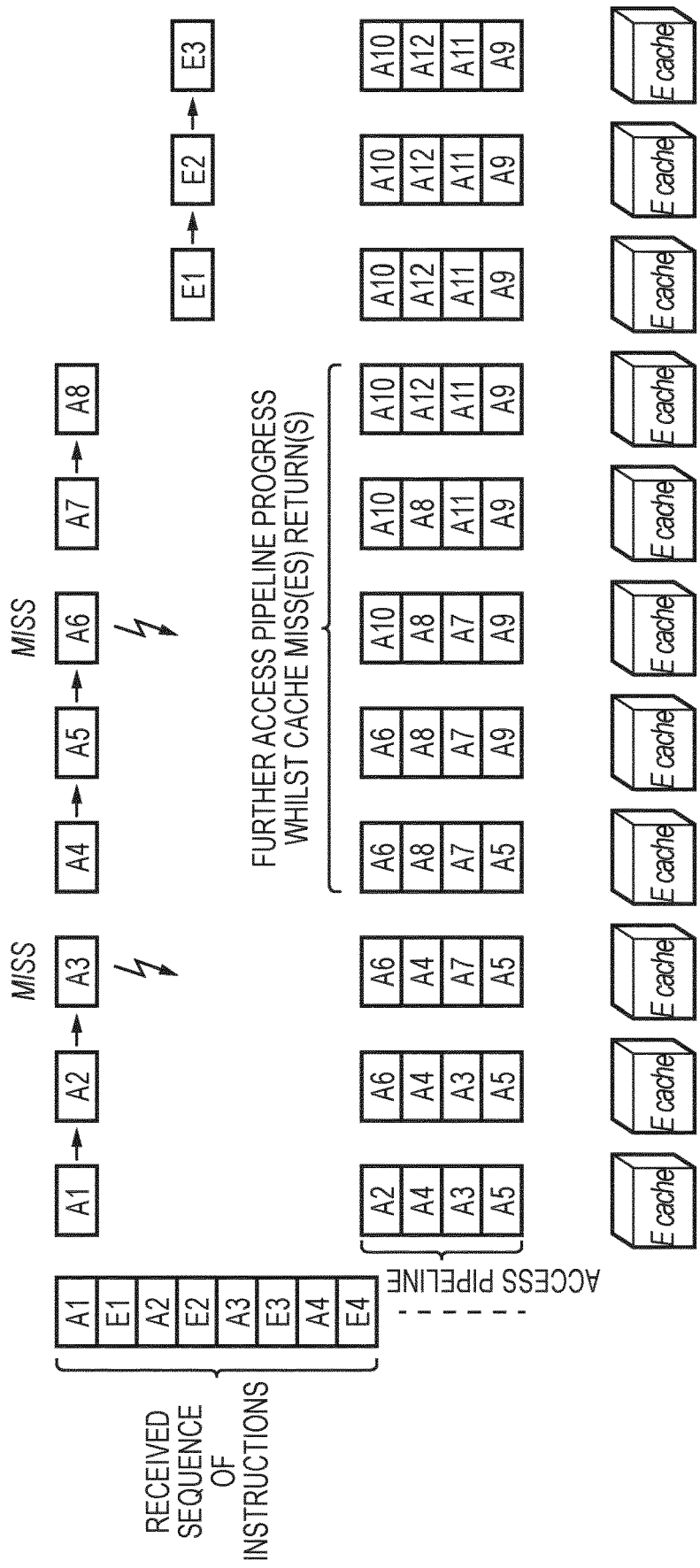
FIG. 1B illustrates the same sequence of instructions being received by a processor according to some embodiments, where prioritising execution of the access instruction and deferring execute instructions allows greater instruction execution progress to be made.

FIG. 1B shows the applicability of the present techniques to the same context, in which the same sequence of instructions comprising both access (A1, A2, etc.) and execute (E1, E2, etc) instructions is received by a processor according to the present techniques. Here the pipeline shown belongs to the "access" pipeline portion of the processor, and it can be seen that by prioritising access instructions (being handled in the access pipeline shown) and by deferring the execute instructions (E1-E3, which may then be handled by an "execute" pipeline portion of the processor (not shown), the full processor is able to execute more instructions during the time it takes to access the data which instruction E1 is waiting for. In fact, if the access portion of the program is able to uncover another potentially long latency event (e.g. cache miss) when A6 is executed, for example, then the cost of this "miss" is amortized by initiating the data access in advance of the point at which it would normally occur. Note that execute instructions are deferred by placing them in a temporary storage area or cache ("E cache" in the figure) designed to remain passive for several cycles until data arrives.

Figure 2:
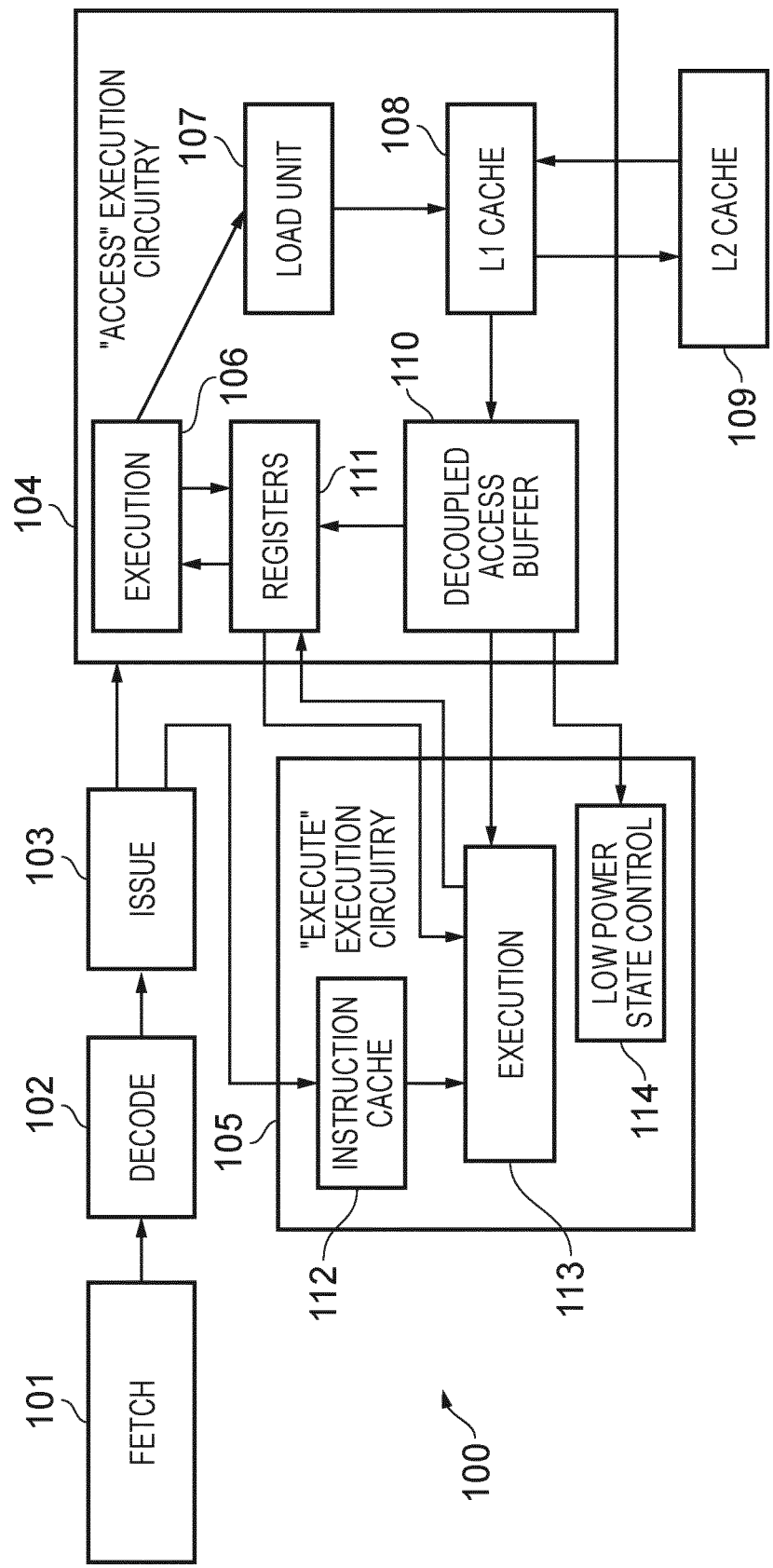
FIG. 2 schematically illustrates a data processing apparatus in some embodiments.
Figure 8A:
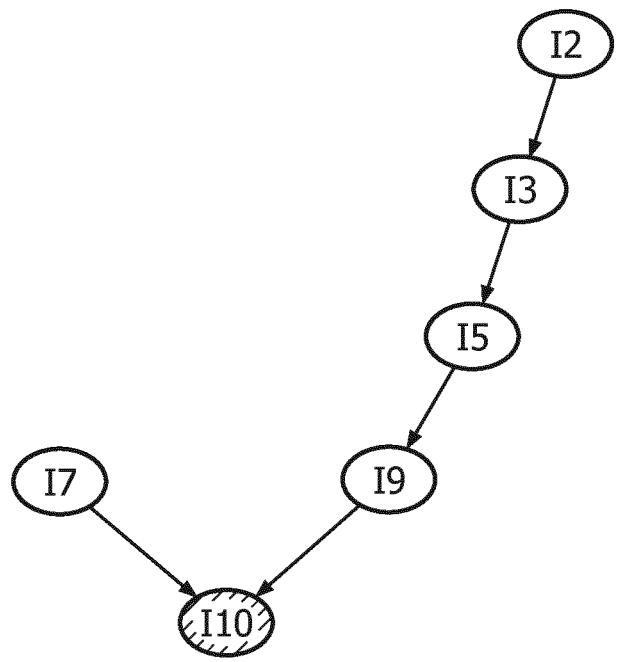
FIG. 8A and FIG. 8B show data dependency graphs for an example sequence of instructions, where
Figure 8B:
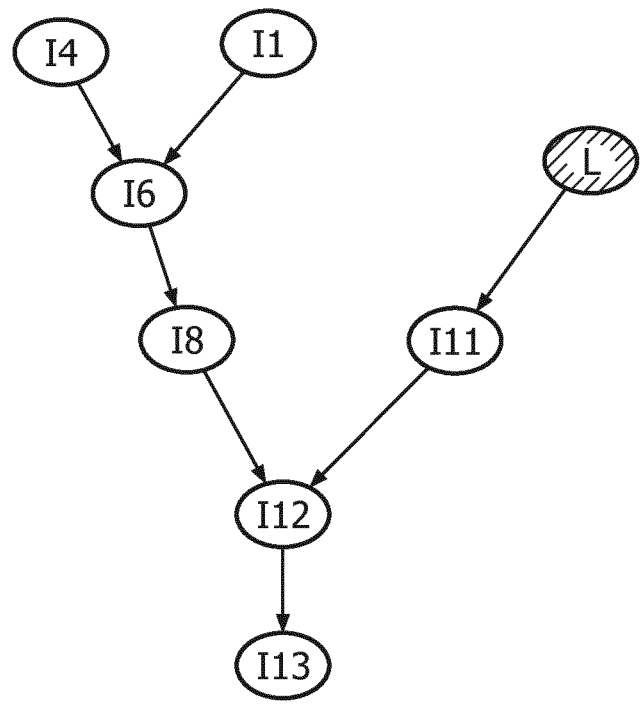

FIG. 2 schematically illustrates a data processing apparatus according to some embodiments. A single set of "front end" circuitry, comprising fetch circuitry 101 and decode circuitry 102, is provided which retrieves and decodes an ordered sequence of instructions which the data processing apparatus is to execute. Decoded instructions are passed to the issue circuitry 103. The issue circuitry 103, in accordance with the present techniques, is arranged to identify labelling associated with at least some of the instructions in the received ordered sequence of instructions. In particular, the issue circuitry 103 responds to the identification of an "access" label associated with an instruction to issue this instruction to the access execution circuitry 104 for execution. Conversely, instructions which do not have the "access" label are directed to the "execute" execution circuitry 105 for execution. Whilst in some examples there may be two explicit types of label, in the illustrated example in fact there is only the access label. Hence instructions with this label are directed to the access execution circuitry 104 and conversely any instructions without the access label are directed to the execute execution circuitry 105. The access label is associated with all access-related instructions which determine at least one characteristic of a load operation to retrieve a data value from a specified memory address. FIGS. 8A and 8B and their associated description illustrate the definition of an access instruction according to the present techniques, where it can be seen that an access dependency graph includes all instructions which lead to a terminal node which represents a load instruction.

The access execution circuitry comprises an execution portion 106, which may for example be arranged in a pipelined manner. It will be recognised that the schematic illustration of FIG. 2 is only at a high level of abstraction, in order to provide an overview of the general principle of construction of the data processing apparatus 100. Of particular note, however, in the access execution circuitry 104 is the load unit 107 to which a load operation defined by a load instruction executed by the execution portion 106 is delegated. Such a load operation first accesses the L1 cache 108 which also forms part of the access execution circuitry 104 and (should the access miss there) may pass further out to the L2 cache 109 (and potentially further into the memory system). Data values returned from the memory system and/or cache hierarchy enter the L1 cache 108 and data values returned by the cache subsystem are placed into the decoupled access buffer 110, which forms part of the access execution circuitry 104. These values may also be provided into the registers 111 which the execution portion 106 accesses as part of the data processing operation which it carries out.

Instructions which do not have the "access" label are issued by the issue circuitry 103 to the execute execution circuitry 105. The instructions received are temporarily held in the instruction cache 112, enabling these instructions to be delayed, whilst the parallel execution of the access instructions is prioritised and proceeds in the access execution circuitry 104. The decoupled access buffer 110 is arranged to send certain signals regarding its content to the execute execution circuitry 104. Thus, when a data item retrieved from memory by the action of a load operation becomes available in the decoupled access buffer 110, this fact can be signalled to the execution portion 113 of the execute execution circuitry 105 which can then make use of that value in executing a particular instruction. The execution portion 113 may also make use of values held in the registers 111 and conversely, as a result of its own data processing operations, cause certain updates to be made to the content of the registers 111. Where the data processing of the execute execution circuitry 105 is dependent on the processing carried out by the access execution circuitry 104, a further feature of the example embodiments shown in FIG. 2 is the provision of the low power state controlled circuitry 114 of the execute execution circuitry 105. This receives a notification from the decoupled access buffer 110 when the decoupled access buffer 110 drains (becomes empty) and in response to this the low power state control 114 causes the execute execution circuitry 105 to enter an inactive, low power (or low frequency of operation) state. Conversely, when the decoupled access buffer 110 has content once more, the low power state control 114 can cause the execute execution circuitry 105 to become active again (i.e. fully powered or operate at a higher frequency than before) and begin further instruction execution. Whilst the execute execution circuitry 105 could be woken up in this manner as soon as there is any content in the decoupled access buffer 110, in the example of FIG. 2, the decoupled access buffer 110 signals to the low power state control 114 when its content meets a predetermined threshold content (i.e. minimum content), such that the power saving advantage of operating the execute execution circuitry 105 in this manner is improved and it is only woken up in order to continue instruction execution once there is a sufficient number of data values available in the decoupled access buffer 110. The particular level of this threshold can be set as an implementation detail, depending on the system requirements.

Figure 3:
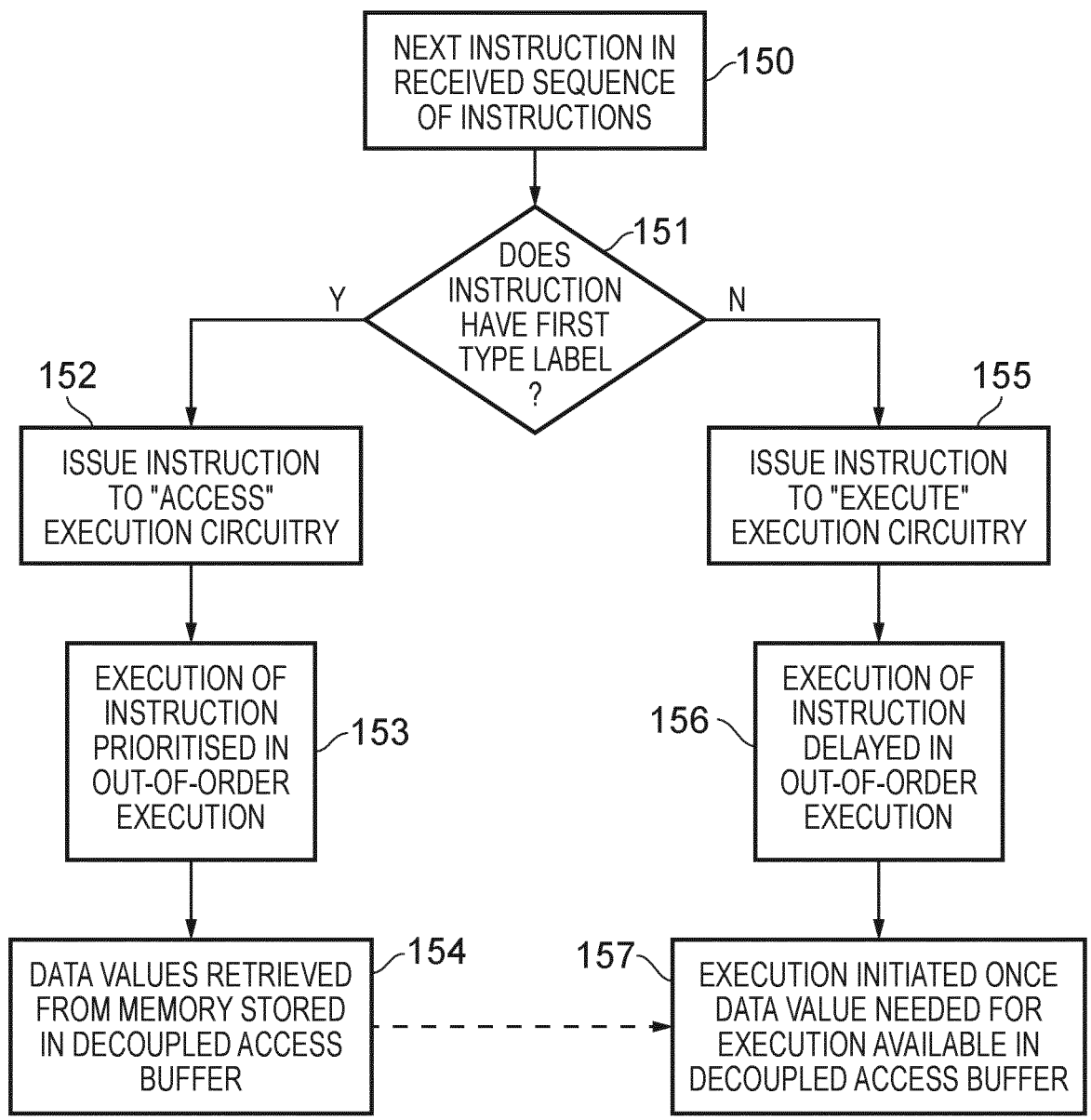
FIG. 3 shows a sequence of steps which are taken in a processor according to the method of some embodiments.

FIG. 3 is a flow diagram showing a sequence of steps which are taken according to the method of some embodiments. In particular FIG. 3 shows the manner in which instructions within a received sequence of instructions are handled according to the present techniques. The flow begins at step 150 where the next instruction in a received sequence of instructions is considered. It is determined at step 151 whether or not the instruction has the first type ("access") label. When it does, the flow proceeds to step 152 where the instruction is issued to the access execution circuitry. Then at step 153 the execution of the instruction is prioritised in the out-of-order execution of instructions performed by the access execution circuitry. Then at step 154, when one or more data values retrieved from the memory system are returned, this value or these values are stored in the decoupled access buffer. If however at step 151 it is found that the instruction does not have the first type label, then the flow proceeds to step 155 where the instruction is issued to the execute execution circuitry. Then at step 156 this instruction is delayed, (for example being held in an instruction cache or buffer) as part of the out-of-order instruction execution performed by the execute execution circuitry. Once a data value required for this instruction becomes available in the decoupled access buffer, at step 155 its execution is initiated. For example, when the instruction is held in the execute instruction execution circuitry, the presence of its required data value in the decoupled access buffer can be used to trigger its execution. Note that the dashed path from step 154 to step 157 indicates the dependency of step 157 on actions resulting from the other path, but this is not a true step in the procedural flow illustrated.

Figure 4:
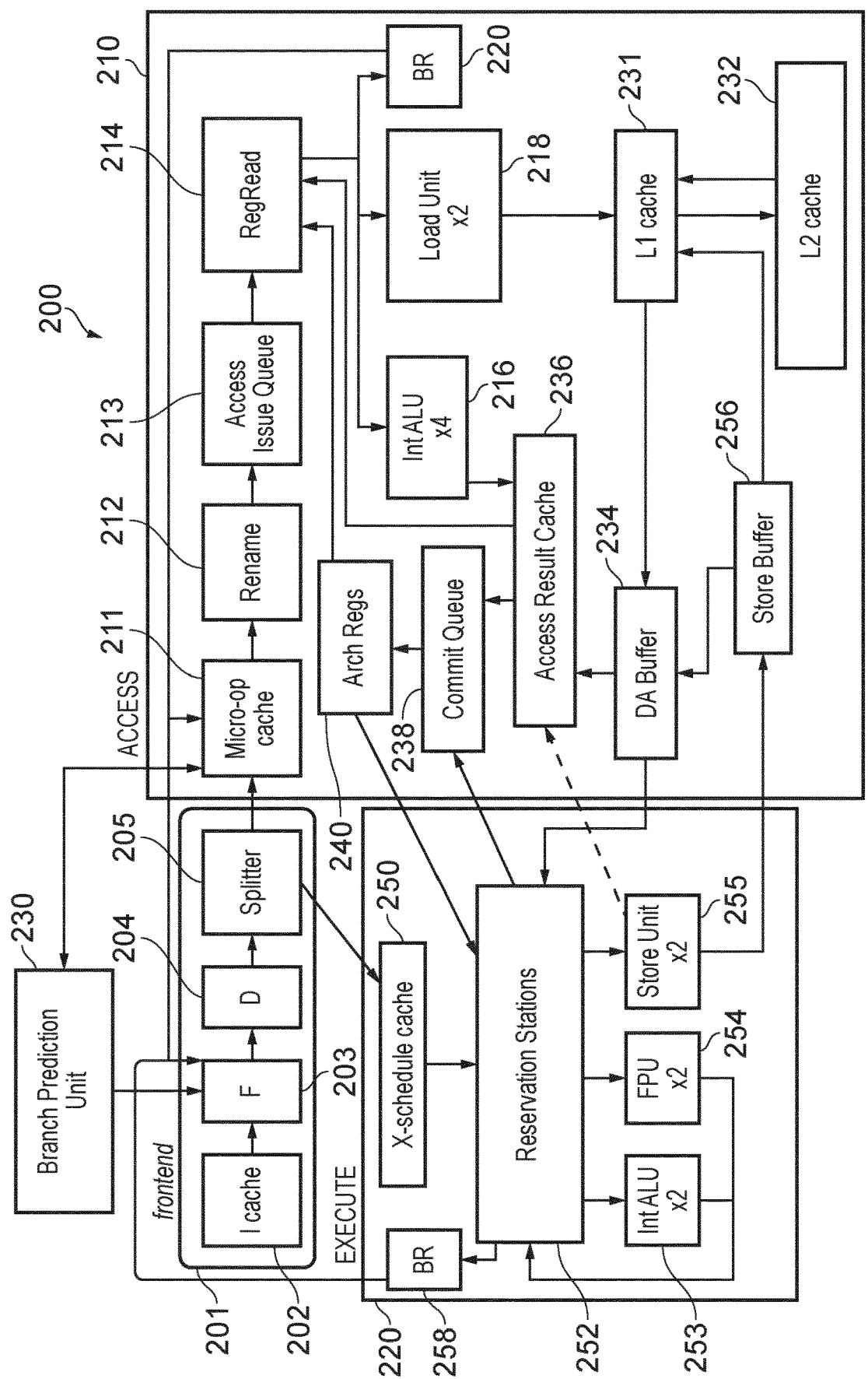
FIG. 4 schematically illustrates a data processing apparatus in some embodiments.

FIG. 4 schematically illustrates an example data processing apparatus 200 according to some embodiments. A single set of front end circuitry 201 comprises an instruction cache 202, fetch circuitry 203, decode circuitry 204, and splitter 205. Accordingly, the received ordered sequence of instructions reach the splitter 205, which then is arranged to direct the instructions either to the access circuitry 210 or the execute circuitry 220 in dependence on whether the instruction has an associated "access" label or not. When it does the instruction passes into the access circuitry 210, the first stages of which are shown to be the micro-op cache 211, the rename circuitry 212, the issue queue 213, and the register read stage 214. These pipelined components are arranged in a manner with which one of ordinary skill in the art will be familiar and are not described in detail here. Further, from the register read stage 214, depending on the nature of the instruction, corresponding signals pass to the integer ALU units 216, the load units 218, and/or the branch resolution (BR) unit 220. It will therefore be appreciated that the access circuitry 210 is capable of executing a variety of types of instruction (notably not only load instructions) and indeed the particular execution units 216, 218 as shown in FIG. 2 are merely examples and other execution units could be provided. The results of branch resolutions (as determined in the BR unit 220) are passed back to the fetch unit 203 and the micro-op cache 211. Note further that the data processing apparatus 200 is also provided with a branch prediction unit 230, which interacts with the content of the micro-op cache 211 and indicates to the fetch unit 203 when it is predicted that a branch will be taken and a corresponding jump in the fetched instructions should be implemented.

The integer ALU units 216 perform their data processing operations with respect to values held in registers of the access portion 210, which may have been retrieved from the cache/memory system. The retrieval of these values from memory (by the action of load operations) is carried out by the load units 218 and FIG. 4 illustrates the interaction of these load units with a L1 cache 231, which forms part of a cache hierarchy including an L2 cache 232. Further cache levels may also be provided leading into the memory system (not shown). Values returned from the cache/memory system are caused to be stored in the decoupled access (DA) buffer 234. With reference to the above-referenced data processing operations of the integer ALU units 216, these results also feed into the access result cache 236 to which the integer ALU units 216 have access as part of performing their data processing operations. Modifications to these values which are performed are passed into a commit queue 238, before being applied to the registers 240 of the data processing apparatus 200.

Instructions which are received in the ordered sequence of instructions and do not have the access label are passed from the splitter 205 to the execute circuitry 220. In particular they are first received in the X-schedule cache 250, where they are held in order to be delayed with respect to the access instructions which are prioritised in their execution in the access circuitry 210. The execute instructions may be held in the X-schedule cache 250 in a compact, pre-execution form, i.e. not fully unpacked and expanded as they will finally be when executed, in order to allow a compact provision of this cache 250. The execute circuitry 220 comprises reservation stations 252 which enable it to administer its own out-of-order execution of instructions and in particular to keep track of instruction dependencies and operand availability. The execute circuitry 220 also comprises two integer ALU units 253 and two floating point units (FPU) 254, as well as two store units 255. In executing its instructions the execute circuitry 220 is therefore arranged such that values required by the ALUs 253 and the FPUs 254 are received from the reservation stations 252 and the results of data processing performed by these units are passed back to the reservation stations 252. The execute circuitry 220 also comprises a branch resolution (BR) unit 258, which like the BR unit 220 of the access circuitry 210 signals to the fetch circuitry 203 of the front end circuitry 201.

The reservation stations 252 pass result values to the commit queue 238 of the access circuitry 210 in order for register values to be updated. Data values which are to be written out to memory are passed from the reservation station 252 to the store units 255. Store transactions initiated by the store units 255 are temporarily buffered in a store buffer 256 of the access circuitry 210. This enables write data to be buffered until the store is "committed". This also provides a window of opportunity to identify cases where the address of a store transaction matches that of load which has brought a value into the decoupled access buffer 234. Updates which could cause a data hazard (i.e. a collision between a younger load and an older store) are identified, such that remedial action can be taken and this feature is discussed in more detail with reference to FIG. 5 below.

Figure 5:
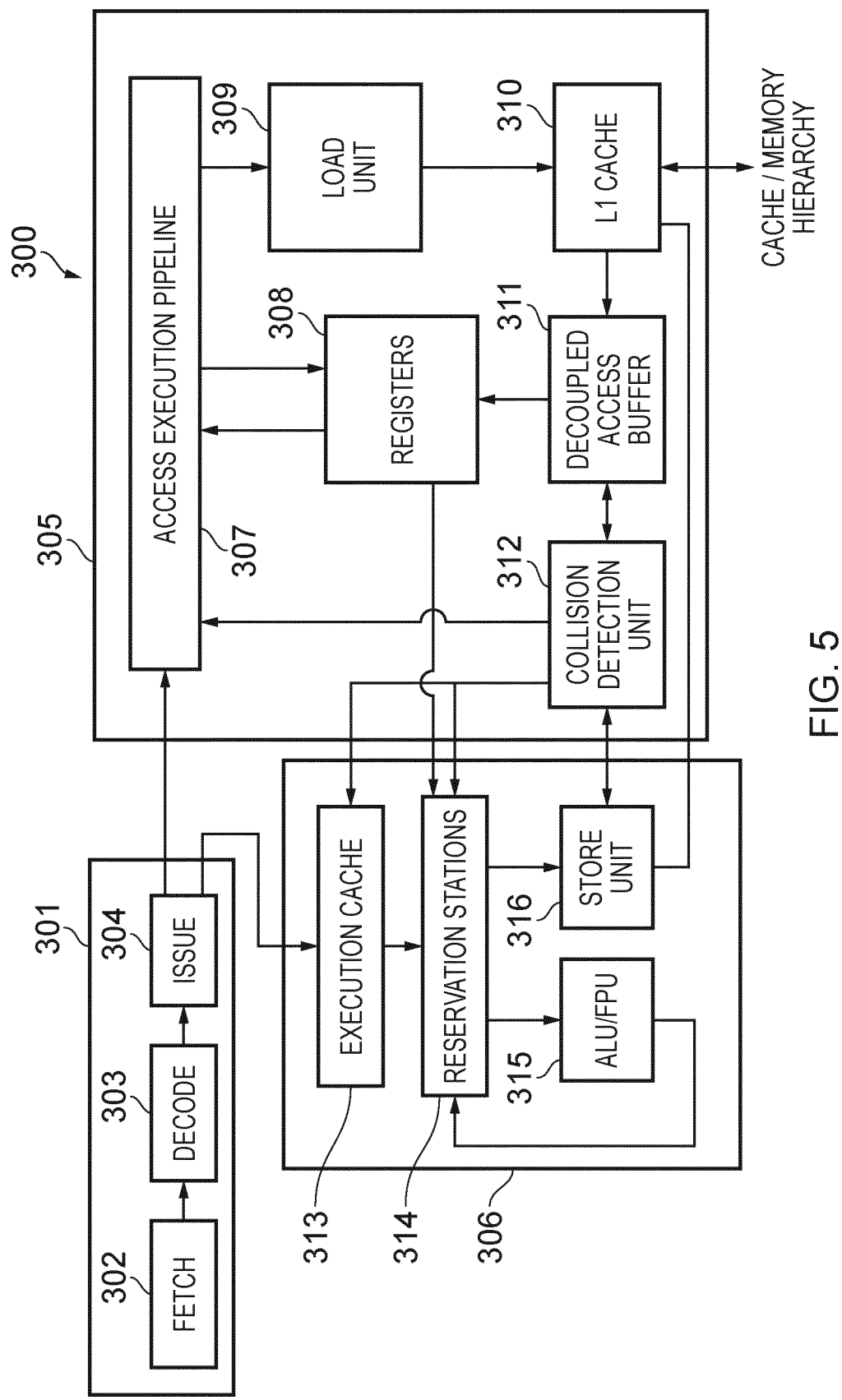
FIG. 5 schematically illustrates a data processing apparatus in some embodiments.

FIG. 5 schematically illustrates a data processing apparatus 300 in some example embodiments. The data processing apparatus 300 comprises front end circuitry 301, which itself comprises fetch circuitry 302, decode circuitry 303, and issue circuitry 304. In the manner discussed above, the issue circuitry 304 identifies certain instructions with an "access" label associated with them and issues these to the access circuitry 305, whilst other instructions are issued the execute circuitry 306. FIG. 5 is based on the example of FIG. 4, although not all components are illustrated, merely to facilitate clarity of discussion in this example. Instructions received by the access circuitry 305 enter its execution pipeline 307, which performs various data processing operations, some of which involve interaction with the registers 308, and some of which cause the load unit 309 to initiate load transactions with the cache/memory system. In the illustration of FIG. 5 only the L1 cache 310 is shown. Data values returned from the cache/memory hierarchy are passed to the decoupled access buffer 311 and from there some of these values may cause updates to values held in the registers 308 (e.g. via various stages, such as a commit queue—see FIG. 4). A particular focus of the discussion of FIG. 5 is the provision of the collision detection unit 312, which is described in more detail below. The execute circuitry 306 comprises an execution cache 313, reservation stations 314, ALU/FPU units 315, and a store unit 316. The manner in which the execute circuitry 306 operates is essentially the same as that described above for the execute circuitry 220 of FIG. 4 and is not repeated here for brevity. The collision detection unit 312 also interacts with the store unit 316 and in particular is arranged to identify the above-mentioned situation which could result in a data hazard, namely when a collision occurs between a younger load which has been prioritised in the execution carried out by the access circuitry 305 and older store instruction carried out by the execute circuitry 306. When these respective load and store operations concern the same memory address, the possibility for a data hazard occurs, namely where in program order the store should have been carried out before the load, but the ordering has been disrupted by the prioritisation of the load operation according to the present techniques. Moreover where the store and load have been executed in separate, largely independent execution units, namely execute circuitry 306 and access circuitry 305, the mechanisms which would usually avoid such a data hazard within an individual out-of-order processing unit may not suffice.

The particular manner in which the collision detection unit 312 operates is described below in more detail with reference to FIGS. 6 and 7, but when such a data hazard situation is identified, the collision detection unit is arranged to signal this to various parts of the data processing apparatus 300, including the access execution pipeline 307 and the execution cache 313/reservation stations 314, since various instructions will need to be flushed from the respective pipelines and some instructions will need to be re-executed. In some embodiments the data processing apparatus 300 is arranged such that only the load instruction and any subsequent instructions are flushed, but simpler embodiments provide that a full flush of the respective pipelines is triggered when such a data hazard condition is identified, due to simplicity of implementation.

Figure 6:
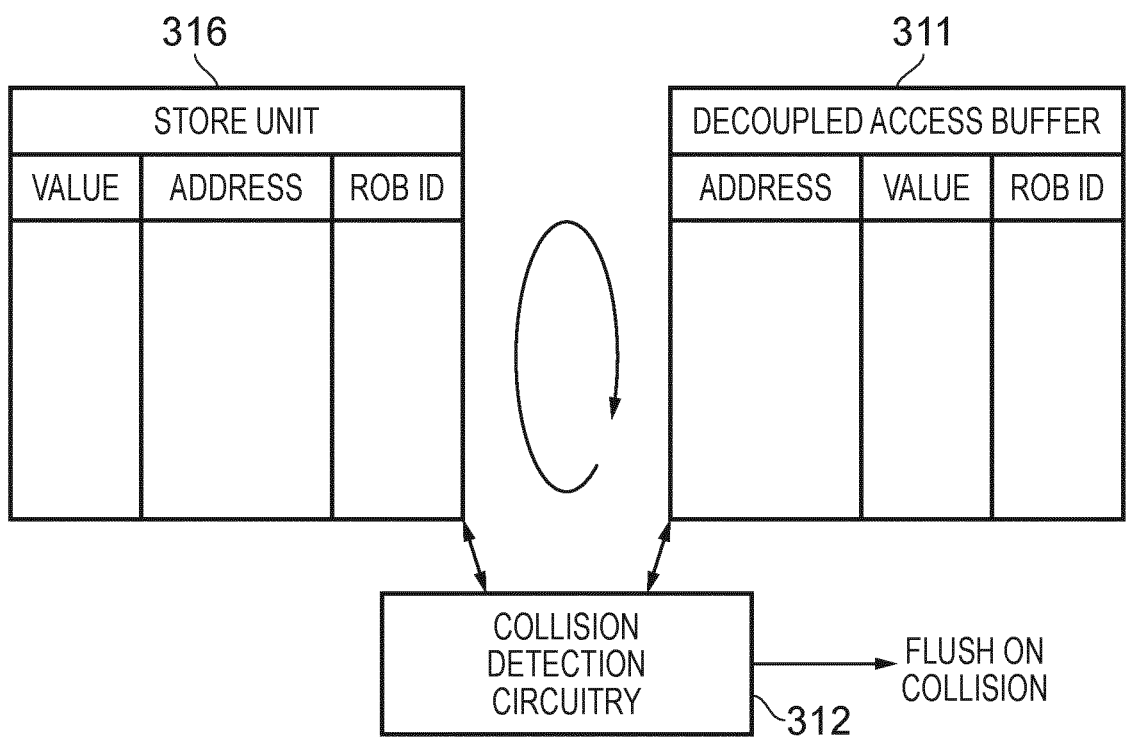
FIG. 6 schematically illustrates collision detection circuitry provided in some embodiments.

FIG. 6 schematically illustrates the operation of the collision detection circuitry 312 with respect of the content of the store unit 316 and the decoupled access buffer 311. The store unit 316, which holds entries concerning store transactions which are still "in flight", i.e. have yet to be committed. Various information associated may be associated with each entry, though of relevance to the present discussion (as shown in the example of FIG. 6) this information comprises the value to be stored, the address at which it is to be stored, and an instruction identifier (which here is provided by a reorder buffer (ROB) ID. The decoupled access buffer 311 also comprises various information related to the entries which it holds, which in the example of FIG. 6 is shown to be an address of the retrieved value, the value itself, and an instruction identifier associated with this load operation, which in the example of FIG. 6 is also the ROB ID. It is known to one of ordinary skill in the art that out-of-order execution pipelines such as those provided by the access circuitry 210 and the execute circuitry 220 of the example of FIG. 4 make use of such a re-order buffer and ROB IDs, in order to maintain knowledge of the program ordering of the instructions which they execute, such that despite the out-of-order execution they carry out, the effect of the instructions can be correctly ordered when the results are committed. The collision detection circuitry 312 is arranged to monitor the respective content of the store unit 316 and the decoupled access buffer 311 and to identify instances in which the address matches between entries. This may for example be carried out by a circular (looping) examination of the entries of one of them, e.g. the DAB 311, taking the address of each entry in turn and checking if there is a matching entry in the other, e.g. the store unit 316. When a pair of addresses are found to match then the respective ordering of the corresponding instructions is determined with reference to the ROB IDs, and when a data hazard is thus identified (a "collision") the collision detection circuitry causes a flush to be carried out. This flush may be a full pipeline flush or may be a partial pipeline flush.

Figure 7:
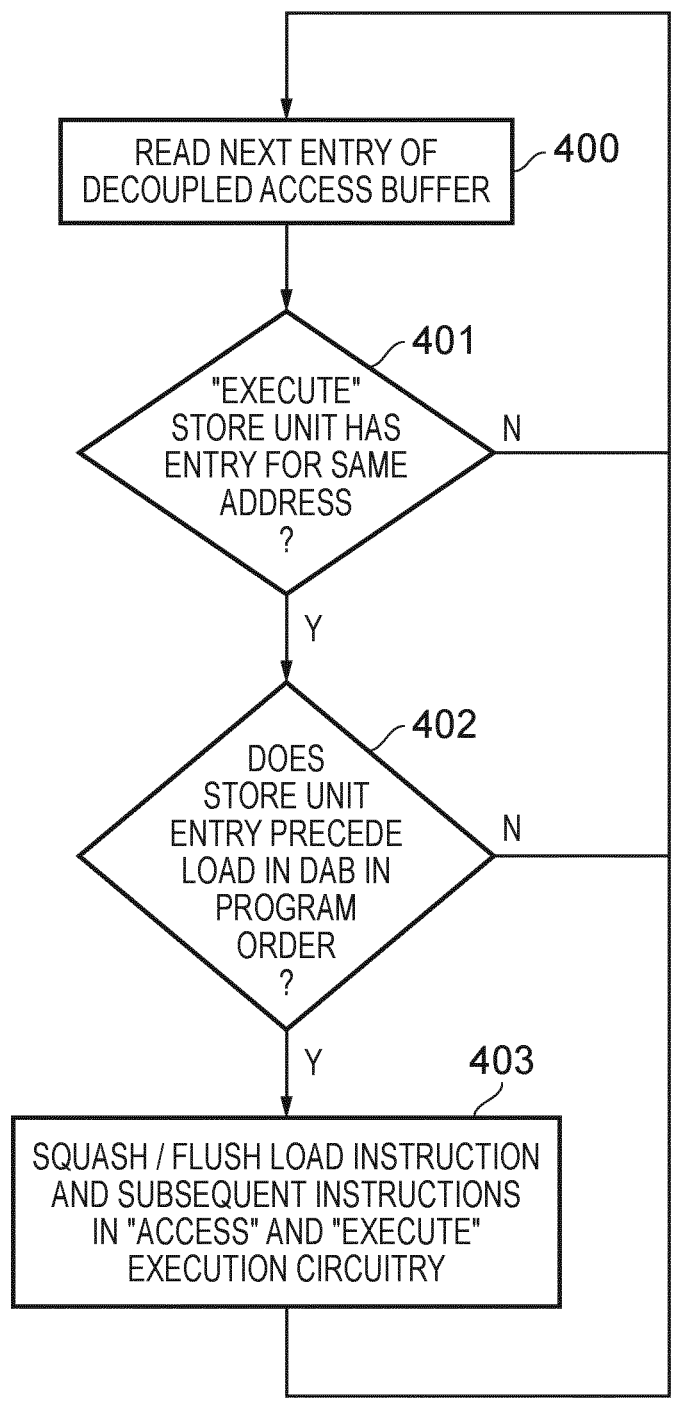
FIG. 7 shows a sequence of steps which are taken by collision detection in the method of some embodiments.

FIG. 7 shows a sequence of steps according to which the collision detection circuitry 312 may operate. At step 400 the next entry of the decoupled access buffer is examined. At step 401 it is then determined if, within the execute store unit, there is an entry for the same address. If it does not, then the flow returns to step 400 for the next entry of the decoupled access buffer to be examined. However, when there is a matching address the flow proceeds to step 402, where it is determined if the store unit entry precedes (in program order) the load which has caused the value to be brought into the decoupled access buffer (DAB). If this is not the case then the flow returns to step 400 for the next entry of the decoupled access buffer to be examined. If, however, this is the case, then a collision condition has been identified and at step 403 the load instruction itself is squashed and any subsequent instructions in the access and execute circuitry are flushed in order to avoid incorrect side-effects of the ordering of the load and store operations having been inverted. In other embodiments a partial pipeline flush is be performed, such that only instructions which are directly or indirectly dependent on the squashed load instruction are also squashed, but the rest of the pipeline remains intact. The flow then returns to step 400.

An example sequence of instructions which a data processing apparatus may receive and execute is as follows:

| I1: | [E] | SUB | x10, x11, x10 |
|---|---|---|---|
| I2: | [A] | ADD | x1, x2, x3 |
| I3: | [A] | SUB | x4, x1, x2 |
| I4: | [E] | CLZ | x13, x2 |
| I5: | [A] | LSL | x4, x4, #1 |
| I6: | [E] | MADD | x14, x10, x11, x13 |

| | | | |
|---|---|---|---|
| I7: | [A] | ADD | x8, x3, x9 |
| I8: | [E] | CMP | x14, #39 |
| I9: | [A] | EOR | x5, x4, x6, LSR #5 |
| I10: | [A] | LDR | d0, [x5, x8, LSL #3] |
| I11: | [E] | FMSUB | d1, d2, d0, d3 |
| I12: | [E] | FCSEL | d2, d1, d5, GT |
| I13: | [E] | STR | d2, [x12], #4 |

Considering the instruction sequence shown above, and where a load instruction (LDR) is defined to be the "predetermined type of instruction", the labelling of the instructions depends on an analysis of the data dependencies between the instructions. These dependencies are shown in graphical form in FIGS. 8A and 8B. Here, any instruction which supplies a value to a source operand of a load instruction is deemed to be an "access" instruction, and any instruction which supplies a value to a source operand of an "access" instruction is also itself deemed to be an access instruction. Instructions which are not tagged as access instructions, because they are found not to be part of an access data dependency graph, are deemed to be execute instructions. Thus as shown in FIG. 8A the instructions which are in the access data dependency graph, that is I10, I7, I9, I5, I3, and I2 are given the access label "A". The remaining instructions (which do not lead to a "load" directly or indirectly) are marked as execute (E), which includes I13, I12, I11, I8, I6, I14, and I1. The present techniques are concerned with identifying such data dependency graphs for a sequence of instructions which a data processing apparatus receives, and in particular, as will be described in more detail below with reference to the figures which follow, the present techniques provide apparatuses and methods which allow a data processing apparatus to elaborate such access data dependency graphs and label the constituent instructions thereof with the "access" label, this being performed online, i.e. on-the-fly as the data processing apparatus receives and executes instructions.

Figure 9:
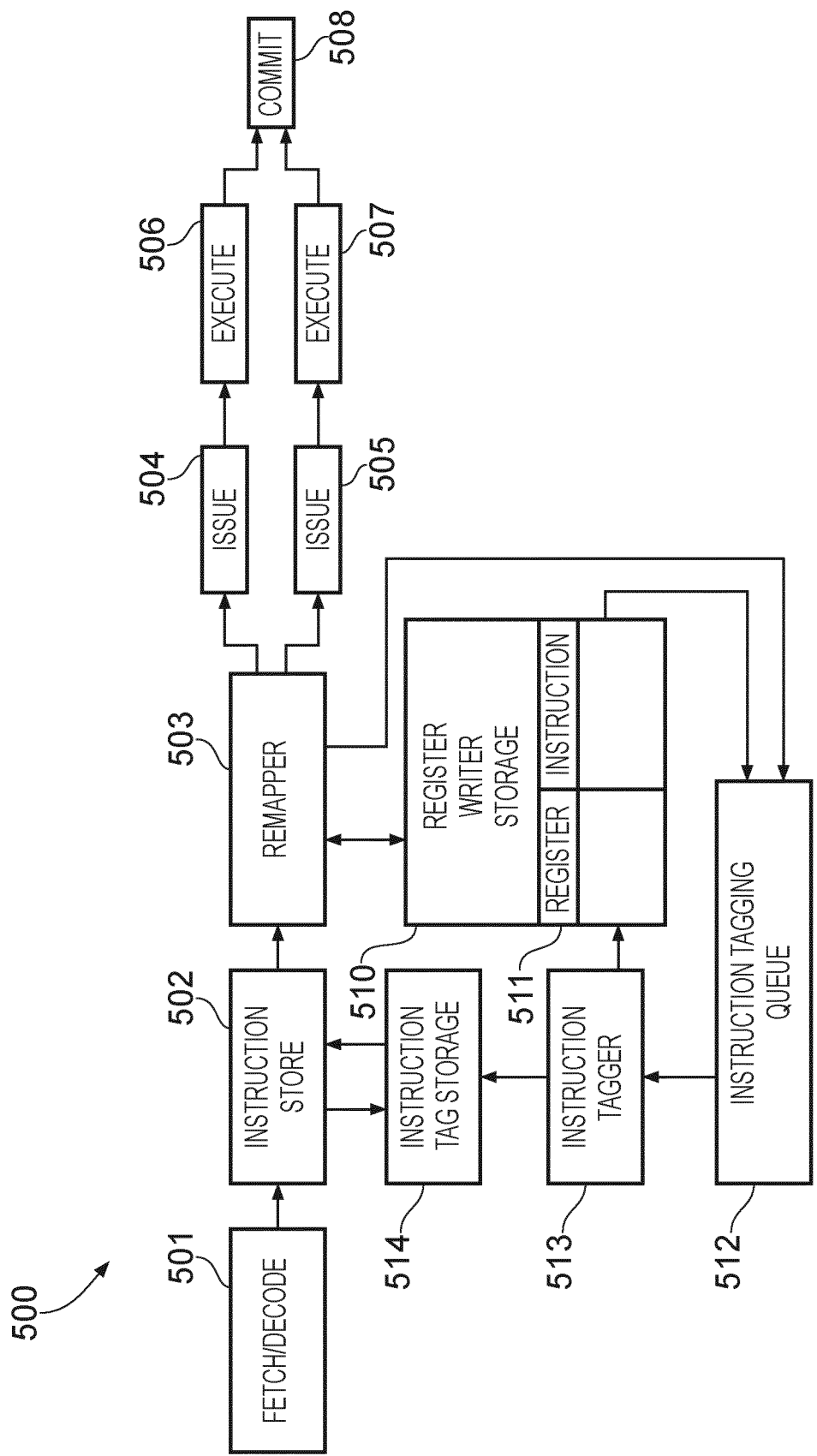
FIG. 9 schematically illustrates a data processing apparatus in accordance with some embodiments.

FIG. 9 schematically illustrates a data processing apparatus according to some embodiments. Shown schematically, the data processing apparatus 500 comprises a fetch/decode stage 501, which fetches and decodes the instructions of the sequence of instructions to be executed by the data processing apparatus. These decoded instructions are stored in the instruction store 502, from where the remapper circuitry 503 accesses them and performs any required remapping of instruction-specified registers. From the remapper stage, instructions are passed either to the issue circuitry 504 or to the issue circuitry 505. The issue circuitry 505 issues instructions for execution by the execute circuitry 506, whilst issue circuitry 505 issue instructions for execution by the execute circuitry 507. These parallel pipelines come together again in a final commit stage 508. Register writer storage 510, which is accessed by the remapper circuitry 503, is also provided in which entries are created by the remapper circuitry 503. An entry 511 of the register writer storage 510 comprises an instruction indication and a register indication. Specifically, for each instruction encountered by the remapper circuitry 503 it creates an entry in the register writer storage 510, which indicates the instruction and its destination register (i.e. a register, the content of which is written to by that instruction). Note that in the case of an out-of-order processor, the registers referred to in an entry 511 of the register rewriter storage 510 are physical registers (where in this case the remapper 503 is a renaming stage, arranged to administer mappings between architectural registers referenced in instructions and physical registers of the data processing apparatus). Conversely, in the case of an in-order processor, the registers referred to in entries 511 of the register rewriter storage 510 can be architectural registers (i.e. as referred to in the instructions). Note that some instructions may have more than one destination register, so multiple entries 511 in the register rewriter storage 510 may be created in response to a single instruction.

FIG. 9 also shows that the data processing apparatus 500 further comprises an instruction tagging queue 512, instruction tagging circuitry 513, and instruction tag storage 514. The instruction tag storage 514 is provided in association with the instruction store 502, such that an instruction in the instruction store 502 can be associated (or not) with a tag stored in the instruction tag storage 514. Indeed, in some embodiments the instruction store 502 and the instruction tagged storage 514 may be merged into a single storage unit, in which tags are directly stored in association with instructions. However in other embodiments the instruction store 502 is not present and the instruction tag storage 514 operates by receiving tags generated by the instruction tagger 513 and providing them directly to the front-end of the processor (FIG. 15B described below schematically illustrates an embodiment of this type). The instruction tagging instruction circuitry 513 operates by taking a next instruction identifier queued in the instruction tagging queue 512 and writing into the instruction tag storage 514 to indicate that this instruction is "tagged". For example when the above described categorisation of instructions as either "access" or "execute" is required, the tagging of an instruction indicates that this is a defined "access" instruction (whilst untagged instructions are interpreted to be "execute" instructions).

In addition to causing a tag to be stored in the instruction tag storage 514, the instruction tagger 513 also determines for the instruction whether it has any producer instructions. Producer instructions are those instructions which generate at least one source operand for the instruction. Thus, on the basis of the specified source register(s) for the current instruction, the instruction tagger 513 refers to the register writer storage 510 to determine if there are any entries stored therein which indicate this or these registers. When this is the case the corresponding instruction identifier from the entry in the register writer storage 510 is caused to be added to the instruction tagging queue 512. Accordingly, chains or graphs of data dependencies leading to a predetermined type of instruction (in this example embodiment a load instruction) can be identified and each instruction thereof can be tagged. Notice also the path from the remapper 503 to the instruction tagging queue 512. This is used to initiate the process by inserting load instruction identifiers for any load instructions encountered into the instruction tagging queue. Accordingly the instruction tagger 513 receives instruction identifiers from the instruction tagging queue 12, which are either written to this queue by a previous iteration in which the instruction tagger 513 identified a producer instruction in the register writer storage 510 and caused that or those producer instructions to be added to the instruction tagging queue, or are inserted into the instruction tagging queue by the remapper 503 when it encountered a load instruction.

Figure 10:
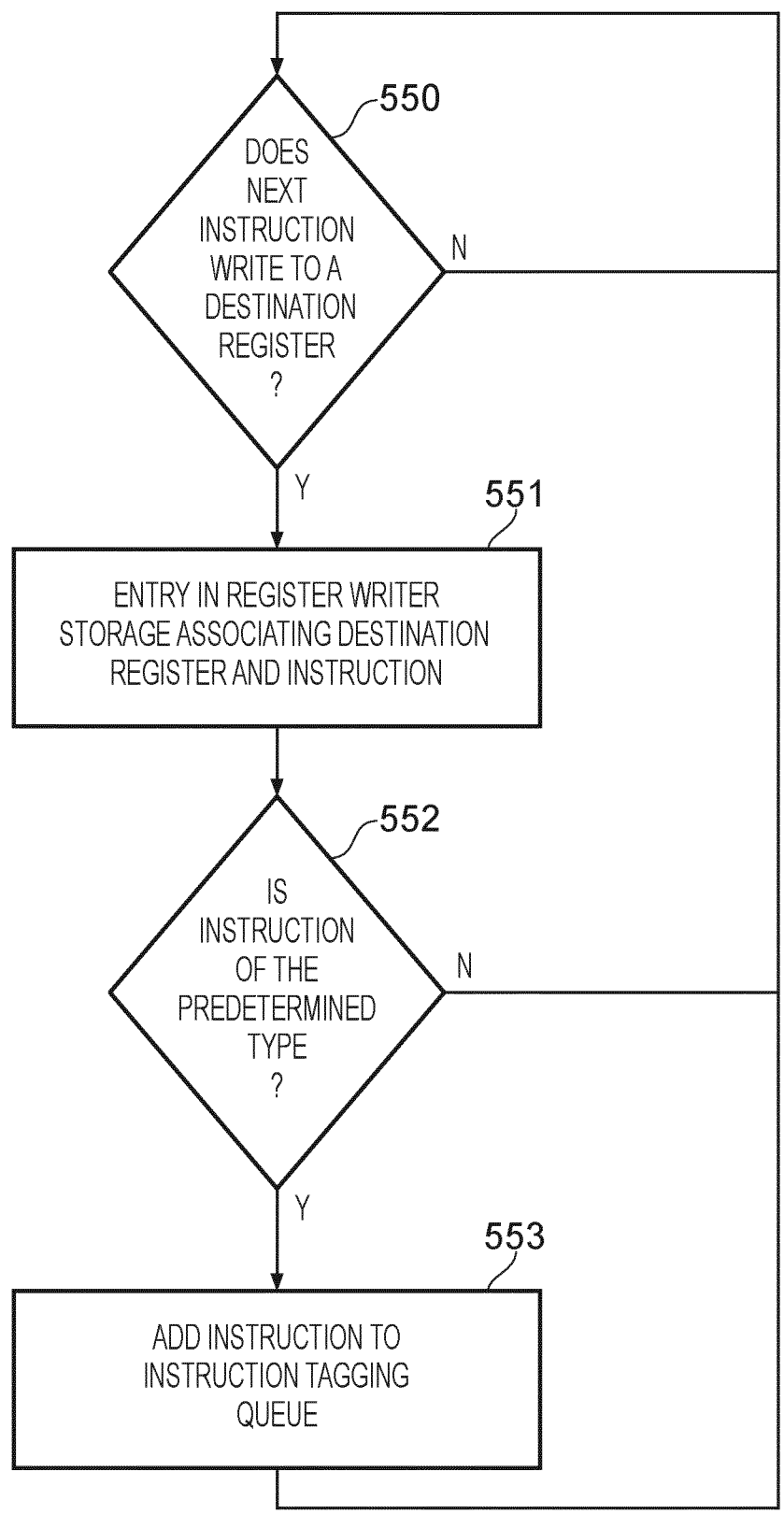
FIG. 10 is a flow diagram showing a sequence of steps which are taken according to the method of some embodiments.

FIG. 10 is a flow diagram showing a sequence of steps which are taken according to the method of some embodiments, in particular describing the operation of a component such as the remapper 503 in the data processing apparatus 500 in the example of FIG. 9. The flow can be considered to begin at step 550 where this component encounters a next instruction in the sequence of instructions which the data processing apparatus is executing. It is determined at step 550 if this instruction writes to a destination register. If it does not then the flow loops on itself to consider the next instruction in sequence. However, when this is true the flow proceeds to step 551 where an entry is created in the register write storage associating the destination register and the instruction. Next, at step 552 it is determined if the instruction is of the predetermined type. For example this may be a determination of whether the instruction is a load instruction. If it is not then the flow returns to step 550. When this is true the flow proceeds to step 553, where the instruction (i.e. an identifier thereof) is added to the instruction tagging queue. The flow then returns to step 550.

Figure 11:
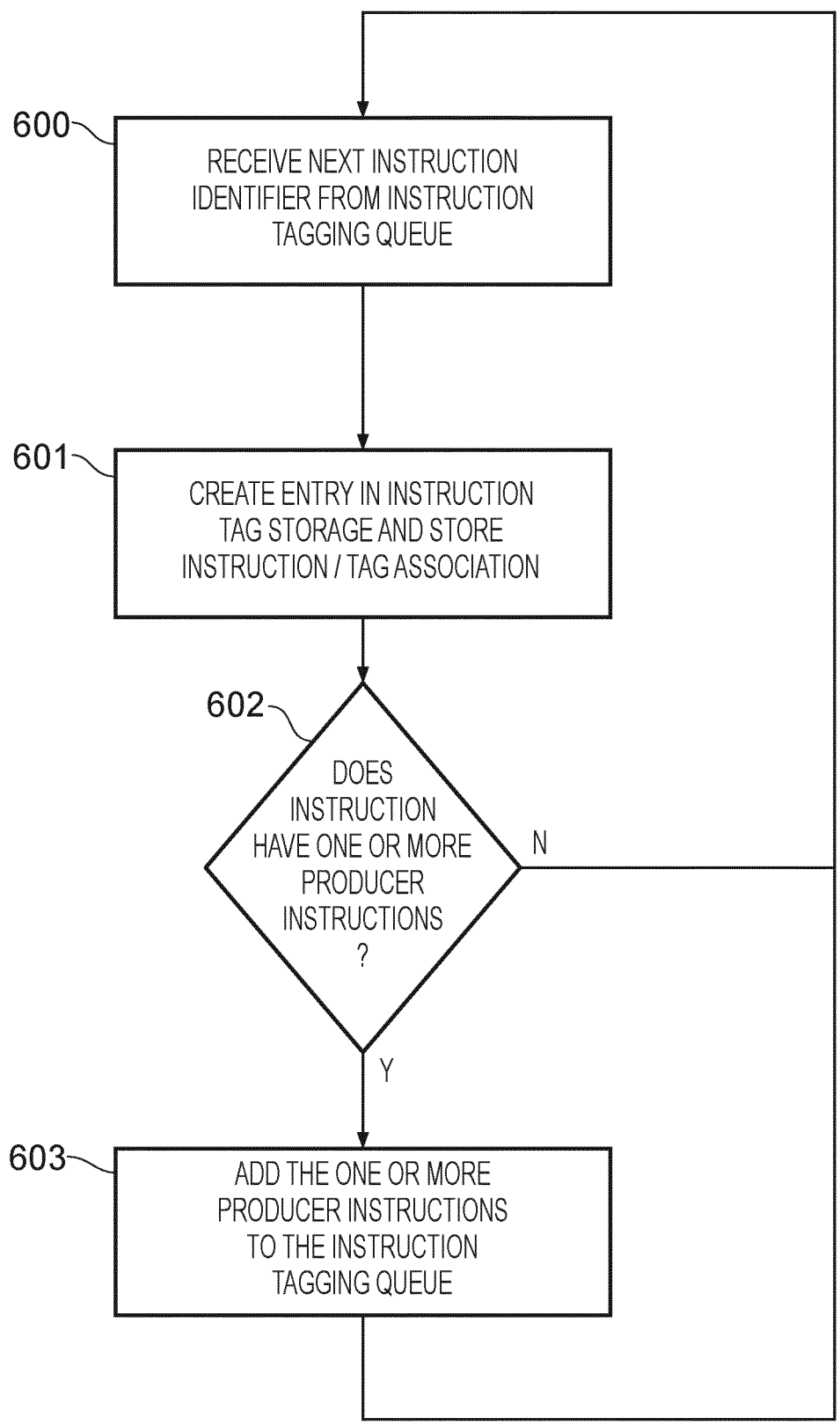
FIG. 11 is a flow diagram showing a sequence of steps which are taken according to the method of some embodiments.

FIG. 11 is a flow diagram showing a sequence of steps which are taken according to the method of some embodiments, in particular those steps carried out in order to tag instructions, as may be carried out by the instruction tagging circuitry 513 of the data processing apparatus 500 in FIG. 9. The flow can be considered to begin at step 600, where the next instruction is received from the instruction tagging queue. Then at step 601 an entry in the instruction tag storage is created, thus "tagging" this instruction, where the association between this instruction and its tag forms the entry in the instruction tag storage. Then at step 602 it is determined if this instruction has one or more producer instructions, i.e. whether at least one source operand of the instruction is given by the content of a register which has been written to by another instruction. As described above with reference to FIG. 9 this may for example be performed by reference to the register writer storage 510 and the entries stored therein. If the instruction does not have any producer instructions, or the producers are not available in the instruction store 502 or the producer instructions have already been previously tagged, then the flow returns to step 600 for the next instruction in the instruction tagging queue to be processed. However, when one or more producer instructions are identified, then indications of these are added to the instruction tagging queue at step 603 and then the flow returns to step 600.

Figure 12:
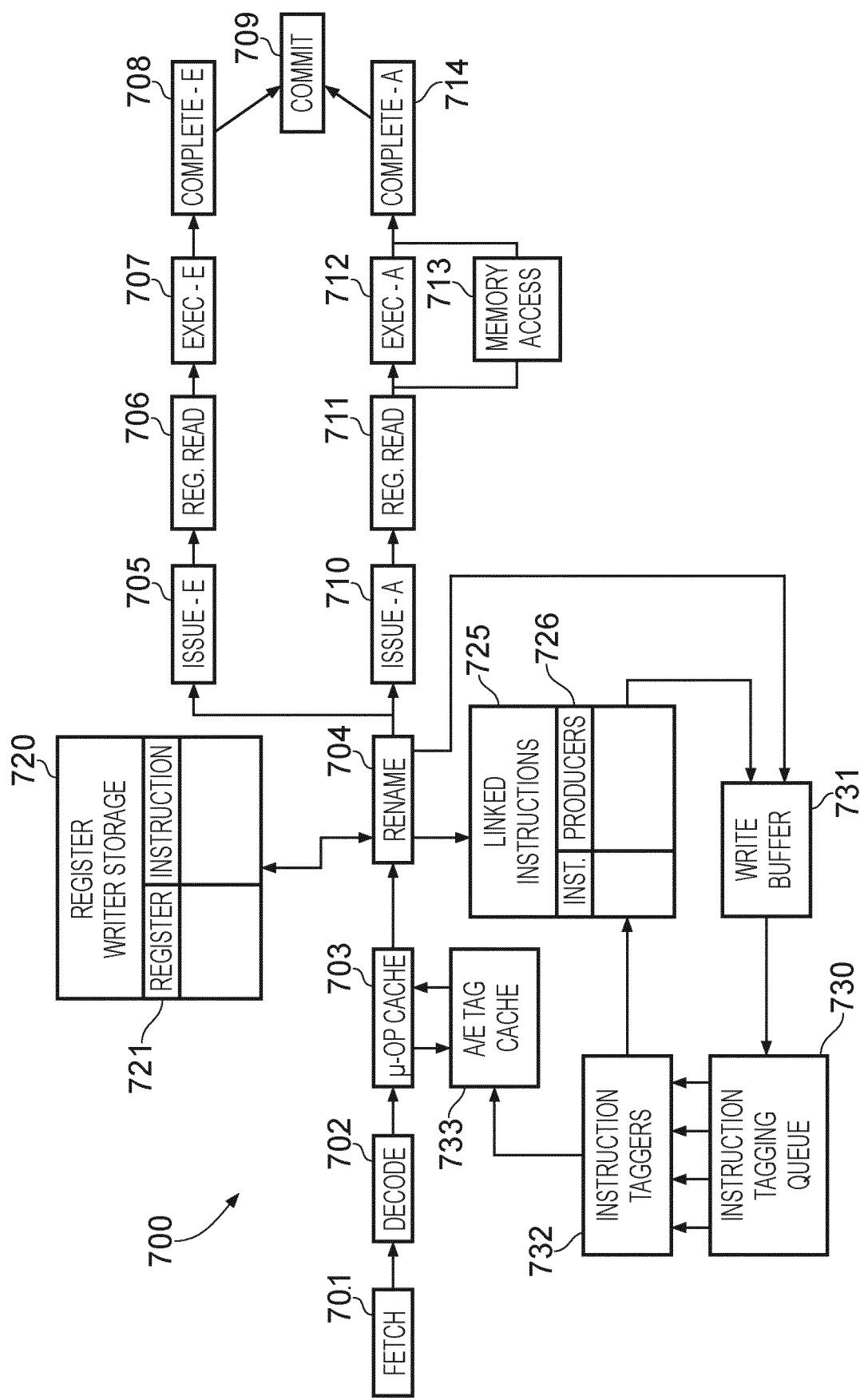
FIG. 12 schematically illustrates a data processing apparatus in accordance with some embodiments.

FIG. 12 schematically illustrates a data processing apparatus 700 according to some embodiments. Fetch circuitry 701 and decode circuitry 702 operate to retrieve a sequence of instructions to be executed from memory and to decode them. Decoded instructions, which may be subdivided into micro-ops, populate the micro-op cache 703. The next pipeline stage is the rename circuitry 704. The data processing apparatus 700 is arranged to perform out-order instruction execution and accordingly renaming of architectural to physical registers is carried out in order to support this. Thereafter, depending on whether a given instruction is labelled "A" (i.e. an access instructions) or "E" (i.e. an execution instruction) it is passed to one of the two execution pipelines illustrated. The "execute" pipeline is schematically represented in FIG. 12 by the issue stage 705, the register read stage 706, the execution stage 707, and the completion stage 708. A final commit stage 709 is shared with the other pipeline. The other "access" pipeline is schematically represented in FIG. 12 by the issue stage 710, the register read stage 711, the execution stage 712, the memory access stage 713, and the completion stage 714. Note that access pipeline also has a memory access stage 713 in parallel to the execution stage 712. Access "A" tagged instructions which are processed by the access pipeline are prioritised over the instruction execution carried out by the execute pipeline. The data processing apparatus 700 can therefore be a decoupled access-execute processor of the type described above with respect to FIGS. 1-7. The self-tagging capability thus allows such a decoupled access-execute processor to receive untagged an instruction stream and to add the tags on-the-fly.

Two storage components are shown in FIG. 12 to which the rename circuitry 704 has access. The first of these is the register write storage 720 and the second is the linked instructions storage 725. For each instruction that the rename stage 703 processes, if the instruction generates a result value stored to a register, a physical register is allocated as a destination register and a new mapping between an architectural register (specified in the instruction) and a physical register is made. The rename stage 704 also records the identity of the instruction which is responsible for writing to that physical register in an entry 721 of the register writer storage 720. Some instructions may have more than one destination register, and thus multiple mappings may be generated in the rename stage 704. Further, when a single instruction is responsible for writing to several physical registers several corresponding entries are made in the register writer storage 720. When source operand registers are renamed, the rename stage 704 consults the register writer storage 720 in order to create content for the linked instructions storage 725. Identifying an instruction which writes to the source operand register of a current instruction enables the rename stage 704 to link these "producer" instructions with the current instruction. Thus, using the information taken from the register writer storage of which instruction(s) write(s) to the source operand register(s) of a current instruction reveals one or more "producer" instructions. Thus, each entry 726 in the linked instructions storage 725 gives a list of other instructions which produce at least one data value that is consumed by that instruction.

The data processing apparatus 700 also has an instruction tagging queue 730 which is preceded by a write buffer 731. Provision of the write buffer 731 allows for potential differences in the speed with which the rename stage 704, the instruction taggers 732, and the instruction tagging queue 730 operate. When the rename stage 704 encounters the predetermined type of instruction, in this example a load instruction, it inserts an identifier for that load instruction into the write buffer 731. This is the mechanism by which the elaboration of the data dependency graph is initiated, since load instructions (in this example) are terminal nodes of the data dependency graph. Instruction taggers 732 receive instruction identifiers from the instruction tagging queue 730. In the illustrated example there are four parallel instruction taggers provided, which each receive instruction identifiers from the instruction tagging queue 730. For each instruction identifier taken from the instruction tagging queue 30 by an instruction tagger of the set of instruction taggers 732, an indication is written into the access/execute (A/E) tag cache 733, where in this example embodiment the position in the cache corresponds to the instruction identifier and a bit is written to indicate that the instruction is tagged as an access instruction. The instruction tagger also uses the current instruction identifier to look up in the linked instructions storage 725 and when a corresponding entry is found to read one or more instruction identifiers specified as producers in that entry. The instruction identifiers of these producers instructions are sent via the write buffer 731 into the instruction tagging queue 730 in order to themselves be processed.

FIG. 13A shows example content of linked instruction storage, such as the linked instruction storage 725 in the example of FIG. 12, where here this structure is referred to as a "traversal table". The content of this traversal table corresponds to the example instruction sequence set out above and for which the data dependency graphs are shown in FIGS. 8A and 8B. Thus (compared to FIG. 8A): I2 is listed as the producer instruction for instruction I3; I3 is the producer instruction for instruction I5; I5 is the producer instruction for instruction I9; and instructions I7 and I9 are the producer instructions for instruction I10. Note that instruction I10 is a load instruction and is therefore a terminal node of the data dependency graph.

FIG. 13B shows example content of register writer storage such as the register writer storage 720 of FIG. 12, which is referred to in this figure as a "last-writer table". It will be understood that the particular physical registers which are mapped to by the architectural registers specified in the instructions depends on the particular configuration of the renaming stage and the availability of physical registers when these instruction are encountered. Thus FIG. 13B is a snapshot of just one particular example content of the last-writer table. It can be seen from FIG. 13B that instruction I5 is the "last writer" for physical register 26 at the illustrated snap shot point, whilst instruction I9 is the last writer for physical register 28. Physical registers 25 and 27 are currently available to be mapped to from architectural registers and do not currently have valid "last-writer" instructions, so are marked "-".

Figures 14A, 14B:
FIGS. 14A and 14B schematically illustrate instruction tag storage and some example content in accordance with some embodiments.

FIGS. 14A and 14B show example configurations of instruction tag storage and some example content in each. In the example embodiment of FIG. 14A, the instruction tag storage is arranged to store entries which associate an instruction identifier, a tag, and a "no-process" indicator. Thus, for any given instruction it can be determined if there is a corresponding entry in the instruction tag storage and in particular whether this instruction is tagged or not. The no process marker is used to prevent certain instructions from being placed into the instruction tagging queue. For example in the embodiment of FIG. 12 this prevents the rename stage 704 from putting the instruction into the write buffer 731 and thus loads that have already been processed by the tagging unit (which therefore do not need to trigger a new data dependency graph elaboration are marked in this way). Also, noting that an entry in the table of FIG. 14A for I20 has the no-process marker, but not the "A" tag, the no-process marker can be stored in association with some instruction which are known a priori not to be access instructions, such as branch instructions and stores without register write-back. Note that the "no-process" marker does not in fact need to be explicitly set if the "access" tag is set, since setting the access tag also prevents the instruction from being added to the instruction tagging queue.

FIG. 14B shows an alternative embodiment of instruction tag storage, where this example is referred to as an A/E cache, which may correspond to the A/E tag cache 733 of the example of FIG. 12. This is a particularly compact structure requiring only a limited amount of information to be stored, since instruction identifiers are mapped to a particular cache position and a bit is stored at a particular position indicates that an instruction which to maps to that position are marked as access instructions. A "no-process" bit can also be indicated in a similar fashion, storing a bit at a position mapped to by the subject instruction. Note that some instructions are marked as no-process, though not "access", such as the above-mentioned examples of branch instructions and stores without register write-back.

Figure 15A:
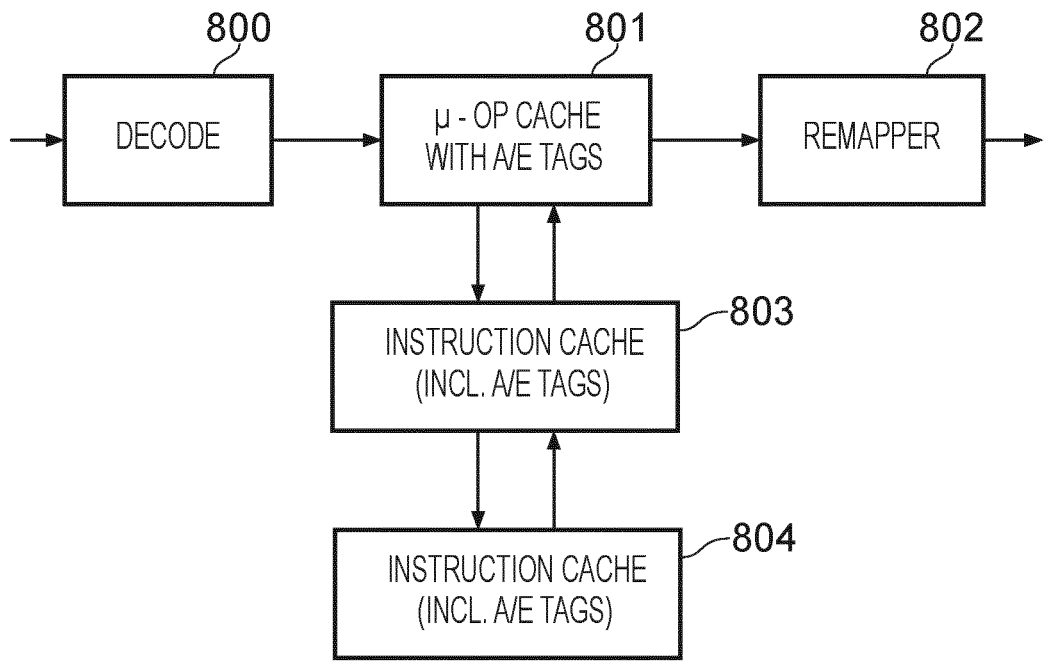
FIG. 15 schematically illustrates an instruction cache hierarchy associated with a micro-op cache in accordance with some embodiments.
Figure 15B:
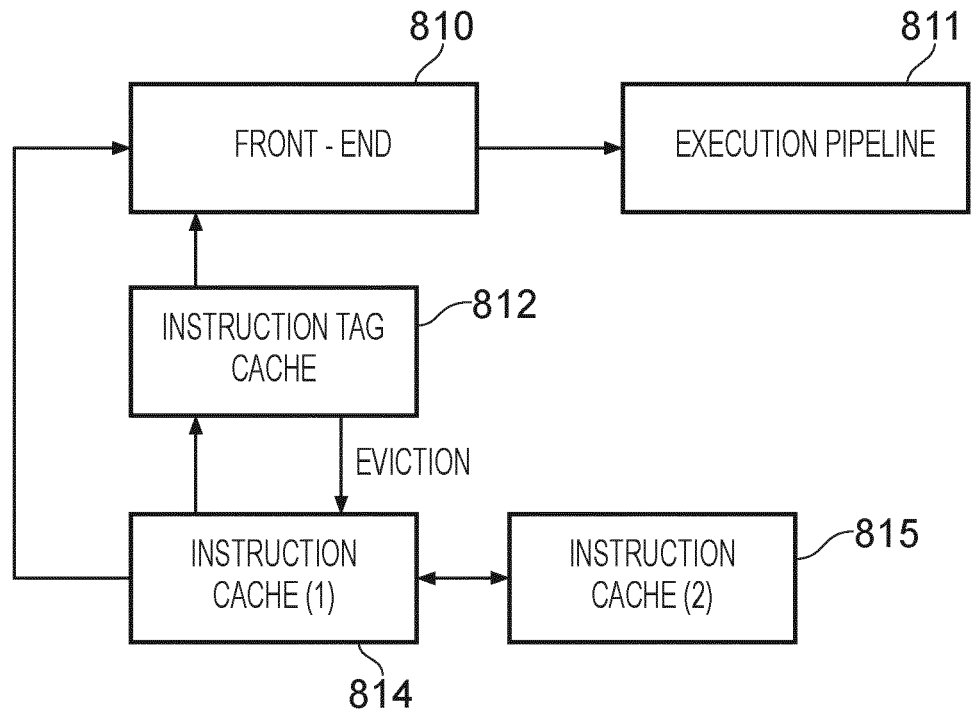

FIGS. 15A and 15B schematically illustrate configurations which allow tagging information to be evicted from the instruction tag store, yet retained for future use. In FIG. 15A an example is shown in which a decode stage 800 passes decoded instructions to a micro-op cache 801, where in this example the cache itself is provided with tagging information, and where here this is access/execute tagging information (e.g. a bit indicating whether an instruction is an access instruction or not). Instructions are taken from here by the remapper stage 802. The configuration also includes two levels of an instruction cache hierarchy 803 and 804, which are also arranged to store instruction information with associated tagging information. Accordingly, if an instruction is evicted from the micro-op cache, its associated tag information can be sent out to these further levels of the instruction cache hierarchy, meaning that this information can then be loaded back into the micro-op cache at a later point in time without having to perform the tagging process (and the data graph elaboration) once more.

FIG. 15B schematically illustrates front-end circuitry 810 preceding an execution pipeline 811 of a processor. In particular this is an embodiment in which there is no micro-op cache, but an associated instruction tag cache 812 (which receives tag information from tagging circuitry such as that described above) provides this tag information directly to the front end circuitry 810 of the processor for association with the instructions passing through. If the instruction tag cache 812 becomes full and entries are evicted, then these can be sent to further levels of instruction cache 814 and 815. When the same instruction is encountered again, the tag information can be brought into the processor along with the instruction, again saving the need to regenerate the tag information (and reiterate the data graph elaboration process).

Figure 16:
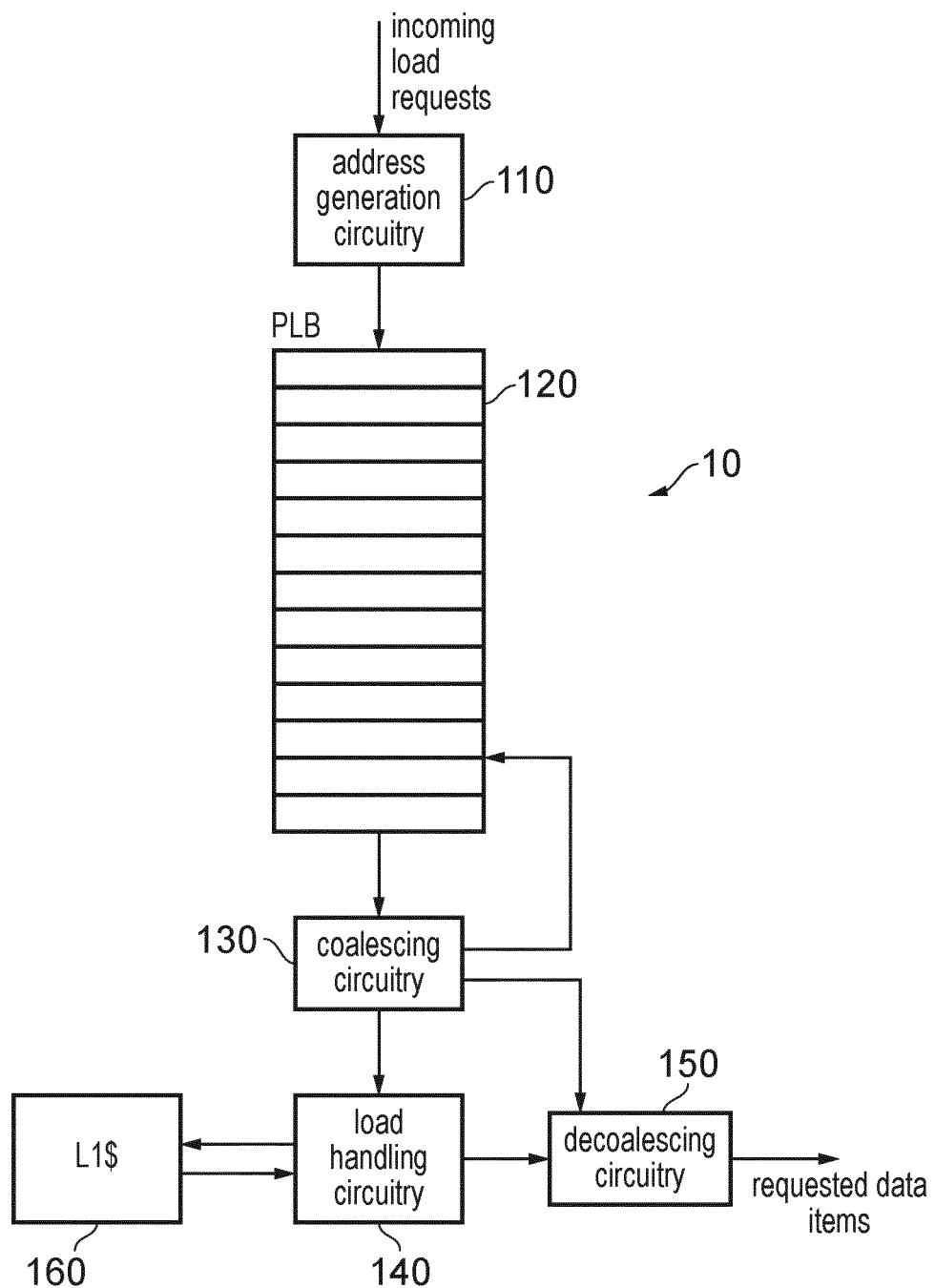
FIG. 16 schematically illustrates an apparatus in accordance with some example implementations.

FIG. 16 schematically illustrates an apparatus 10 in some embodiments. The apparatus 10 comprises various components relevant to the handling of load requests in a data processing apparatus which made for example be one of the data processing apparatuses described above with reference to FIG. 2, FIG. 4, and/or FIG. 5. As can be seen in FIG. 16 the only components illustrated here are those of relevance to the handling of load requests and the context of such apparatus will generally be understood by one of ordinary skill in the art, as well as where such load handling circuitry may be introduced into the examples of FIG. 2, FIG. 4 and/or FIG. 5. FIG. 16 shows incoming load requests being received by address generation circuitry 110, which is arranged to generate addresses required by the respective load requests. Note that the address generation circuitry may be a dedicated arrangement of circuitry for the generation of addresses or also be provided by a regular arithmetic logic unit (ALU) capable of performing integer arithmetic relating to address generation. In the latter case, in one embodiment, a decoder may split the load instruction into two separate micro-ops, one for performing the address calculation derived from the specific addressing mode used, and the other micro-op for performing the actual access specified by the "load" instruction. In such a case, once that address-generating micro-op has been executed, the "resolved" address of the "load" instruction will be written into the "pending" loads buffer (PLB) shown in FIG. 16. Note also that requests may arrive in this buffer out of program order. The load requests arrive in the pending load buffer (PLB) circuitry 120, which in this example is arranged as a FIFO buffer and accordingly in the illustration of FIG. 16 individual pending load requests may be considered to enter at the top of the PLB 120 and two track step by step through the positions illustrated to finally exit and be passed to the coalescing circuitry 130. Of course no physical movement of entries in the FIFO typically takes place, this progression of position being handled instead with reference to identifiers for each entry. In one role the coalescing circuitry 130 forwards load requests from the PLB 120 to the load handling circuitry 140, such that these load requests can be carried out and the respective data items which are their subject be retrieved from the memory system. In the illustration of FIG. 16 only the L1 cache 160 of that memory system is explicitly shown. However the coalescing circuitry 130 also plays another role in the system, namely to determine from the pending loads held in the PLB 120, if at least two pending load requests relate to memory addresses which are sufficiently close to one another that load handling efficiency may be gained by coalescing these at least two pending load requests into one. This efficient closeness of the respective memory addresses is referred to herein as being present when an "address proximity condition" is satisfied. Although it may be variously defined depending on the particular implementation of the present techniques, in the example of FIG. 16 this address proximity condition is defined with reference to the L1 cache 160, and in particular to its cache line size. In other words the coalescing circuitry 130 examines the memory addresses specified for the pending loads buffered in the PLB 120 and determines if at least two pending load requests relate to the same cache line. This being the case then those at least two pending load requests are coalesced by the coalescing circuitry 130. One part of this action by the coalescing circuitry 130 comprises suppressing the forwarding of all but one of the at least two pending load requests found to satisfy this cache line size defined "address proximity condition". The feedback path from the coalescing circuitry 130 to the PLB 120 schematically illustrates this. Further the coalescing circuitry 130 also generates a corresponding signal transmitted to the decoalescing circuitry 150. When the load handling circuitry 140 has caused the retrieval of data from the memory system (for example from the L1 cache 160), the data is passed to the decoalescing circuitry 150. By the receipt of the signal from the coalescing circuitry 130, the decoalescing circuitry 150 knows that not only should the data item specified by the load request which was carried out by the load handling circuitry 140 be passed on as one requested data item, but also that the data items specified by the at least one further pending load request (the forwarding of which to the load handling circuitry 140 was suppressed by the coalescing circuitry 130) should also be extracted and passed on as at least one further requested data item. For example, where a cache line length of data is returned from the L1 cache 160, the decoalescing circuitry 150 in this situation extracts multiple data items from that cache line to be returned.

Figure 17:
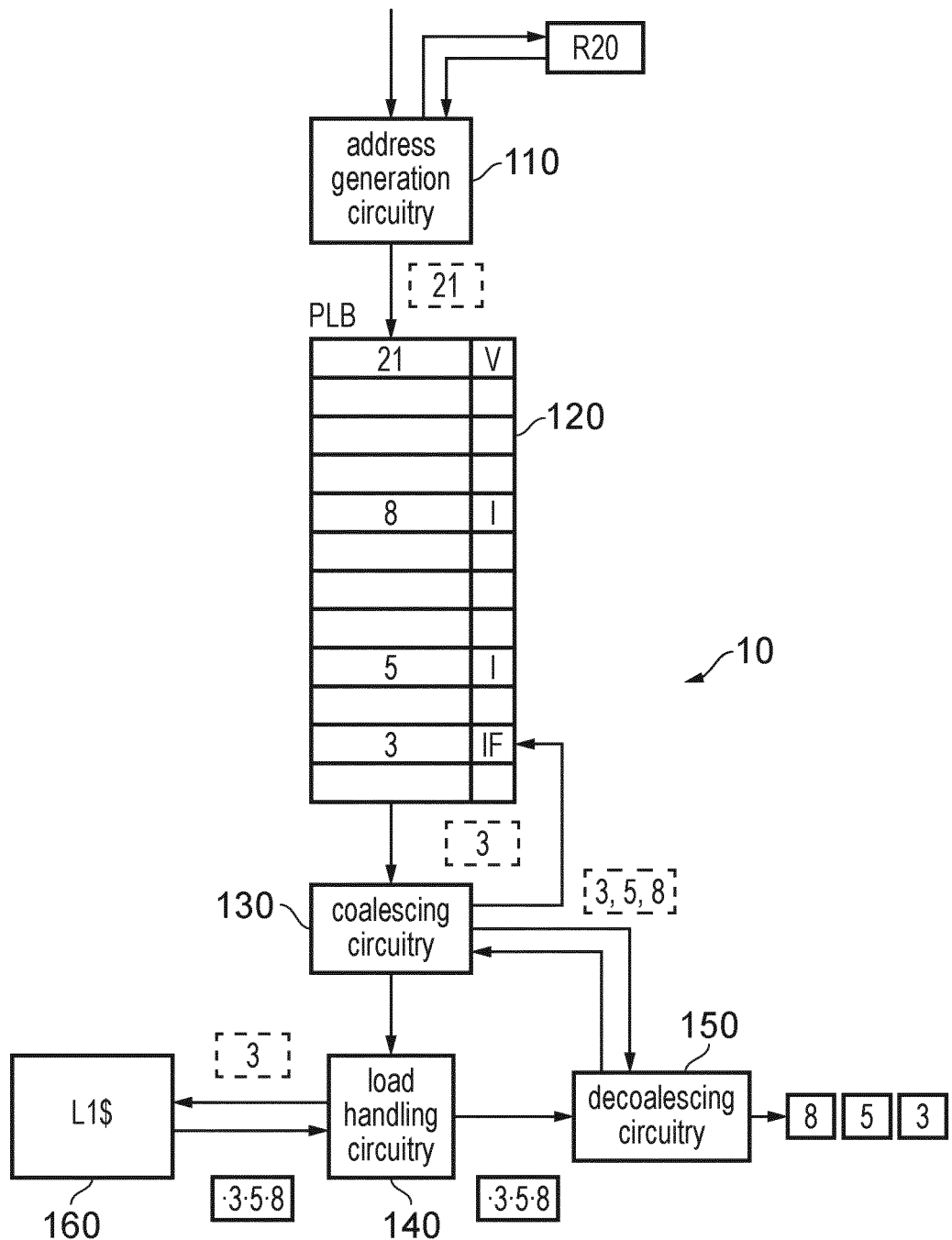
FIG. 17 schematically illustrates the apparatus of FIG. 1, further illustrating a worked operating example, in some example implementations.

FIG. 17 schematically illustrates the apparatus 10 of FIG. 16, wherein a worked example of input, processing, and output is superimposed. The address generation circuitry 110 is shown receiving a load request which identifies an architectural register R20 as holding the address from which the load should take place. Address generation circuitry 110 then determines that architectural register R20 corresponds (currently) to physical address "21" and adds the pending load with this address information to the PLB 120. The PLB 120 is a FIFO buffer structure, so this youngest pending load request is added to the first entry (uppermost in the figure). Note that the PLB 120 is generally entirely full, in that there are entries in all possible storage locations, although different statuses may be maintained for each individual entry, as will be discussed in more detail below. Also, note that only a subset of the entries in the PLB 120 in FIG. 17 are explicitly shown merely because these particular entries are of relevance to the present discussion. Thus at the snapshot moment shown for the content of PLB 120 in FIG. 17, four entries are explicitly shown, relating respectively to memory address locations 21, 8, 5, and 3. Additional information or metadata such as data access type, format, and access size information corresponding to each entry may also be stored in the pending load buffer. If required, this metadata can be shared with the decoalescing circuitry for the purpose of extracting relevant data items from the data returned from memory.

The coalescing circuitry 130 monitors the content of the PLB 120 and determine which requests will be forwarded to the load handling circuitry 140. In the course of the progression of the content of the PLB 120, the pending load request accessing address 3 becomes the oldest valid pending load request in the PLB 120 and the coalescing circuitry 130 forwards this request to the load handling circuitry 140, marking the status indicator of that entry as "in-flight" (IF). The in-flight status means that this entry in the PLB 120 for this pending load request generally then remains in the PLB 120 until the load has been handled and the requested data returned, such that the entry can then be marked as invalid. However other statuses of the entry in the PLB 120 are also used to support the present techniques. The coalescing circuitry 130 monitors and compares the memory addresses which are the subject of the respective pending load requests held in the PLB 120, in particular to identify multiple entries in the PLB 120 which relate to memory addresses which are sufficiently close to one another that "coalescing" these load requests may occur. In the example of FIG. 17 the coalescing circuitry 130 is arranged to determine if multiple pending load requests in the PLB 120 relate to memory addresses which are within the cache line size use in the memory system and in particular in the L1 cache 160. In the example snapshot shown in FIG. 17 the coalescing circuitry 130 determines that two further pending load requests in the PLB 120, namely those accessing memory addresses 5 and 8, fulfil its proximity requirement for the addresses, since the data items retrieved from memory addresses 3, 5, and 8 will be in the same cache line. Hence the coalescing circuit 130 marks the pending load requests relating to memory addresses 5 and 8 as "invalid" as well as sending an indication to the decoalesing circuitry 150 that these three pending load requests have been grouped together this manner.

Having been forwarded the pending load request relating to memory address 3, the load handling circuitry 140 accesses the memory system (including the L1 data cache 160) in order to carry out the required load. The cache line which is returned from the L1 data cache 160 comprises a number of data items including those referenced by memory addresses 3, 5, and 8. The data corresponding to the cache line is passed to (or at least accessed by) the decoalescing circuitry 150. In the absence of the signal from the coalescing circuitry 130, the decoalescing circuitry 150 would have only extracted the data item corresponding to the memory address 3, however where the decoalescing circuitry 150 has received the indication from the coalescing circuitry 130 that pending load requests relating to memory addresses 3, 5, and 8 have been coalesced, the decoalescing circuitry 150 extract the data items corresponding to all three of these memory addresses from returned data of the cache line. Receipt of the required data by the decoalescing circuitry 150 to the coalescing circuitry 130, which in response causes the entry corresponding to pending load request for the memory address 3 to be marked as invalid. Hence, when this entry reaches the head of the PLB 120 it is deleted (or at least allowed to be overwritten). Similarly when the entries corresponding to the addresses 5 and 8 reach the head of the PLB 120 they are similarly deleted (or at least allowed to be overwritten). Note that if the process of handling the coalesced load requests is interrupted, then the corresponding entries can be reinstated, with the entry corresponding to memory address 3 being changed from in-flight to valid, and the entries corresponding to memory addresses 5 and 8 being changed from invalid to valid.

Figure 18:
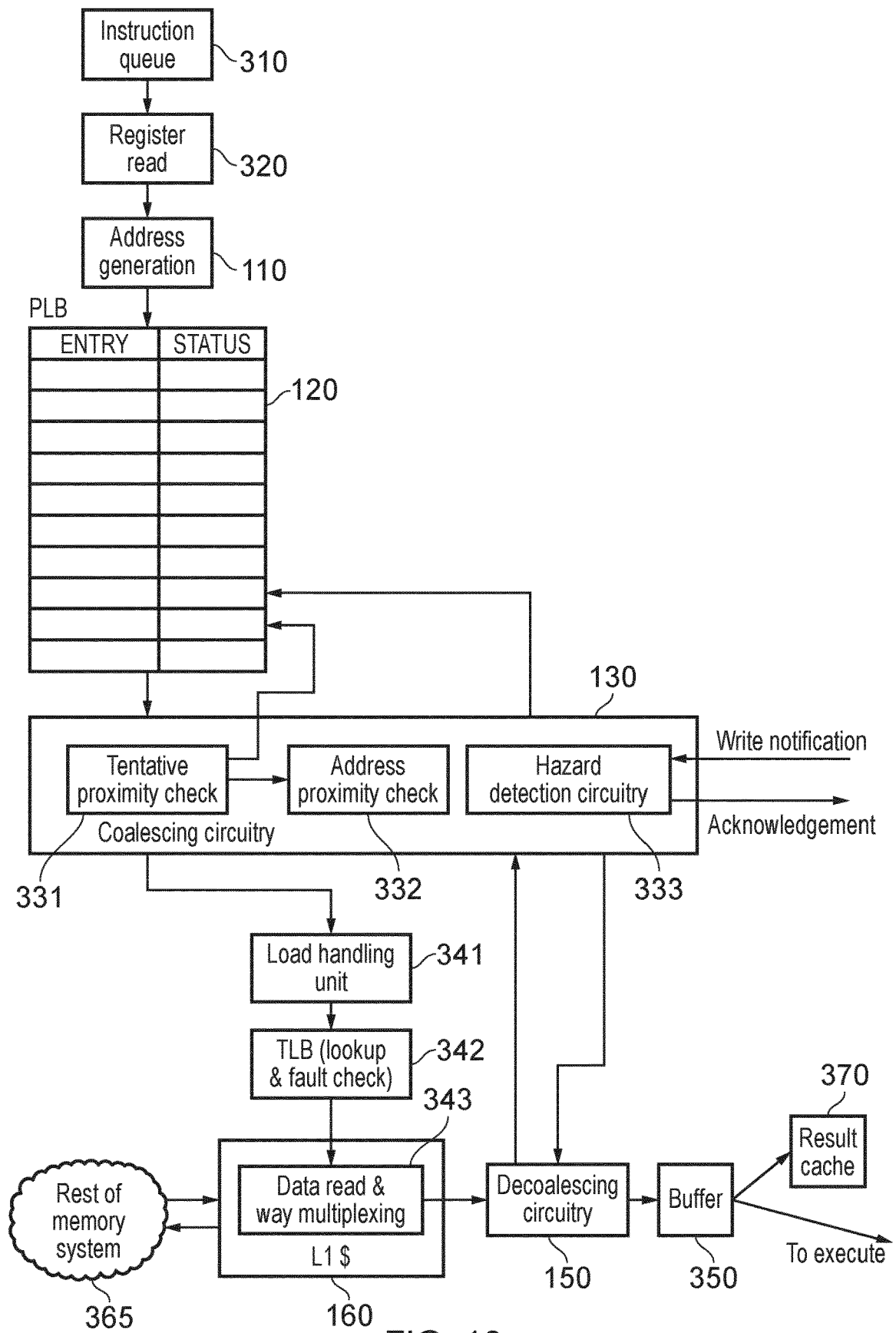
FIG. 18 schematically illustrates an apparatus in accordance with some example implementations.

FIG. 18 schematically illustrates an example embodiment which builds on the principles illustrated with respect to FIGS. 16 and 17. Various components in the apparatus of FIG. 18 have already been discussed with reference to FIGS. 16 and 17. These components are identified by the same reference numerals in FIG. 18. An instruction queue 310 is shown, feeding into register read circuitry 320, and address generation circuitry 110. Thus via this sequence load requests are identified in the instruction queue 310, the memory addresses to which they relate are determined, and a corresponding entry for each is added to the PLB 120. Further detail is shown in FIG. 18 of the coalescing circuitry 130. In the example embodiment of FIG. 18 coalescing circuitry 130 is shown to comprise tentative proximity check circuitry 331, address proximity check circuitry 332, and hazard detection circuitry 333. The tentative proximity check circuitry 331 and the address proximity check circuitry 332 determine in a two stage process whether multiple entries in the PLB 120 relate to addresses which are close enough that their respective loads can beneficially be coalesced. Essentially the tentative proximity check is circuitry 331 performs a coarse comparison whereas the address proximity check circuitry 332 performs a more precise comparison. The coarser nature of the comparison performed by the tentative proximity check circuitry 331 enables this check to be performed more quickly and therefore the status of the corresponding entries in the PLB 120 to be more quickly (provisionally) updated. After the initial tentative proximity check is performed, which in some embodiments takes one CPU cycle (depending on the size of the PLB), "lead" pending load request (i.e. that at the head of the PLB 120) which has been compared to the pending load requests which follow it in the queue of the FIFO PLB 120, is then dispatched to the load handling unit 341, which commences the memory access. In the schematic example illustration of FIG. 18 the memory system which the load handling unit 341 accesses for this purpose comprises the TLB 342 (including look up and fault check circuitry), the L1 cache 160, and the rest of the memory system 365 (accessed in the event of an L1 miss). Whilst this access proceeds, the coalescing circuitry updates any other entries in the PLB 120 which are potential matches (i.e. pass the tentative proximity check) in a "HOLD" state and sends information identifying these candidates to the address proximity check circuitry 332, which performs a more detailed check to determine whether the remaining address bits of the potential matches are the same as that of the outgoing load being handles by the load handling unit 341. When a (close enough) match is not found by the address proximity check 332, then the coalescing circuitry causes these relevant pending load requests in the PLB 120 to be put back into the VALID state. In other words, these load requests will then proceed further through the PLB 120, being available for comparison with other load requests for address proximity and (if not squashed before they get there) to be passed to the load handling unit 241 when they reach the head of the PLB queue 120.

Conversely if a match is found by the address proximity check 332, then the coalescing circuitry causes these relevant pending load requests in the PLB 120 to be changed from HOLD to INVALID and the information about each "squashed" load is passed to the to the decoalescing circuitry 150, so that the required results from the cache can be extracted accordingly. This information can include: the load ID, its offset within the cache line; the size of the request; and the ID of the outgoing load upon which it depends. Note that despite the additional time (e.g. two CPU cycles) taken by the coalescing circuitry to perform these actions with respect to the further load requests (that are squashed in the above example), this is still less than the typical access time of the L1 cache, meaning that the latency of its operation is effectively hidden. The only case when this latency is not hidden is when the further load requests are provisionally put in the HOLD state (due to a tentative proximity match), but are then found not to be full matches by the (full) address proximity test.

Load requests issued by the load handling unit 341 access TLB 342 in order to perform the required lookup (for conversion from virtual to physical addressing) and to respond to any faults appropriately. It should be noted that various types of L1 cache may be provided for example either being virtually indexed or physically indexed, and the access to the TLB 342 may thus precede or follow the L1 cache access accordingly. When the L1 data cache access is carried out and the relevant cache line content is returned (either as a result of cache hit or by further access to the rest of the memory system 365), data read and way multiplexing circuitry 343 handles the cache line data and passes its content to (be accessible to) the decoalescing circuitry 150. The decoalescing circuitry then extracts the required data items (for coalesced load request results comprising multiple data items from one cache line). With reference to the above-described example of a decoupled access-execute processor, these data items can be placed in a buffer 350 (which can for example correspond to the decoupled access buffer 110 of FIG. 2, the decoupled access buffer 234 of FIG. 4, or the decoupled access buffer 311 of FIG. 5), from where they can also be sent to a result cache 370 and/or an "execute" portion of the full processor (such as the access result cache 236 and execute portion 220 of the example of FIG. 4).

The coalescing circuitry 331 of FIG. 18 is also schematically shown to comprise hazard detection circuitry 333, which forms part of the coherency mechanisms which this apparatus supports in the wider data processing system of which it forms part. These coherency mechanisms allow multiple master devices in the system to access and modify) data items in shared regions of memory in a manner with which one of ordinary skill in the art will generally be familiar. The hazard detection circuitry is arranged to receive write notification from an external apparatus, e.g. another master device accessing memory which is shared with this apparatus. These write notifications may for example come from snoop requests which are exchanged in a multi-master system. Thus when the coalescing circuitry passes a load request to the load handling unit 341 (for a particular cache line to be accessed), the hazard detection circuitry 333 of the coalescing circuitry tracks this access until completion and if a write notification pertaining to this cache line is received whilst it is still in-flight, the hazard detection circuitry takes remedial action. If the external apparatus is waiting for an acknowledgement signal before it proceeds to perform the write, and ordering rules define that the local load being performed should complete first, then the hazard detection circuitry delays the sending of the corresponding acknowledgement signal until after the cache line has been retrieved.

The hazard detection circuitry 333 can also take action with respect to the content of the PLB 120. For example when the ordering rules define that the access notified by the external apparatus should complete before the local load, but where the local load is already being handled by the load handing unit (either in its own right or as coalesced with at least one other load request), the hazard detection circuitry reinstates an entry in the pending load buffer circuitry. This may be achieved either by changing the entry's "in-flight" or "invalid" status back to valid, or a corresponding load request can be added to the pending load buffer. The hazard detection circuitry 333 prevents forwarding of the load request to the load handling circuitry until after the modification indicated by the write notification is known to have completed. Also the hazard detection circuitry 333 signals to the decoalescing circuitry that the relevant result of the relevant load request should not be returned.

Figure 19:
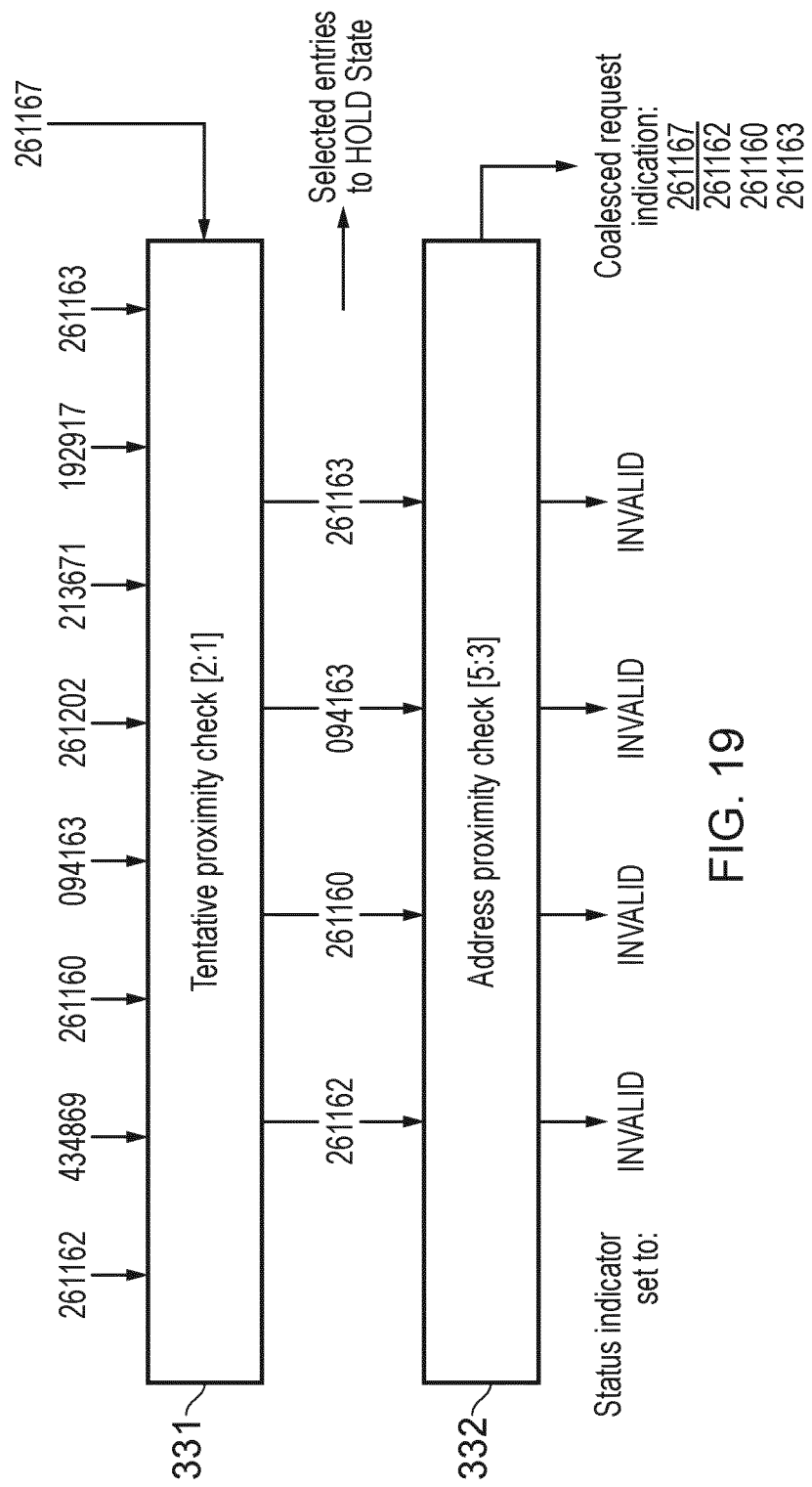
FIG. 19 schematically illustrates a worked example of a tentative proximity check and an address proximity check in accordance with some example implementations.

FIG. 19 illustrates a worked example of the two-stage address comparison checks that are performed in the coalescing circuitry of examples such as that shown in FIG. 18. Here the example hypothetical base memory address against which comparisons are being performed (i.e. corresponding to a valid, pending load request which has reached the head of the pending load buffer) is "261167". It should be noted that this example is given in decimal notation purely for the purposes of legibility here and the principle may readily be transposed into a typical binary implementation. In the first "tentative" stage 331, digits [2:1] of this address are compared with the other addresses relating to pending load requests in the PLB and hence other addresses which also have the content "16" of the digits are determined to tentatively match. The set of four addresses thus selected have the status of their pending load requests in the PLB updated to "hold". Next, in the second "full check" stage 332, digits [5:3] of the base address are compared with the other addresses relating to pending load requests in the PLB. In this example it is determined which of them also have the content "261" for these digits. Those that do not match have the status of their entries in the PLB returned to "valid". Those that do match have the status of their entries in the PLB updated to "invalid", since these will be coalesced. Accordingly in the example shown, the coalesced request indication sent to the decoalesing circuitry indicate that the base request accesses address 261167, and that the result of this request should also be used to extract the data items at addresses 261162, 261160, and 261163. It should be appreciated that this address information does not need to be explicitly communicated and instead may be communicated in a more compact form, for example with an indicator of the base load ID, and the respective offsets within the cache line.

Figure 20:
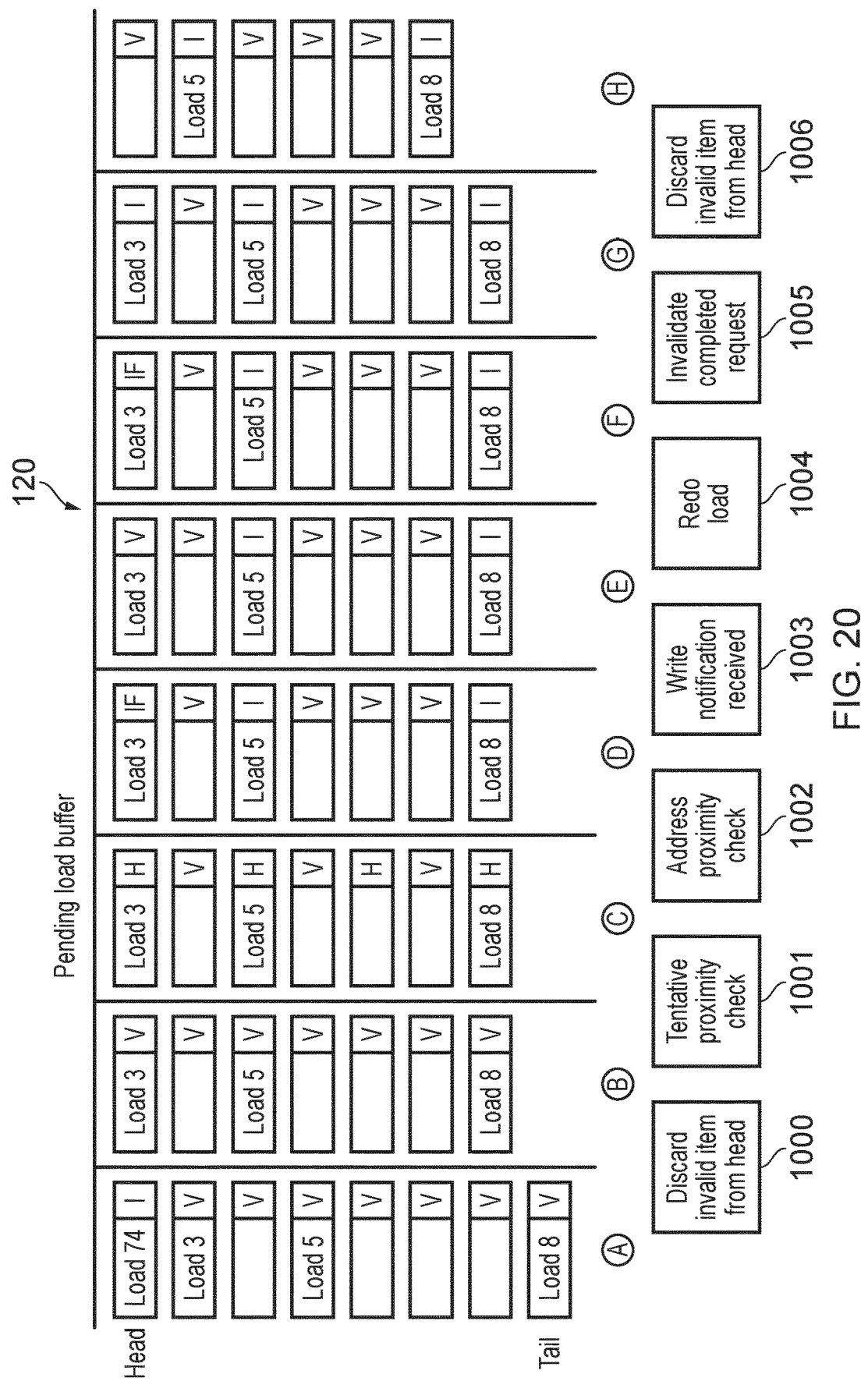
FIG. 20 schematically illustrates the content of a pending load buffer at different stages in a worked example in accordance with some example implementations.

FIG. 20 illustrates the content of a pending load buffer, as the content evolves as an example set of content is processed in accordance with some embodiments. A snapshot of the content of the pending load buffer is illustrated at eight sequential timepoints, A-H, as well as a sequence of actions 1000-1006 which are taken with respect to that content. The entries of the buffer are shown stacked vertically in the figure, with the head of the buffer (i.e. holding the oldest entry) at the top of the figure and the tail of the buffer (i.e. holding the youngest entry) at the bottom of the figure. Content A shows a load relating to address 74 having reached the head of the buffer. This entry is marked as invalid (I) and therefore action 1000 is to discard this invalid item from the head of the buffer, giving content B. Next, action 1001 performs the tentative proximity check, and as a result the head item and any items which could fully match in the address proximity check are marked "hold" (H). Note that in content C this set of pending load requests comprises the "load 3", "load 5", "load 8", and a further load in an entry midway between load 5 and load 8. This entry, all other entries in FIG. 20 other than the "load 3", "load 5", and "load 8" entries is not explicitly named merely in order to facilitate legibility. As a result of the (full) address proximity check performed as action 1002, content D remains in the pending load buffer, where the entry at the head is marked as "in-flight" (IF) (since it as it is forwarded to the load handling circuitry) and the requests for which the address proximity condition was satisfied are marked as "invalid" (I) since they have been coalesced. Note that the request in the entry midway between load 5 and load 8 was found not to match in the address proximity check and its status is reset to "valid" (V)—see content D. Next action 1003 relates to a write notification being received, which corresponds to (and supercedes) at least one of the coalesced load which was issued based on load 3, and as a result this load is squashed (any result generated in the load handling circuitry is discarded) and is reinstated in the PLB by marking it as valid again. Content E results. There is then a valid pending load request at the head of the queue and action 1004 initiates the load is again (forwarding this request to the load handling circuitry) and the entry in the PLB is marked as in-flight (content F). At this attempt "load 3" completes successfully, the results of the load request being returned from the decoalesing circuitry along with those corresponding to "load 5" and "load 8" and action 1005 then marks the "load 3" request as invalid (see content G). Finally action 1006 discards this invalid request at the head of the queue, giving content H. Note that the entries for "load 5" and "load 8" will also subsequently simply be discarded when they reach the head of the queue.

Figure 21:
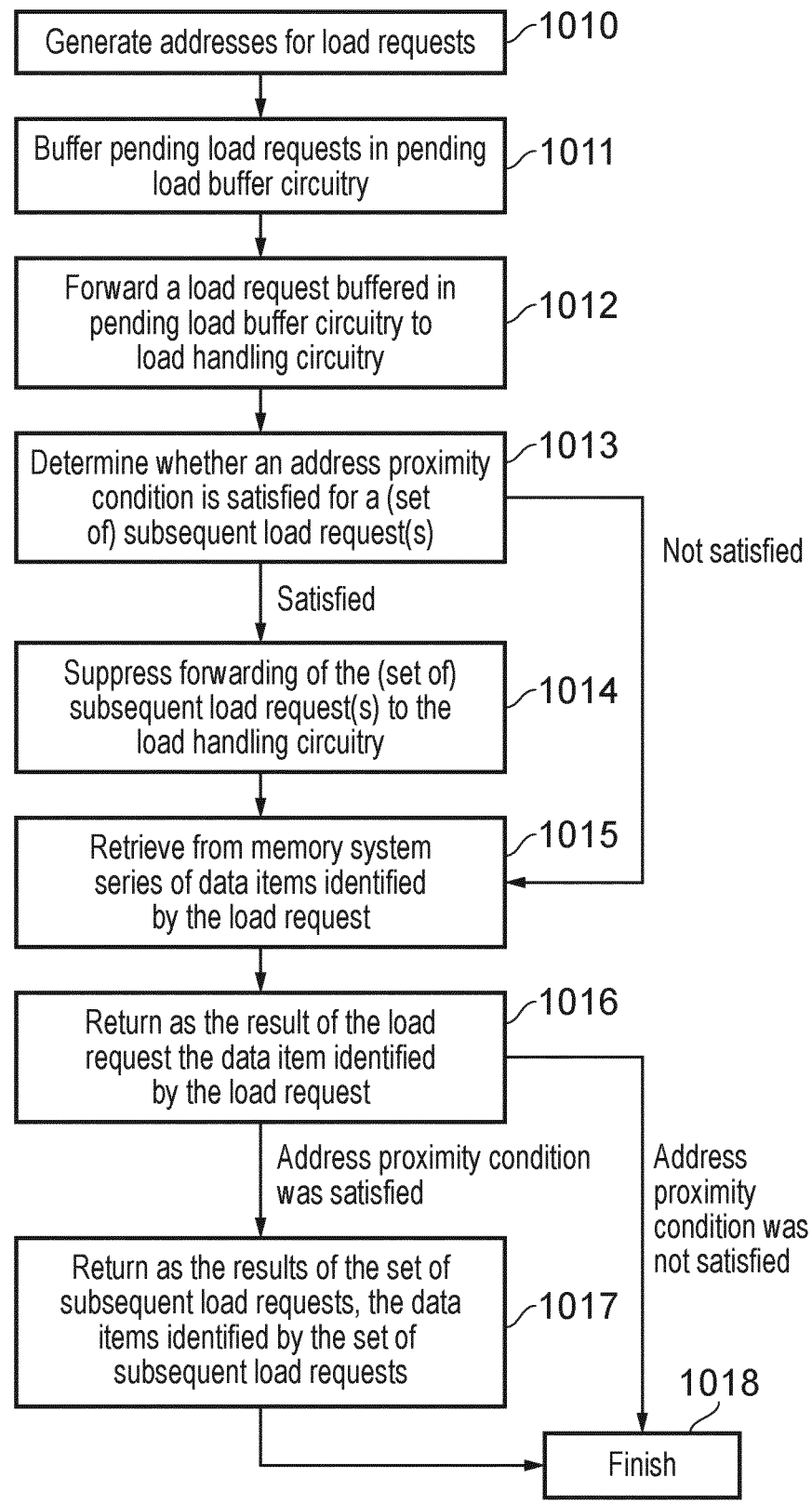
FIG. 21 is a flowchart illustrating a method of performing data processing operations in accordance with some example implementations.

FIG. 21 shows a sequence of steps which are taken according to the method of some embodiments. The sequence begins at step 1010 with the generation of addresses required for load requests. Pending load requests are buffered at step 1011 in the pending load buffer circuitry. At step 1012 a pending load request (which has reached the head of the queue formed by the pending load buffer) is forwarded to load handling circuitry to be performed. It is then determined at step 1013 whether an address proximity condition is satisfied with respect to this just issued load request for one or more subsequent load requests in the pending load buffer. When the address proximity condition is satisfied the flow proceeds to step 1014, where the forwarding to the load handling circuitry of one or more subsequent load requests satisfying that address proximity condition is suppressed. If however at step 1013 it is found that the address proximity condition is not satisfied, then the flow proceeds to step 1015. From step 1014 the flow also proceeds to step 1015. At step 1015 a set of data items identified by the forwarded load request are retrieved from the memory system. At step 1016 as a result of the load request the data item identified by the load request itself is returned. If the address proximity condition was found not to be satisfied at step 1013 then from step 1016 the flow proceeds to step 1018 where this sequence of steps finishes. If however the address proximity condition was found to be satisfied at step 1013 then from step 1016 the flow proceeds via step 1017, where in addition data items corresponding to the one or more subsequent load requests are returned. The flow then concludes at step 1018.

Figure 22:
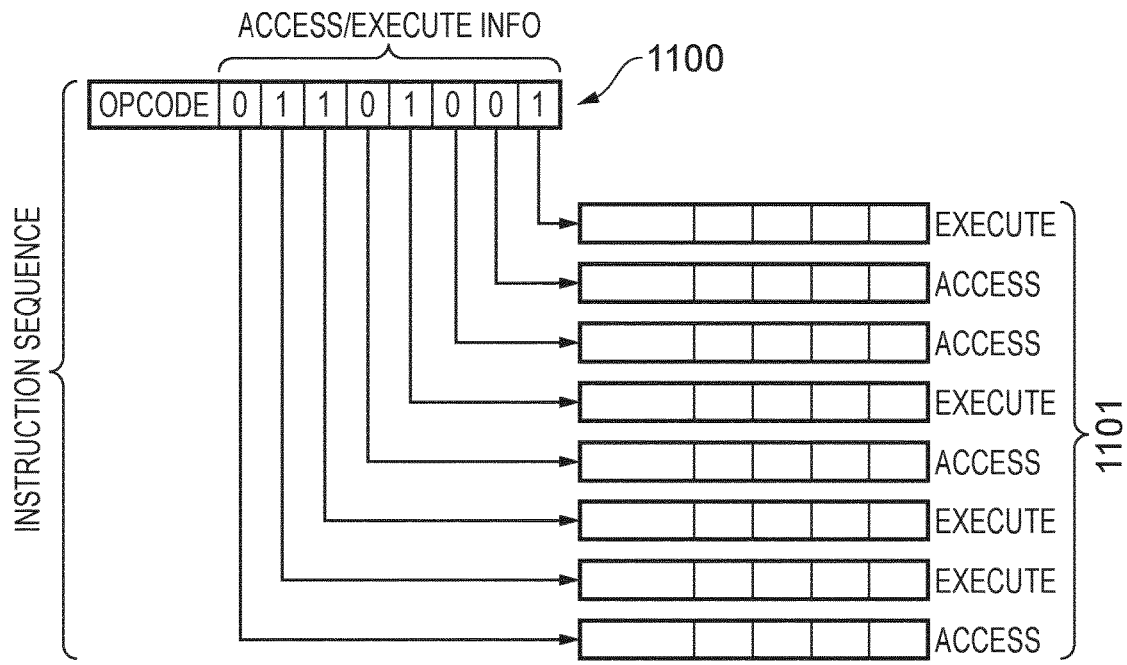
FIG. 22 schematically illustrates a sequence of instructions including a first instruction according to some embodiments which defines whether each of a set of subsequent instructions is an execute or an access instruction.

FIG. 22 illustrates an instruction sequence which comprises a steering instruction 1100 according to some embodiments and is followed by a number of further (other) instructions 1101. In accordance with the present techniques the steering instruction 1100 is provided in order to give the processor information relating to the subsequent instructions 1101, and in particular to indicate for each whether it is to be treated as an "execute" instruction or an "access" instruction. The purpose of this categorisation in the context of a decoupled access-execute processor is described above, with reference to the preceding figures showing the principles of decoupled access-execute processors (and examples thereof) according to the present techniques, discussion of the categorisation of instructions as an "execute" instruction or an "access" instruction and data dependency graph examples, and so on. In the example of FIG. 22 the steering instruction 1100 can be seen to essentially comprise two portions. A first "opcode" portion where a particular bit encoding identifies this instruction as this type of steering instruction to the decoding circuitry of the apparatus and another portion giving information relating to the categorisation (access or execute) of the set of subsequent instructions. Further, in the example of FIG. 22 it can be seen that the information in the instruction 1100 is presented explicitly, i.e. in terms of immediate values, where in this example a 0 indicates an access instruction, whilst a 1 indicates an execute instruction. Note that as mentioned above the set of instructions 1101 to which the these access/execute labels apply may immediately follow the steering instruction 1100, or (in particular for timing purposes, one or more other instructions—not shown—may be present in the instruction sequence between the steering instruction 1100 and the first of the set of instructions 1101).

Figure 23:
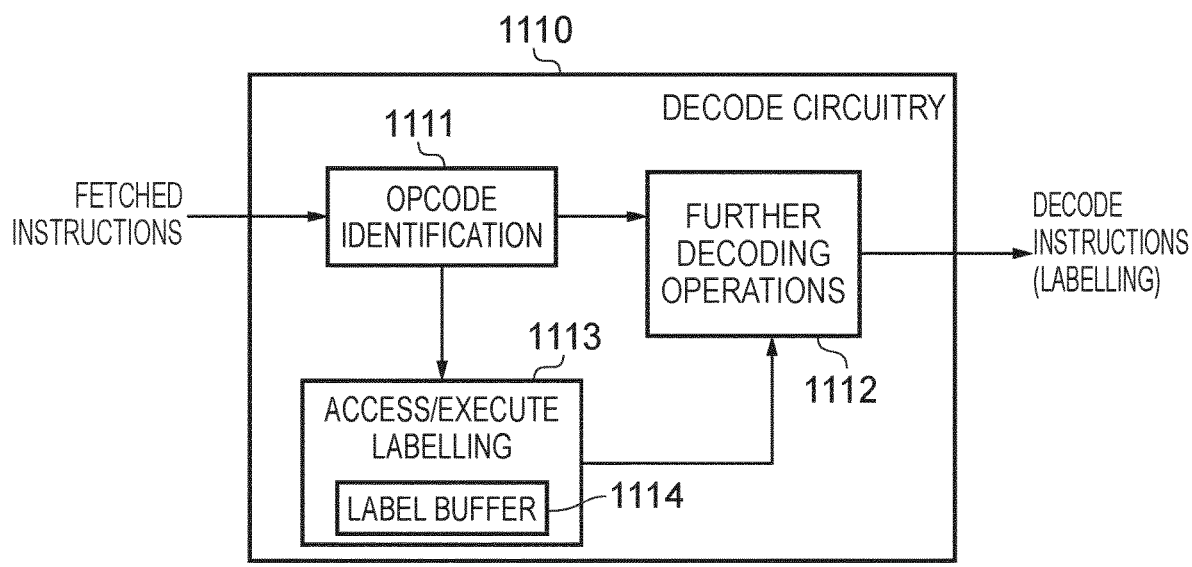
FIG. 23 schematically illustrates decoding circuitry in some embodiments.

FIG. 23 schematically illustrates decode circuitry 1110 in some embodiments. This decode circuitry may for example be the decode circuitry 102 in FIG. 2, the decode circuitry 204 in FIG. 4, the decode circuitry 302 in FIG. 5, the decode part of the circuitry 501 in FIG. 9, the decode circuitry 702 in FIG. 12, and/or the decode circuitry 800 in FIG. 15A. The decode circuitry 1110 is shown in FIG. 23 to comprise opcode identification circuitry 1111, circuitry for performing further decoding operations 1112, and access/execute labelling circuitry 1113. It will be understood by one of ordinary skill in the art that decode circuitry 1110 is only illustrated at a relatively high level of abstraction in order to communicate the points of relevance to the discussion of the present techniques. Thus many components of contemporary decode circuitry which would typically be present are not represented in the figure for clarity purposes only. The sequence of instructions, i.e. the fetched instructions, are received by the decode circuitry 1110 and the opcode identification circuitry 1111 identifies the steering instruction(s) of the present techniques by a particular opcode forming part of the instruction. When one of these instructions is identified, the opcode identification circuitry 1111 signals this to the access/execute labelling circuitry 1113, and passes the access/execute information encoded in the instruction as well. In the example embodiment of FIG. 23 the opcode identification circuitry 1111 is arranged to recognise a steering instruction of the type illustrated in the FIG. 22 and accordingly the explicit access/execute information provided as part of that instruction is then directly passed to the access/execute labelling circuitry 1113. This is stored in the label buffer 1114, which forms part of the access/execute labelling circuitry 1113. In this manner the relevant labels for the subsequent set of instructions 1101 of FIG. 22 are held by the decode circuitry 1110 and then as this sequence of subsequent instructions is received the respective labels are applied. The application of these labels is performed by the further decoding operation circuitry 1112, which receives the relevant label for each subsequent instruction. Accordingly, the output of the decode circuitry 1110 is decoded instructions labelled according to whether they are of the "access" or the "execute" type. Note that the decode circuitry 1110 is arranged to have a default labelling, which here is that the processor treats instructions as "access" by default (unless they are of a particular type, which for other reasons requires them to be forwarded to a particular part of the processor which is the only way in which these particular instruction can be executed).

Figure 24:
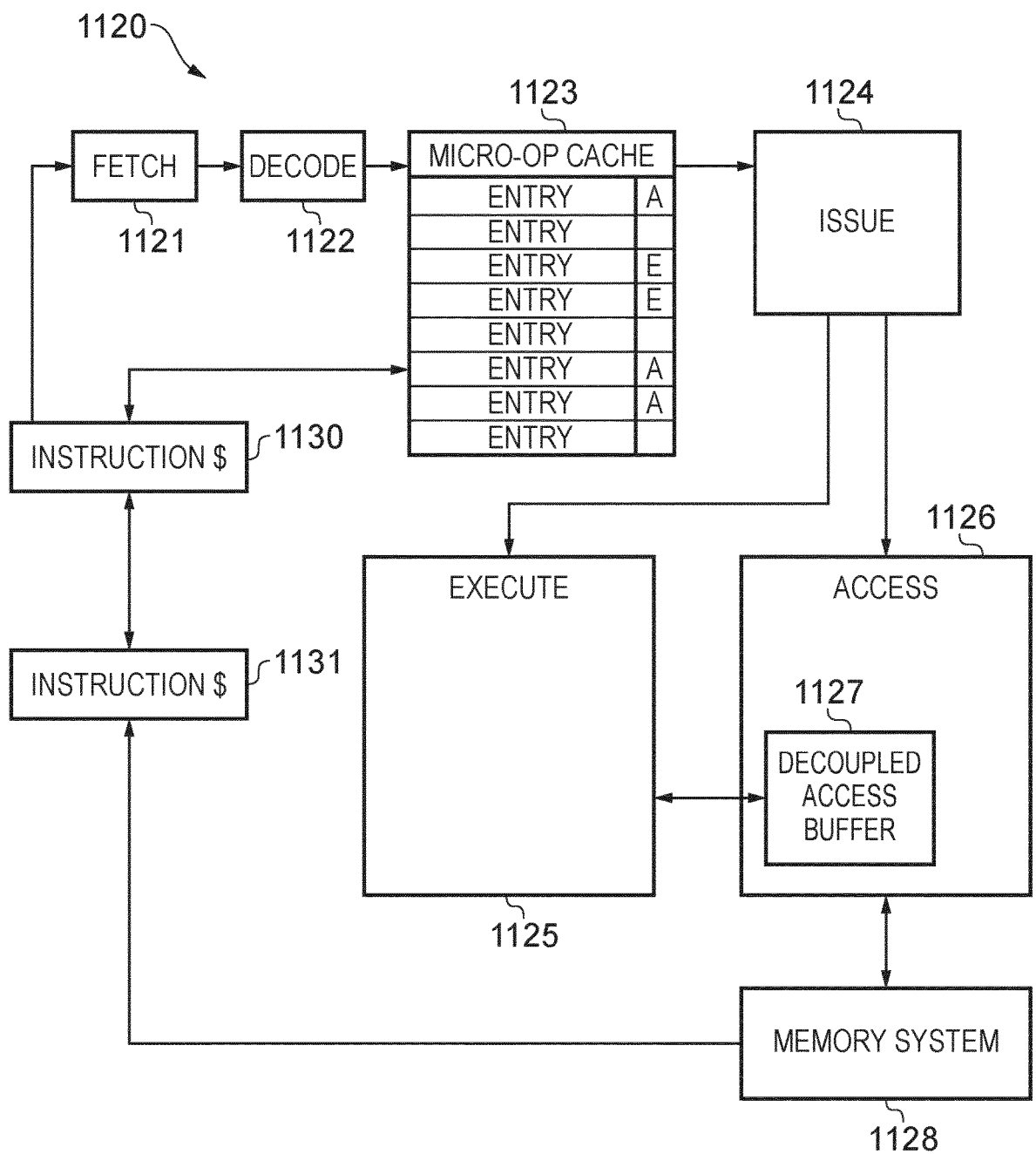
FIG. 24 schematically illustrates a data processing apparatus including a micro-op cache in some embodiments.

FIG. 24 schematically illustrates an apparatus 1120 in some example embodiments. Fetch circuitry 1121 receives instructions retrieved from the memory system and provides these to the decode circuitry 1122, which performs decoding operations, which may be generally described above with reference to FIG. 23. As shown in FIG. 24 the memory system comprises (at least) the instruction caches 1130 and 1131 to seek to avoid as often as possible the full latency associated with retrieving an instruction from its original storage location in memory. A further feature of the apparatus 1120 of FIG. 24 is the micro-op cache 1123 where micro-ops resulting from the decoding of instructions are temporarily stored. The issue circuitry 1124 retrieves instructions from the micro-op cache 1123 (if stored there) in order to issue instructions to one of the execute execution circuitry 1125 and the access execution circuitry 1126. The access execution circuitry 1126 comprises a decoupled access buffer 1127 to which the execute execution circuitry 1125 has access. The further memory system 1128 (i.e. other than the instruction caches 1130 and 1131, and for example possibly also including one or more shared caches and/or system caches before the actual memory) is also shown. It will therefore be understood that the execute execution circuitry 1125 and the access execution circuitry 1126, and the decoupled access buffer 1127 shown in FIG. 24 may be considered to be any of the examples of these components described above with reference the preceding figures.

Referring to the micro-op cache 1123 in FIG. 24, note that each entry in the micro-op cache can have an additional label associated with it (A or E) indicating whether this is to be handled as an access or an execute instruction (micro-op). The decode circuitry 1123 is arranged, on the basis of the categorisation of instructions which follow a steering instruction according to the present techniques to apply labels to the decoded instructions (and/or their equivalent micro-ops) that are stored in the micro-op cache 1123. Thus when the issue circuitry 1124 accesses entries in the micro-op cache 1123, it may also be provided with associated categorisation (label) information, and thus can direct these micro-ops to the appropriate execution circuitry 1125 or 1126 on this basis. The instruction caches 1130 and 1131 can also store the associated categorisation information (labels) applied to entries in the micro-op cache 1123, as generated by the decode circuitry 1122, and accordingly these labels can be preserved when entries are evicted from the micro-op cache to these illustrated levels (there may be more) of the instruction cache hierarchy.

Figure 25:
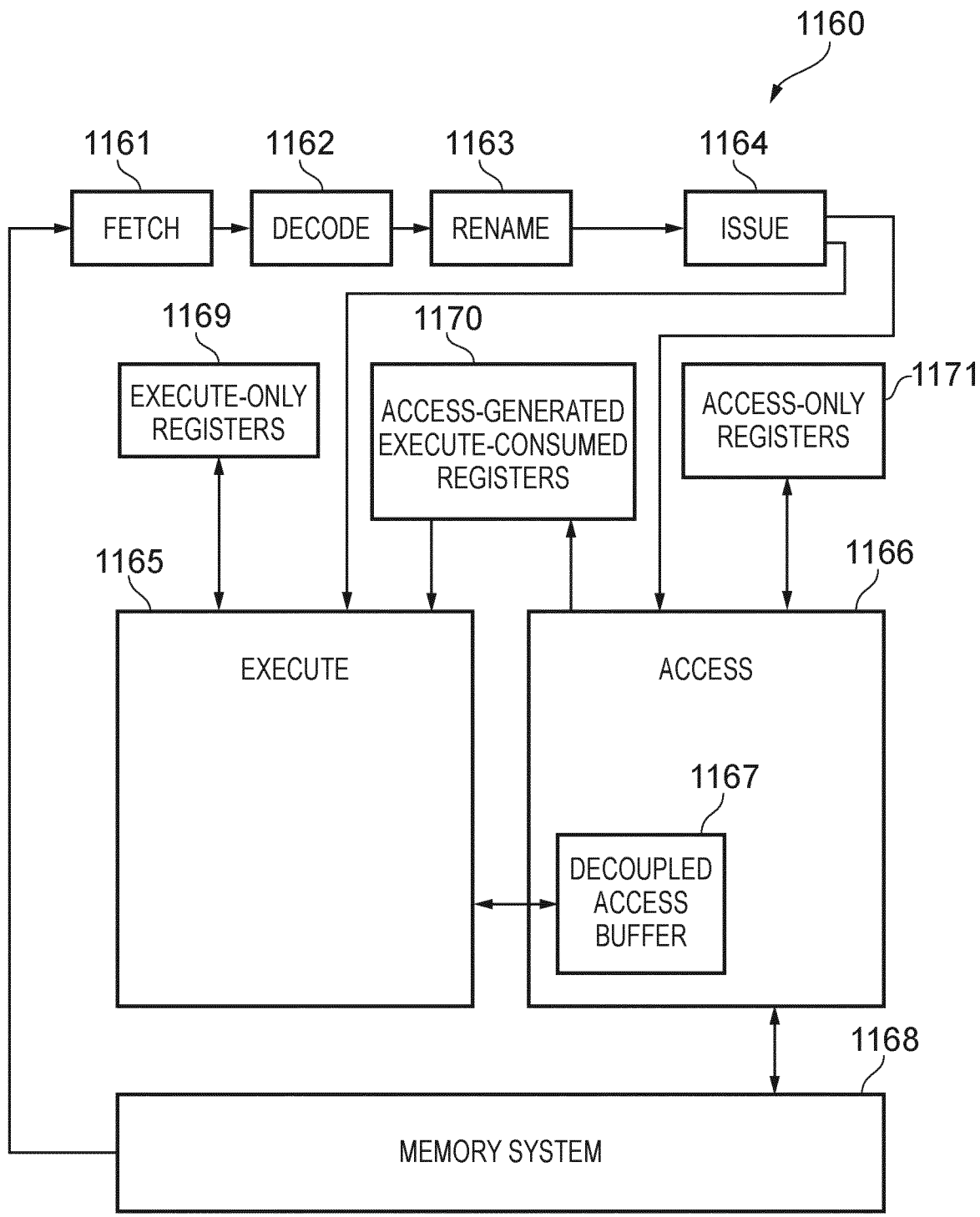
FIG. 25 schematically illustrates a data processing apparatus including groups of registers in some embodiments.

FIG. 25 schematically illustrates an apparatus 1160 in some example embodiments. Fetch circuitry 1161 receives instructions retrieved from the memory system 1168 and provides these to the decode circuitry 1162, which performs decoding operations, which may be generally described above with reference to FIG. 23. The apparatus also comprises register renaming circuitry 1163, which performs register renaming operations to allow out-of-order instruction execution. Thus remapped (renamed) instructions are passed to the issue circuitry 1164 which issues instructions to one of the execute execution circuitry 1165 and the access execution circuitry 1166. The access execution circuitry 1166 comprises a decoupled access buffer 1167 to which the execute execution circuitry 1165 has access. It will be understood that the execute execution circuitry 1165, the access execution circuitry 1166, and the decoupled access buffer 1167 shown in FIG. 25 may be considered to be any of the examples of these components described above with reference the preceding figures. FIG. 25 also shows three groups of physical registers 1169, 1170, and 1171. Although illustrated separately in FIG. 25, these are to be understood as one set of physical registers and the sub-division into the groups shown is not physical. The three subsets shown are made use of by the rename circuitry 1163 for the instructions which it processes in dependence on whether a given instruction is an "access" or an "execute" instruction. When the decode circuitry 1162 encounters a steering instruction according to the present techniques, it generates control signals to modify the renaming operations of the register renaming circuitry 1163, so that the groups of registers are used for the subsequent instructions which are "steered", in dependence on their type. Here, the registers 1171 hold values which are generated by "access" instructions and consumed only by other "access" instructions; registers 1170 hold values which are generated by "access" instructions and consumed by "execute" instructions; and registers 1169 hold values which are generated by "execute" instructions and consumed only by other "execute" instructions.

Figure 26A:
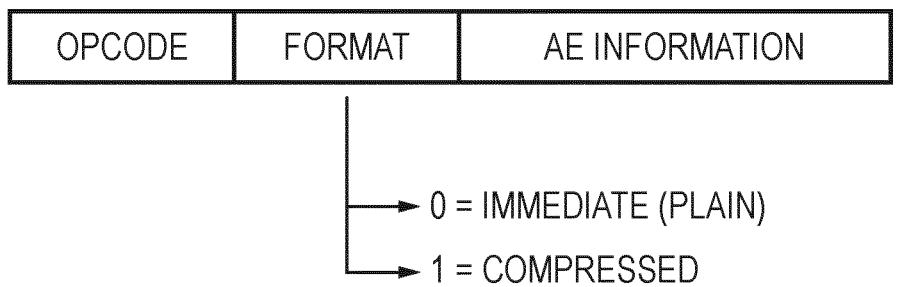
FIGS. 26A-C schematically illustrate three versions of instructions according to the present techniques in some example embodiments.
Figure 26B:
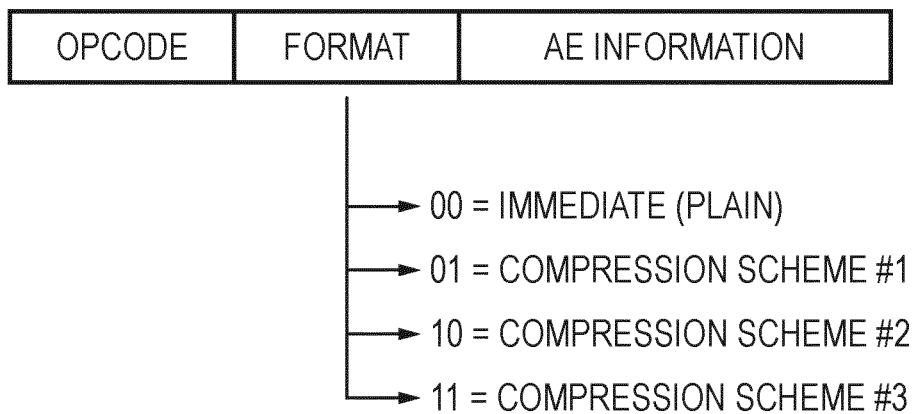
Figure 26C:
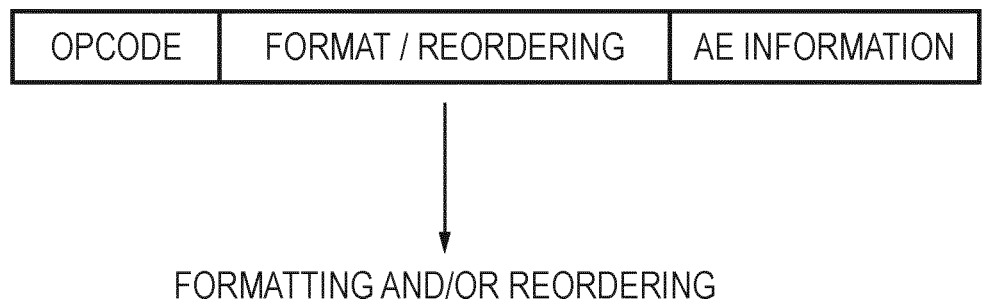

FIGS. 26-C schematically illustrate the structure of steering instructions according to the present techniques in some embodiments. In FIG. 26A the instruction is shown to comprise an opcode, formatting information, and the access/execute (AE) information for one or more subsequent instructions. In the example of FIG. 26A the formatting information is binary, where a value of 0 indicates that the AE information is immediate (i.e. plain) and in the manner of FIG. 22 each bit value in the set of AE information corresponds to one subsequent instruction, indicating its type. Conversely a format value of 1 indicates that the AE information is compressed. This compression may be fixed and predetermined, so no further information is required in the instruction for the decode circuitry to interpret it (by suitably decompressing it). FIG. 26B shows an example in which the format information comprises two binary bits. As in the case of FIG. 26A a first value (here of 00) indicates that the AE information is immediate (i.e. plain), directly indicating the categorisation of the sequence of subsequent instructions. The three other possible values of the binary pair indicate which one of the three different compression schemes (#1, #2, or #3) has been used in order to encode the AE information in the instruction. In this example the compression scheme #1 (indicated by format information of 01) is run-length encoding (RLE) such that for example the pattern "AAAAAAEEEAAAAA" is (logically) presented in the AE information as {6A, 3E, 5A}. Run-length encoding (RLE) is known and not described in greater detail here—one of ordinary skill in the art can apply any known RLE procedure and representation to the AE information. In the example of FIG. 26B format information of "10" (compression scheme #2) indicates a compression scheme according to which the pattern "AAAEEAAAAAEEEEEE" is presented in the AE information as {A, 3, 2, 5, 6}. Possible compression scheme #3 is not used in example of FIG. 26B, but in fact more bits may be used in the instruction encoding (to the extent they are available) as required to indicate more compression schemes. The example of FIG. 26C shows that the instruction comprises opcode information, AE information, and format/reordering information. The format/reordering information thus indicates a compression scheme used (or not) (as in the examples of FIGS. 26A and 26B), but in addition indicates (for example by a further single binary bit) whether prior to the compression being applied (or not) a known reordering (fixed permutation) has been applied to the bits before any compression scheme has been applied. This reordering may be applied at the point when the instruction is created, or may be subsequently applied by a compiler when the compiler changes the ordering of instructions. The compiler may do this anyway for other reasons, but may explicitly do this in order to enable the grouping of access and execute instructions to lend itself to compression and thus improve the compression ratio.

Figure 27:
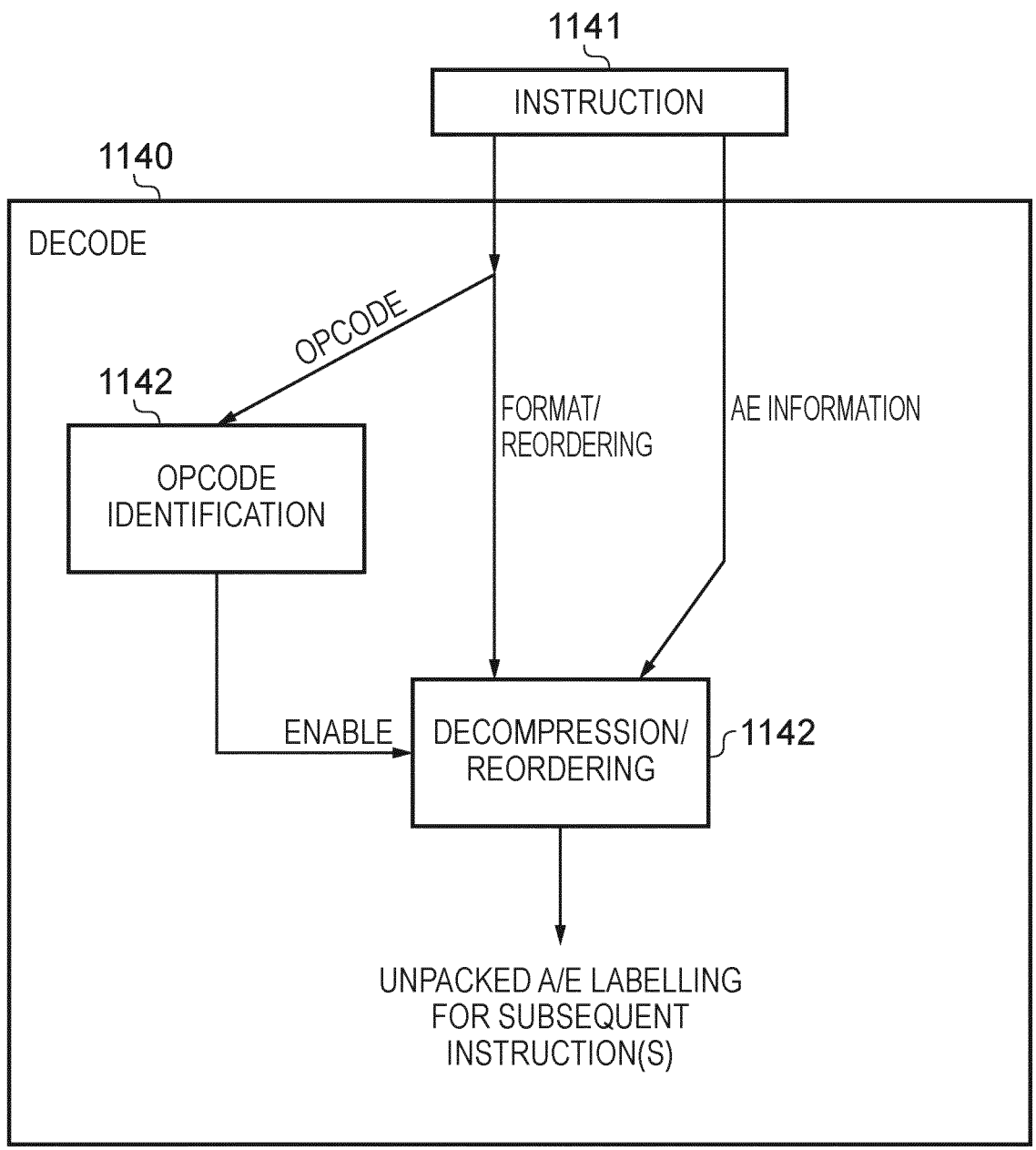
FIG. 27 schematically illustrate decoding circuitry in some embodiments.

FIG. 27 schematically illustrates decode circuitry 1140 in some embodiments. This may be the decode circuitry of any of the above described examples or figures. This figure demonstrates how instructions of one of the formats shown in FIGS. 26A-C may be received, handled, and decoded by decoding circuitry. An instruction 1141 is received by the decode circuitry 1141 and the opcode portion is routed to opcode identification circuitry 1142. The format information (and reordering information if present), as well as the AE information is routed to the decompression/reordering circuitry 1142. The opcode identification circuitry 1142 provides control information to the decompression/reordering circuitry 1142, in order that the type of instruction and in particular the nature of the formatting information (see for example the examples of FIGS. 26A-C is correctly applied in the decompression/reordering circuitry 1142). The decompression/reordering circuitry 1142 then decompresses the AE information (if required) and performs an inverse reordering (if required), in order to generate the required unpacked A/E labelling required for at least one subsequent instruction. It will be recognised that typically, for efficiency reasons, as many subsequent instructions as possible are labelled (in the available coding space) by a given steering instruction.

Figure 28:
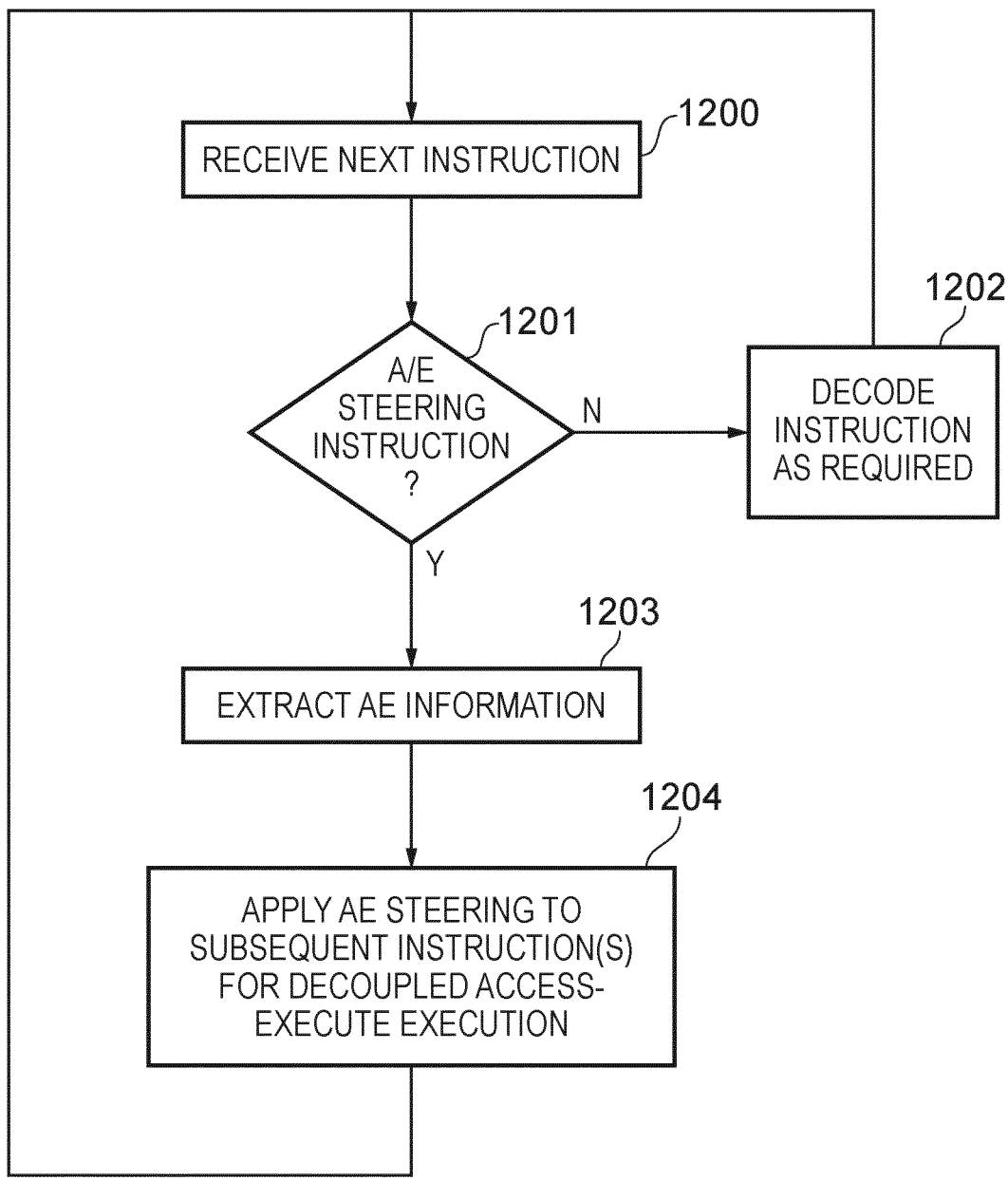
FIG. 28 is a flow diagram showing a sequence of steps taken by decoding circuitry according to some embodiments.

FIG. 28 is a flow diagram showing a sequence of steps that are taken according to the method of some embodiments by decoding circuitry. This may be the decode circuitry of any of the above described examples or figures. At step 1200 a next instruction is received by the decoding circuitry and at step 1201 it is determined if this is one of the A/E steering instructions of the present techniques. If it is not then the flow proceeds to step 1202 where the decoding circuitry decodes this instruction "normally" as required (as indeed will typically be the case for the majority of instructions received by decoding circuitry) in order for the apparatus to carry out its general data processing operations. However when an A/E steering instruction is encountered, the flow proceeds to step 1203, where the AE information is extracted from the instruction. Then at step 1204 this AE steering (i.e. the labelling or categorisation of individual instructions) is applied to the relevant subsequent instruction(s) for decoupled access-execute execution by the apparatus. Refer to any of the above described example for more detail of this decoupled access-execute execution. The flow returns to step 1200.

Figure 29:
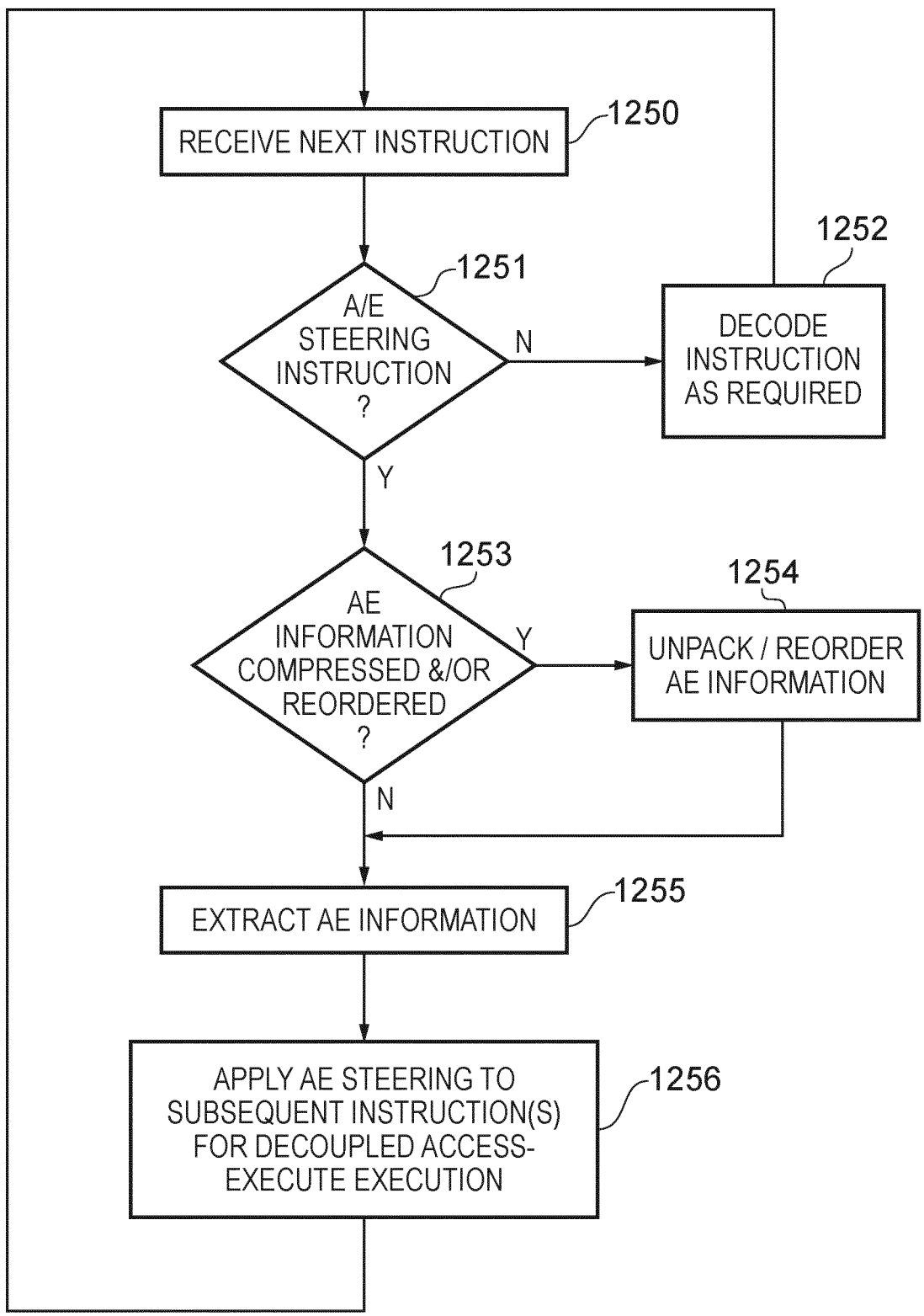
FIG. 29 is a flow diagram showing a sequence of steps taken by decoding circuitry according to some embodiments.

FIG. 29 is a flow diagram showing the sequence of steps which are taken according to the method of some embodiments by decoding circuitry, when the steering instruction(s) further comprise(s) compressed AE information. This may be the decode circuitry of any of the above described examples or figures. The flow can be considered to begin at step 1250, where the next instruction to be decoded is received by the decoding circuitry. It is then determined at step 1251 if this is an A/E steering instruction according to the present techniques and, as in the case of FIG. 28, when it is not the flow proceeds via steps 1252 in order for this instruction to be "normally" decoded and the flow returns to step 1250. In the case that an A/E steering instruction is encountered the flow proceeds to step 1253 where it is further determined if the instruction indicates that the AE information is compressed and.or reordered. If it is then the flow proceeds via step 1254 in order for this AE information to be unpacked, where it will be understood that this unpacking may comprise decompression and/or reordering as was discussed above in particular with reference to FIGS. 26A-C and FIG. 27. From steps 1253 (without compression/reordering) or from step 1254 (with compression/reordering) the flow then proceeds to step 1255 for the originally plain/uncompressed/reordered AE information to be extracted. Then at step 1256 this AE steering is applied to the relevant subsequent instruction(s) for decoupled access-execute instruction. Again, refer to any of the above described example for more detail of this decoupled access-execute execution. The flow returns to step 1250.

Figure 30:
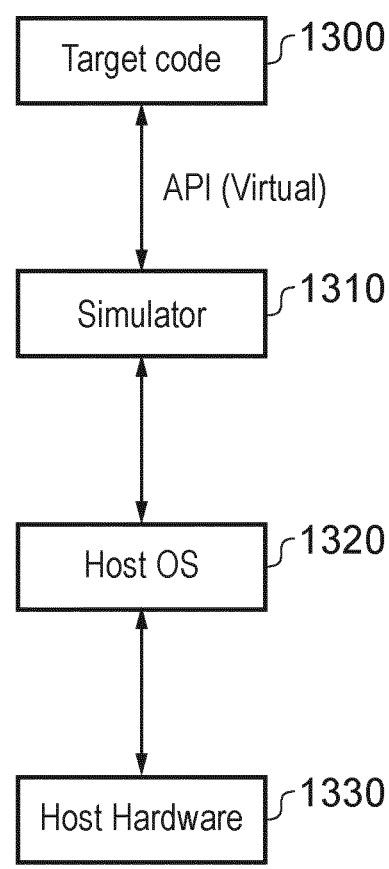
FIG. 30 schematically illustrates a simulator implementation which may be used in some embodiments.

FIG. 30 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1330, optionally running a host operating system 1320, supporting the simulator program 1310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1330), some simulated embodiments may make use of the host hardware, where suitable.

The simulator program 1310 may be stored on a computer-readable storage medium (which may be a non-transitory medium), and provides a program interface (instruction execution environment) to the target code 1300 which is the same as the application program interface of the hardware architecture being modelled by the simulator program 310. Thus, the program instructions of the target code 1300 in such embodiments comprise the above discussed novel steering instructions for providing A/E labelling and may be executed from within the instruction execution environment using the simulator program 1310, so that a host computer 1330 which does not actually have the hardware features of the apparatuses discussed above can emulate these features.

In brief overall summary apparatuses and methods of data processing are disclosed. When load requests are generated to support data processing operations, the load requests are buffered in pending load buffer circuitry prior to being carried out. Coalescing circuitry determines for a first load request whether a set of one or more subsequent load requests buffered in the pending load buffer circuitry satisfies an address proximity condition. The address proximity condition is satisfied when all data items identified by the set of one or more subsequent load requests are comprised within a series of data items which will be retrieved from the memory system in response to the first load request. When the address proximity condition is satisfied, forwarding of the set of one or more subsequent load requests is suppressed. On receipt of the series of data items retrieved by load handling circuitry decoalescing circuitry returns the data item identified by the load request and, when the address proximity condition is satisfied, one or more further data items for the one or more subsequent load requests.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus to perform data processing operations, the data processing operations comprising loading data items from a memory system, the apparatus comprising:
   address generation circuitry to generate addresses for load requests;
   pending load buffer circuitry to buffer the load requests received from the address generation circuitry prior to the load requests being carried out to retrieve data items using the addresses of the load requests;

load handling circuitry responsive to a load request to retrieve from the memory system a series of data items comprising the data item identified by the load request;

coalescing circuitry to forward the load request buffered in the pending load buffer circuitry to the load handling circuitry and arranged to determine for a set of one or more subsequent load requests buffered in the pending load buffer circuitry whether an address proximity condition is satisfied, wherein the address proximity condition is satisfied when all data items identified by the set of one or more subsequent load requests are comprised within the series of data items, and wherein the coalescing circuitry is responsive to the address proximity condition being satisfied to suppress forwarding of the set of one or more subsequent load requests; and decoalescing circuitry to receive the series of data items retrieved by the load handling circuitry and to return as the result of the load request the data item identified by the load request, wherein the decoalescing circuitry is responsive to the address proximity condition being satisfied to return, for each of the subsequent load requests in the set of one or more subsequent load requests, one or more further data items identified by the one or more subsequent load requests from the series of data items as the results of the one or more subsequent load requests.

2. The apparatus according to claim 1, wherein the series of data items is a cache line and the address proximity condition is satisfied when the data item identified by the load request and all data items identified by the set of one or more subsequent load requests are comprised within the cache line.

3. The apparatus according to claim 1, wherein the address proximity condition is satisfied when an absolute difference between the address for the load request and the address for each of the set of one or more subsequent load requests is less than a predetermined threshold.

4. The apparatus according to claim 1, wherein the coalescing circuitry is arranged, prior to determining whether the address proximity condition is satisfied, to determine for the set of one or more subsequent load requests buffered in the pending load buffer circuitry whether a tentative proximity condition is satisfied, wherein the coalescing circuitry is responsive to the tentative proximity condition being satisfied to forward the load request to the load handling circuitry and to provisionally suppress forwarding of the set of one or more subsequent load requests, and wherein the coalescing circuitry is responsive to the address proximity condition not being satisfied to cease provisionally suppressing forwarding of the set of one or more subsequent load requests.

5. The apparatus according to claim 4, wherein the tentative proximity condition is satisfied when a first portion of all addresses of the set of one or more subsequent load requests match a first portion of the address of the load request, and the address proximity condition is satisfied when the tentative proximity condition is satisfied and when a second portion of all addresses of the set of one or more subsequent load requests match a second portion of the address of the load request.

6. The apparatus according to claim 4, wherein the pending load buffer circuitry is arranged to store for each of the load requests buffered in the pending load buffer circuitry a status indicator, wherein the status indicator for load requests received from the address generation circuitry is initially set to indicate a valid state, wherein in response to the address proximity condition being satisfied the status indicator corresponding to the set of one or more subsequent load requests is set to indicate an invalid state, and the coalescing circuitry is responsive to an invalid load request in the pending load buffer circuitry to suppress forwarding of the invalid load request_wherein in response to the tentative proximity condition being satisfied the status indicator for the set of one or more subsequent load requests is set to indicate a hold state, wherein the coalescing circuitry is responsive to a load request having the hold state in the pending load buffer circuitry to provisionally suppress forwarding of the load request having the hold state, and wherein in response to the address proximity condition not being satisfied the status indicator corresponding to the set of one or more subsequent load requests is reset to the valid state.

7. The apparatus according to claim 1, wherein the coalescing circuitry is responsive to the address proximity condition being satisfied to provide a coalesced request indication to the decoalescing circuitry identifying the load request and the set of one or more subsequent load requests; and the decoalescing circuitry is responsive to the coalesced request indication to identify the one or more further data items based on the coalesced request indication.

8. The apparatus according to claim 1, wherein the pending load buffer circuitry comprises a FIFO buffer, wherein the load request is an oldest load request in the FIFO buffer, and wherein the set of one or more subsequent load requests are younger load requests in the FIFO buffer.

9. The apparatus according to claim 1, further comprising: hazard detection circuitry to detect an action relating to modification of the series of data items, and in response to detecting the action relating to modification of the series of data items to cause performance of a memory consistency operation to ensure that the load handling circuitry retrieving the series of data items and the modifying the series of data items are performed in an order specified by a memory consistency protocol.

10. The apparatus according to claim 9, wherein the memory consistency operation comprises:

reinstating the load request in the pending load buffer circuitry and preventing forwarding of the load request to the load handling circuitry until after the modification of the series of data items has been completed; and preventing the decoalescing circuitry returning as the result of the load request the data item from the series of data items, when the series of data items was retrieved before the operation to modify the series of data items had completed.

11. The apparatus according to claim 10, wherein reinstating the load request in the pending load buffer comprises adding the load request to the pending load buffer.

12. The apparatus according to claim 10, wherein the pending load buffer circuitry is arranged to store for each of the load requests buffered in the pending load buffer circuitry a status indicator, wherein the status indicator for load requests received from the address generation circuitry is initially set to indicate a valid state, wherein in response to the address proximity condition being satisfied the status indicator corresponding to the set of one or more subsequent load requests is set to indicate an invalid state, and the coalescing circuitry is responsive to an invalid load request in the pending load buffer circuitry to suppress forwarding of the invalid load request. wherein when the load request is forwarded the status indicator of the load request is set to indicate an in-flight state, wherein in response to the decoalescing circuitry returning as the result of the load request the data item identified by the load request, the status indicator corresponding to the load request is set to the invalid state, and wherein reinstating the load request in the pending load buffer comprises resetting the status indicator corresponding to the load request to the valid state.

13. The apparatus according to claim 9, wherein the action relating to modification of the series of data items is a write notification issued by a further apparatus, and the apparatus is responsive to detecting the write notification to delay sending an acknowledgement for the write notification until after the series of data items has been retrieved by the load handling circuitry, wherein the acknowledgement signals permission to proceed with the modification of the series of data items.

14. The apparatus according to claim 1, wherein the pending load buffer circuitry is arranged to store for each of the load requests buffered in the pending load buffer circuitry a status indicator, wherein the status indicator for load requests received from the address generation circuitry is initially set to indicate a valid state, wherein in response to the address proximity condition being satisfied the status indicator corresponding to the set of one or more subsequent load requests is set to indicate an invalid state, and the coalescing circuitry is responsive to an invalid load request in the pending load buffer circuitry to suppress forwarding of the invalid load request.

15. A method of operating an apparatus to perform data processing operations, the data processing operations comprising loading data items from a memory system, the method comprising:

generating addresses for load requests;

buffering in pending load buffer circuitry the load requests prior to load handling circuitry carrying out the load requests to retrieve data items using the addresses of the load requests;

forwarding to the load handling circuitry a load request buffered in the pending load buffer circuitry a load request to retrieve from the memory system a series of data items comprising the data item identified by the load request;

determining for a set of one or more subsequent load requests buffered in the pending load buffer circuitry whether an address proximity condition is satisfied, wherein the address proximity condition is satisfied when all data items identified by the set of one or more subsequent load requests are comprised within the series of data items, suppressing, responsive to the address proximity condition being satisfied, forwarding of the set of one or more subsequent load requests to the load handling circuitry;

retrieving, responsive to the load request, from the memory system the series of data items comprising the data item identified by the load request;

receiving the series of data items retrieved and returning as the result of the load request the data item identified by the load request; and returning, responsive to the address proximity condition being satisfied, for each of the subsequent load requests in the set of one or more subsequent load requests, one or more further data items identified by the one or more subsequent load requests from the series of data items as the results of the one or more subsequent load requests.

16. Apparatus to perform data processing operations, the data processing operations comprising loading data items from a memory system, the apparatus comprising:

means for generating addresses for load requests;

means for buffering the load requests prior to means for handling loads carrying out the load requests to retrieve data items using the addresses of the load requests;

means for forwarding to the means for handling loads a load request buffered in the means for buffering a load request to retrieve from the memory system a series of data items comprising the data item identified by the load request, wherein the means for handling loads is responsive to the load request, to retrieve from the memory system the series of data items comprising the data item identified by the load request;

means for determining for a set of one or more subsequent load requests buffered in the means for buffering whether an address proximity condition is satisfied, wherein the address proximity condition is satisfied when all data items identified by the set of one or more subsequent load requests are comprised within the series of data items, means for suppressing, responsive to the address proximity condition being satisfied, forwarding of the set of one or more subsequent load requests to the means for handling loads, means for receiving the series of data items retrieved and for returning as the result of the load request the data item identified by the load request; and means for returning, in response to the address proximity condition being satisfied, for each of the subsequent load requests in the set of one or more subsequent load requests, one or more further data items identified by the one or more subsequent load requests from the series of data items as the results of the one or more subsequent load requests.

* * * * *